US 12,189,938 B2

(12) United States Patent
Bian

(10) Patent No.: US 12,189,938 B2
(45) Date of Patent: Jan. 7, 2025

(54) DISPLAY METHOD AND ELECTRONIC DEVICE

(71) Applicant: Huawei Technologies Co., Ltd., Shenzhen (CN)

(72) Inventor: Sucheng Bian, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 17/623,027

(22) PCT Filed: Jun. 23, 2020

(86) PCT No.: PCT/CN2020/097574
§ 371 (c)(1),
(2) Date: May 13, 2022

(87) PCT Pub. No.: WO2020/259461
PCT Pub. Date: Dec. 30, 2020

(65) Prior Publication Data
US 2022/0291794 A1 Sep. 15, 2022

(30) Foreign Application Priority Data

Jun. 25, 2019 (CN) .......................... 201910555739.1

(51) Int. Cl.
G06F 3/0486 (2013.01)
G06F 3/0481 (2022.01)
(Continued)

(52) U.S. Cl.
CPC .......... *G06F 3/0486* (2013.01); *G06F 3/0481* (2013.01); *G06F 3/04842* (2013.01); *G06F 3/0488* (2013.01)

(58) Field of Classification Search
CPC .................. G06F 3/048; G06F 3/0486; G06F 3/0481–0483; G06F 3/04842; G06F 3/0488–04886
See application file for complete search history.

(56) References Cited

U.S. PATENT DOCUMENTS 8,793,607 B2 * 7/2014 Jeong .................. G06F 3/04817
715/765
9,785,340 B2 * 10/2017 Lemay .................. G06F 3/0481
(Continued)

FOREIGN PATENT DOCUMENTS

| CN | 104903830 A | 9/2015 |
| CN | 105867727 A | 8/2016 |

(Continued)

OTHER PUBLICATIONS

"Use Multitasking on your iPad-Apple Support," Mar. 5, 2019, XP055918801, 6 pages.

*Primary Examiner* — Liang Y Li
(74) *Attorney, Agent, or Firm* — Conley Rose, P.C.

(57) ABSTRACT

A display method includes displaying a first interface, where the first interface includes a first application window of a first application, and where the first application window occupies a first display region in the first interface, receiving a first operation on the first interface, displaying a first multi-task management window in response to the first operation, where the first multi-task management window includes identifiers of applications detecting a drag operation performed on an identifier in the first multi-task management window, displaying the first interface and the identifier of the second application, and displaying a second window of the second application in a second display region in the first interface when detecting that the identifier of the second application is dragged to and released in the first (Continued)

display region, where the second display region partially or fully overlaps the first display region.

18 Claims, 49 Drawing Sheets

(51) Int. Cl.
*G06F 3/04842* (2022.01)
*G06F 3/0488* (2022.01)

(56) References Cited

U.S. PATENT DOCUMENTS

| | | | | |
|---|---|---|---|---|
| 10,809,893 | B2* | 10/2020 | Lewis | G06F 3/0486 |
| 2013/0219343 | A1* | 8/2013 | Nan | G06F 3/04817 |
| | | | | 715/838 |
| 2014/0164957 | A1* | 6/2014 | Shin | H04L 65/403 |
| | | | | 715/806 |
| 2014/0164966 | A1* | 6/2014 | Kim | G06F 16/168 |
| | | | | 715/769 |
| 2016/0034145 | A1* | 2/2016 | Lee | G06F 3/0486 |
| | | | | 715/765 |
| 2016/0062552 | A1 | 3/2016 | Jeong et al. | |
| 2016/0357357 | A1* | 12/2016 | Lemay | G06F 3/0482 |
| 2018/0217773 | A1 | 8/2018 | Ishida | |
| 2018/0329550 | A1* | 11/2018 | Dellinger | G06F 3/016 |
| 2019/0095064 | A1 | 3/2019 | Alexander | |
| 2020/0326839 | A1* | 10/2020 | Walkin | G06F 3/04845 |

FOREIGN PATENT DOCUMENTS

| | | | |
|---|---|---|---|
| CN | 105893136 A | | 8/2016 |
| CN | 106598393 A | | 4/2017 |
| CN | 107577413 A | | 1/2018 |
| CN | 107992257 A | | 5/2018 |
| CN | 109460169 A | | 3/2019 |
| EP | 3037938 A1 | | 6/2016 |
| JP | 2017219893 A | | 12/2017 |
| JP | 2018124782 A | | 8/2018 |
| KR | 20140073381 A | * | 6/2014 |
| KR | 20150074476 A | | 7/2015 |

\* cited by examiner

DISPLAY METHOD AND ELECTRONIC DEVICE

CROSS-REFERENCE TO RELATED APPLICATIONS

This is a National Stage of International Patent Application No. PCT/CN2020/097574 filed on Jun. 23, 2020, which claims priority to Chinese Patent Application No. 201910555739.1 filed on Jun. 25, 2019. Both of the aforementioned applications are hereby incorporated by reference in their entireties.

TECHNICAL FIELD

This application relates to the field of terminal technologies, and in particular, to a display method and an electronic device.

BACKGROUND

With development of terminal technologies, various electronic devices are generated accordingly. The electronic devices are gradually referred to as necessities of daily life and work for people.

Generally, a plurality of applications may be installed on the electronic device. When a user operates different applications, switching needs to be implemented between the different applications. A mobile phone is used as an example. After an application window of an application is closed, the mobile phone needs to return to a home screen. When the mobile phone detects that an application icon of another application in the home screen is tapped, an application window of the another application is opened. It can be learned that a process of switching between different applications on the electronic device is relatively complex currently. An operation is inconvenient.

SUMMARY

This application provides a display method and an electronic device. In this method, the electronic device can display application windows of a plurality of applications at the same time. This is convenient for user operation.

According to a first aspect, an embodiment of this application provides a display method. The method may be performed by an electronic device (for example, a mobile phone or a tablet computer). The method includes: displaying a first interface, where the first interface includes an application window of at least one application, the at least one application includes a first application, and a first application window of the first application occupies a first display region in the first interface; receiving a first operation input by a user, where the first operation is a preset operation, and the preset operation is used to trigger displaying a multi-task management window; displaying a first multi-task management window in response to the first operation, where the first multi-task management window includes an identifier of one or more applications, and the one or more applications are one or more preset applications, or one or more applications running in the background, or all applications on the electronic device; and when the first multi task management window is displayed, if a drag operation performed on an identifier of a second application in the first multi-task management window is detected, displaying the first interface and the identifier of the second application in response to the drag operation, where the identifier of the second application moves with the drag operation; detecting that the identifier of the second application is dragged to and then released in the first display region; and displaying a second window of the second application in a second display region in the first interface, where the second display region is the first display region or a part of the first display region; and displaying the application window of the at least one application in another display region in the first interface except the second display region.

In some embodiments, the electronic device displays the first interface. The first interface includes the window of the at least one application. The electronic device triggered by an input operation may display the first multi-task management window (the electronic device may cancel displaying the first interface when displaying the first multi-task management window; or may display the first multi-task management window at an upper layer of the first interface, that is, the first multi-task management window overlaps a part of a region of the first interface; or the like). The first multi-task management window includes the identifier of the one or more applications. When the electronic device detects the drag operation performed on the identifier of the second application in the first multi-task management window, the electronic device displays the first interface and the identifier of the second application (in this case, the electronic device may cancel displaying the first multi-task management window). The identifier of the second application may move with the drag operation. When the electronic device detects that the identifier of the second application is dragged to and then released in the first display region occupied by the first application in the first interface, the electronic device displays the window of the second application in the entire first display region or the part of the first display region, and displays the at least one application in another display region. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the second display region is a part of the first display region, and the displaying the application window of the at least one application in another display region in the first interface except the second display region includes: displaying the first window of the first application in another display region in the first display region except the second display region, and displaying a window of another application in another display region in the first interface except the first display region, where the another application is an application in the at least one application except the first application.

In some embodiments, when the electronic device detects that the identifier of the second application is dragged to and then released in the first display region occupied by the first application in the first interface, the window of the second application may occupy the entire first display region or the part of the first display region. When the window of the second application occupies a part of the first display region, the first application may be displayed in a remaining display region in the first display region, that is, the first application and the second application jointly occupy the first display region. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the drag operation performed on the identifier of the second application in the first multi-task management window includes: a touch-and-hold operation performed on the identifier of the second application and a move operation uninterrupted from the touch-and-hold operation and performed after the touch-and-hold operation; and the displaying the first interface in response to the drag operation includes: displaying the first interface in response to the touch-and-hold operation.

In some embodiments, the drag operation performed on the identifier of the second application in the first multi-task management window may be the touch-and-hold operation performed on the identifier of the second application and the move operation uninterrupted from the touch-and-hold operation and performed after the touch-and-hold operation; or may be another operation. This is not limited in this embodiment of this application. In some cases, when the electronic device detects the touch-and-hold operation performed on the identifier of the second application in the first multi-task management window, the electronic device displays the first interface and the identifier of the second application. In some other cases, after the electronic device detects the touch-and-hold operation performed on the identifier of the second application in the first multi-task management window and the move operation uninterrupted from the touch-and-hold operation and performed after the touch-and-hold operation, the electronic device displays the first interface and the identifier of the second application. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the first interface occupies all regions, in the display screen of the electronic device, that can be used to display an application window.

In some embodiments, the first interface may occupy all the regions, in the display screen of the electronic device, that can be used to display an application window. For example, when a status bar on the display screen is hidden, and a navigation bar is hidden or no navigation bar exists, the display screen may display the first interface in full screen. For another example, when a status bar on the display screen is not hidden, and a navigation bar is hidden or no navigation bar exists, another display region in the display screen except the status bar is all used to display the first interface. A larger display region occupied by the first interface indicates more convenient user operation, which helps improve user experience.

In a possible design, the application window that is of the at least one application and that is displayed in the first interface occupies the entire first interface without overlapping.

In some embodiments, the window of the at least one application in the first interface occupies the entire first interface without overlapping, to facilitate the user in viewing each window or operating each window.

In a possible design, after the displaying the application window of the at least one application in another display region in the first interface except the second display region, the electronic device may further receive a second operation input by the user, where the second operation is a preset operation; and display a second multi-task management window in response to the second operation, where the identifier of the second application is deleted or the identifier of the second application is displayed in gray when the second multi-task management window is compared with the first multi-task management window.

In some embodiments, after the electronic device enables the second application to run in the foreground through switching by using the first multi-task management window, the electronic device may cancel displaying the first multi-task management window. When the electronic device displays the second multi-task management window, because the second application is displayed in the foreground, the identifier of the second application is deleted or the identifier of the second application is displayed in gray when the second multi-task management window is compared with the first multi-task management window. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the detecting that the identifier of the second application is dragged to the first display region includes: detecting that an area of the identifier of the second application in the first display region is greater than a preset area, or detecting that a ratio between an area of the identifier of the second application in the first display region and a total area of the identifier of the second application is greater than a preset ratio.

In some embodiments, when the electronic device determines that the area of the identifier of the second application in the first display region is greater than the preset area, or determines that the ratio between the area of the identifier of the second application in the first display region and the total area of the identifier of the second application is greater than the preset ratio, the electronic device determines that the identifier of the second application is dragged to the first display region. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the identifier of the second application includes an application window or an icon of the second application.

It should be understood that the application window and the icon are merely examples instead of limitation of the identifier of the second application.

In a possible design, when the electronic device displays the first multi-task management window, if the electronic device detects a first trigger operation performed on a first region of the identifier of the second application in the first multi-task management window is detected, in response to the first trigger operation, the electronic device displays the application window of the second application in full screen in a display region that is in the display screen of the electronic device and that can be used to display an application window.

In some embodiments, the electronic device may enable the window of the second application to be displayed in the foreground through switching by using the first multi-task management window, and display the application window of the second application in full screen in the display region that is in the display screen and that can be used to display an application window. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, when the electronic device displays the first multi-task management window, if the electronic device detects a second trigger operation performed on a second region of the identifier of the second application in the first multi-task management window, the electronic device displays a first update interface of the first interface in response to the second trigger operation. The first update interface of the first interface is used to display the application window of the at least one application and the application window of the second application.

In some embodiments, the electronic device displays the first interface. The first interface includes a window of an application A. The electronic device may enable a window of an application B to be displayed in the foreground through switching by using the first multi-task management window, that is, the electronic device may display the application A and the application B at the same time. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, when the electronic device displays the first multi-task management window; if the electronic device detects a second trigger operation performed on a second region of the identifier of the second application in the first multi-task management window, and a quantity of application windows included in the first interface reaches an upper limit, the electronic device displays a second update interface of the first interface in response to the second trigger operation. The second update interface of the first interface is used to display the application window of the second application and an application window of another application in the at least one application except a third application. The application window of the second application occupies a third display region. The third display region is a display region occupied by an application window of the third application in the first interface. The third application is an application on which user operation focuses in the first interface, or an application earliest opened by the user in an application on which user operation does not focus, or an application latest opened by the user in an application on which user operation does not focus, before the electronic device displays the first multi-task management window.

In some embodiments, when the electronic device displays the first interface and the quantity of application windows included in the first interface reaches the upper limit, if the electronic device detects an operation of enabling the second application to run in the foreground through switching by using the first multi-task management window; the electronic device replaces the window of the second application with the window of the third application in the first interface. The third application may be the application on which user operation focuses in the first interface, or the application earliest opened by the user in the application on which user operation does not focus, or the application latest opened by the user in the application on which user operation does not focus. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, when the electronic device displays the first multi-task management window; if the electronic device detects a second trigger operation performed on a second region of the identifier of the second application in the first multi-task management window, and a quantity of application windows included in the first interface reaches an upper limit, the electronic device outputs prompt information in response to the second trigger operation. The prompt information is used to indicate that the quantity of windows included in the first interface reaches the upper limit. After an input indication used to replace a third application in the first interface is received, a second update interface of the first interface is displayed. The second update interface of the first interface is used to display the window of the second application and a window of another application in the at least one application except the third application. The window of the second application occupies a third display region. The third display region is a display region occupied by the window of the third application in the first interface.

In some embodiments, when the electronic device displays the first interface and the quantity of application windows included in the first interface reaches the upper limit, if the electronic device detects an operation of enabling the second application to run in the foreground through switching by using the first multi-task management window, the electronic device may prompt the user to replace the window of the second application with a window of a specific application in the first interface. Based on a choice of the user, the electronic device replaces the second application with a window of an application selected by the user, which helps improve user experience. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the second application is an application that does not run, and the displaying the first interface and the identifier of the second application in response to the drag operation includes: in response to the drag operation, enabling the second application and displaying the first interface and the second window of the second application, where the second window is used to display an initial interface of the second application after being enabled.

In some embodiments, when the second application does not run, the electronic device detects the drag operation performed on the identifier of the second application in the first multi-task management window, enables the second application, and displays the first interface and the second window of the second application. The second window is used to display the initial interface of the second application after being enabled. In the method, the electronic device detects the drag operation performed on the identifier of the second application in the multi-task management window, enables the second application, and displays the second window of the second application, so that the user does not need to manually enable the second application, thereby facilitating user operation. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the second application is an application that does not run, and the displaying the first interface and the identifier of the second application in response to the drag operation includes: displaying the first interface and the second window of the second application in response to the drag operation, where the second window is displayed in gray; and detecting that the second window of the second application is dragged to and then released in the first display region, and enabling the second application, where the second window is used to display an initial interface of the second application after being enabled.

In some embodiments, when the second application does not run, the electronic device detects the drag operation performed on the identifier of the second application in the first multi-task management window, and displays the first interface and the second window of the second application. The second window is displayed in gray. When the electronic device detects that the second window of the second application is dragged to and then released in the first display region, the electronic device enables the second application. The second window is used to display the initial interface of the second application after being enabled. In the method, after the electronic device detects that the second window of the second application is dragged to and then released in the first display region, the electronic device enables the second application. In other words, in a process of moving the second window of the second application, the second application is not enabled, to help save a function. In the display method provided in this embodiment of this application, the electronic device can display application windows of a plurality of applications at the same time. In addition, the electronic device may use the multi-task management window to enable an application to switch from not running in the foreground to running in the foreground. This is convenient for operation, thereby improving efficiency.

In a possible design, the second application is an application running in the background, and the displaying the first interface and the identifier of the second application in response to the drag operation includes: displaying the first interface and the second window of the second application in response to the drag operation, where the second window is used to display a currently running interface of the second application.

In some embodiments, when the second application runs, the electronic device detects the drag operation performed on the identifier of the second application in the first multi-task window, and displays the first interface and the second window of the second application. The second window is used to display the currently running interface of the second application.

According to a second aspect, an electronic device is further provided, including a display screen, one or more processors, a memory, one or more applications, and one or more programs. The one or more programs are stored in the memory. The one or more programs include instructions. When the instructions are executed by the electronic device, the electronic device is enabled to perform the method in the first aspect or any possible design of the first aspect.

According to a third aspect, an electronic device is further provided. The electronic device includes modules/units that are configured to perform the method in the first aspect or any possible design of the first aspect. The modules/units may be implemented by hardware, or may be implemented by hardware by executing corresponding software.

According to a fourth aspect, a computer readable storage medium is further provided. The computer readable storage medium stores a program. When the program is run on an electronic device, the electronic device is enabled to perform the method in the first aspect or any possible design of the first aspect.

According to a fifth aspect, a program product is further provided. When the program product is run on an electronic device, the electronic device is enabled to perform the method in the first aspect or any possible design of the first aspect.

According to a sixth aspect, an embodiment of this application further provides a chip. The chip is coupled to a memory in an electronic device, and is configured to invoke a computer program stored in the memory and execute a technical solution in the first aspect and any possible design of the first aspect. In this embodiment of this application, "coupling" means a direct combination or an indirect combination of two components.

According to a seventh aspect, a user graphical interface on an electronic device is further provided. The electronic device has a display screen, a camera, a memory, and one or more processors. The one or more processors are configured to execute one or more computer programs stored in the memory. The graphical user interface includes a user graphical interface displayed when the electronic device performs the method in the first aspect or any possible design of the first aspect.

It should be noted that an $X^{th}$ operation in this application may be one operation or a combination of a plurality of operations. The $X^{th}$ operation may include a first operation, a second operation, and the like.

It should be noted that an $X^{th}$ region in this application may be one region or a combination of a plurality of regions. The $X^{th}$ region includes a first region, a second region, and the like.

DESCRIPTION OF EMBODIMENTS

Terms used in the following embodiments are merely intended for the purpose of describing specific embodiments, but not intended to limit this application. The terms "one", "a", and "this" of singular forms used in this specification and the appended claims of this application are also intended to include expressions such as "one or more", unless otherwise specified in the context clearly. It should be further understood that, in the embodiments of this application, "one or more" indicates one, two, or more than two, and "and/or" describes only an association relationship for describing associated objects and indicates that three relationships may exist. For example, A and/or B may indicate the following three cases: Only A exists, both A and B exist, and only B exists. Herein, A or B may be singular or plural. The character "I" generally indicates an "or" relationship between the associated objects.

Reference to "one embodiment", "some embodiments", or the like described in this specification indicates that one or more embodiments of this application include specific features, structures, or features described with reference to the embodiments. Therefore, statements: "in one embodiment", "in some embodiments", "in other embodiments", "in some other embodiments", and the like appearing in different parts of this specification do not necessarily refer to the same embodiment but indicate "one or more but not all embodiments", unless otherwise specifically stated. The terms "include", "comprise", "have", and their variations all indicate "include but not be limited to", unless otherwise specifically stated.

In the following, some terms of the embodiments of this application are described, to help a person skilled in the art have a better understanding.

An application (application, app for short) in the embodiments of this application is referred to an app and is a software program that can implement one or more specific functions. Generally, a plurality of applications may be installed on a terminal device, for example, a camera application, an SMS application, a mailbox application, WeChat (WeChat), WhatsApp Messenger, Line (Line), Instagram (instagram), Kakao Talk, and DingTalk. The application mentioned below may be an application installed when the terminal device is delivered from a factory, or may be an application downloaded from a network or obtained from another terminal device in a process in which the user uses the terminal device.

It should be noted that a display method provided in the embodiments of this application may be applied to any electronic device having a display screen, for example, a mobile phone, an iPad, a television, or a notebook computer; or may be applied to a wearable device having a display screen. The electronic device may also be a foldable electronic device, for example, a foldable mobile phone or a foldable iPad. In the following, the foldable mobile phone is used as an example.

Figure 1A:
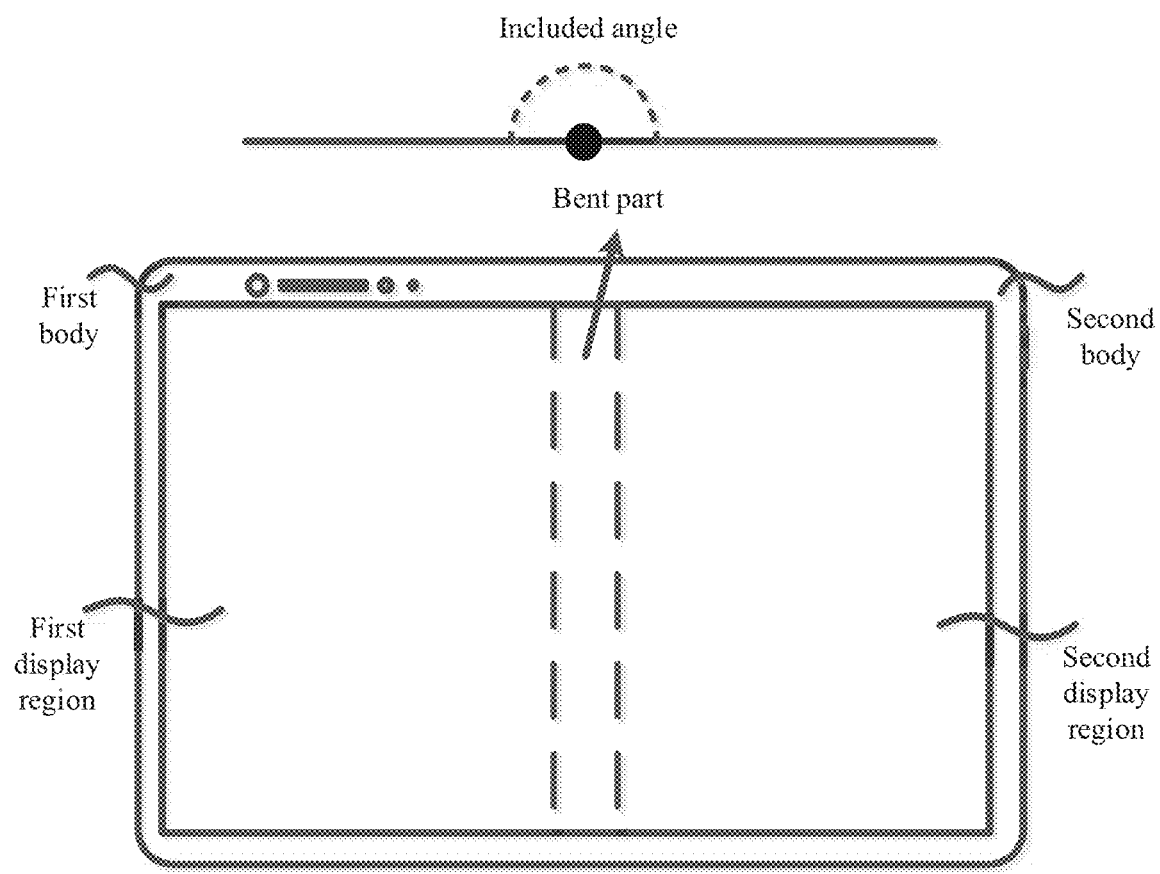
FIG. 1 is a schematic diagram of a foldable mobile phone according to an embodiment of this application.
Figure 1B:
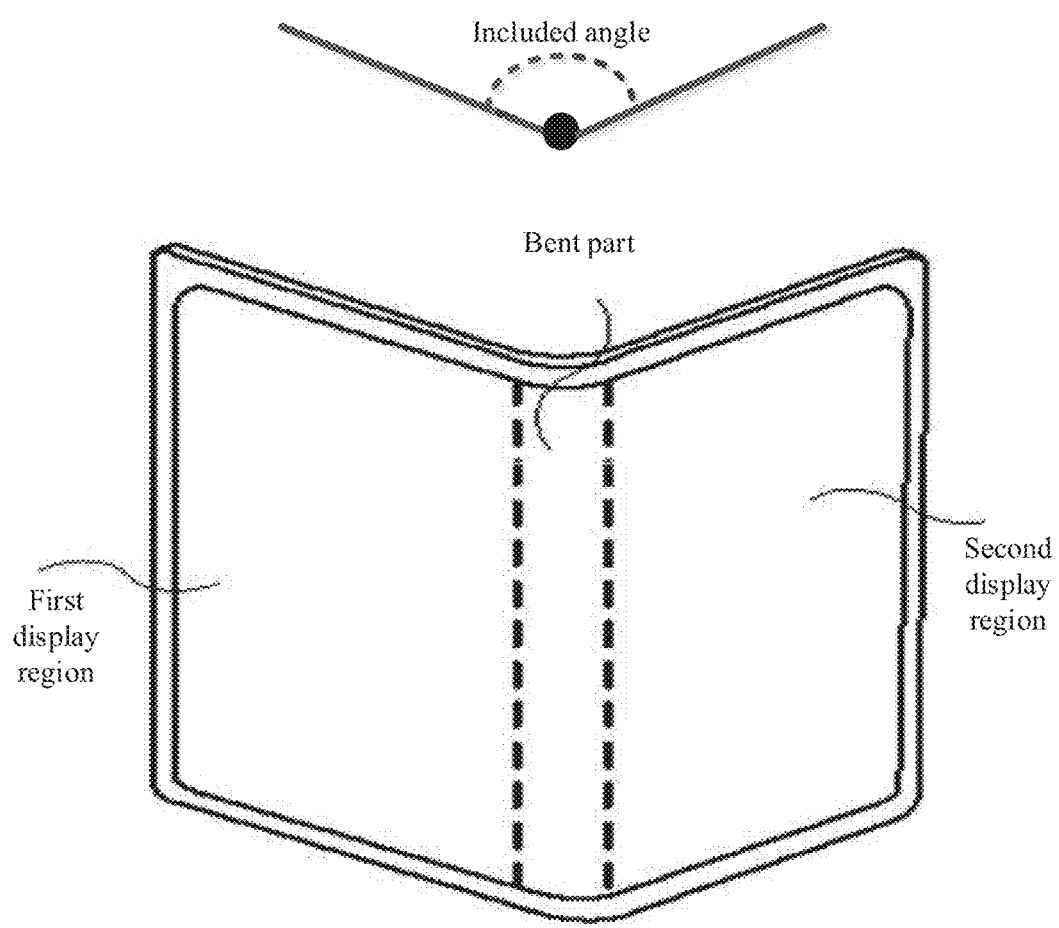

FIG. 1 is a schematic diagram of a foldable mobile phone according to an embodiment of this application. As shown in FIG. 1(a), the foldable mobile phone includes a first body and a second body. An included angle between the first body and the second body may change, so that the foldable mobile phone is unfolded or folded. It should be understood that an entire screen may cover the first body and the second body. The screen may be a foldable screen. With reference to FIG. 1(b), when the included angle between the first body and the second body changes, an included angle between a first display region corresponding to the first body and a second display region corresponding to the second body also changes.

An unfolding angle in this embodiment of this application is the included angle between the first body and the second body of the foldable electronic device. When the unfolding angle is 0 degrees, a first rear face of the first display region corresponding to the first body overlaps a second rear face of the second display region corresponding to the second body. When the unfolding angle is 180 degrees, the first display region and the second display region are located on the same horizontal plane. When the unfolding angle is 360 degrees, the first display region overlaps the second display region.

The following uses the foldable mobile phone as an example to describe a structure of the mobile phone.

Figure 2:
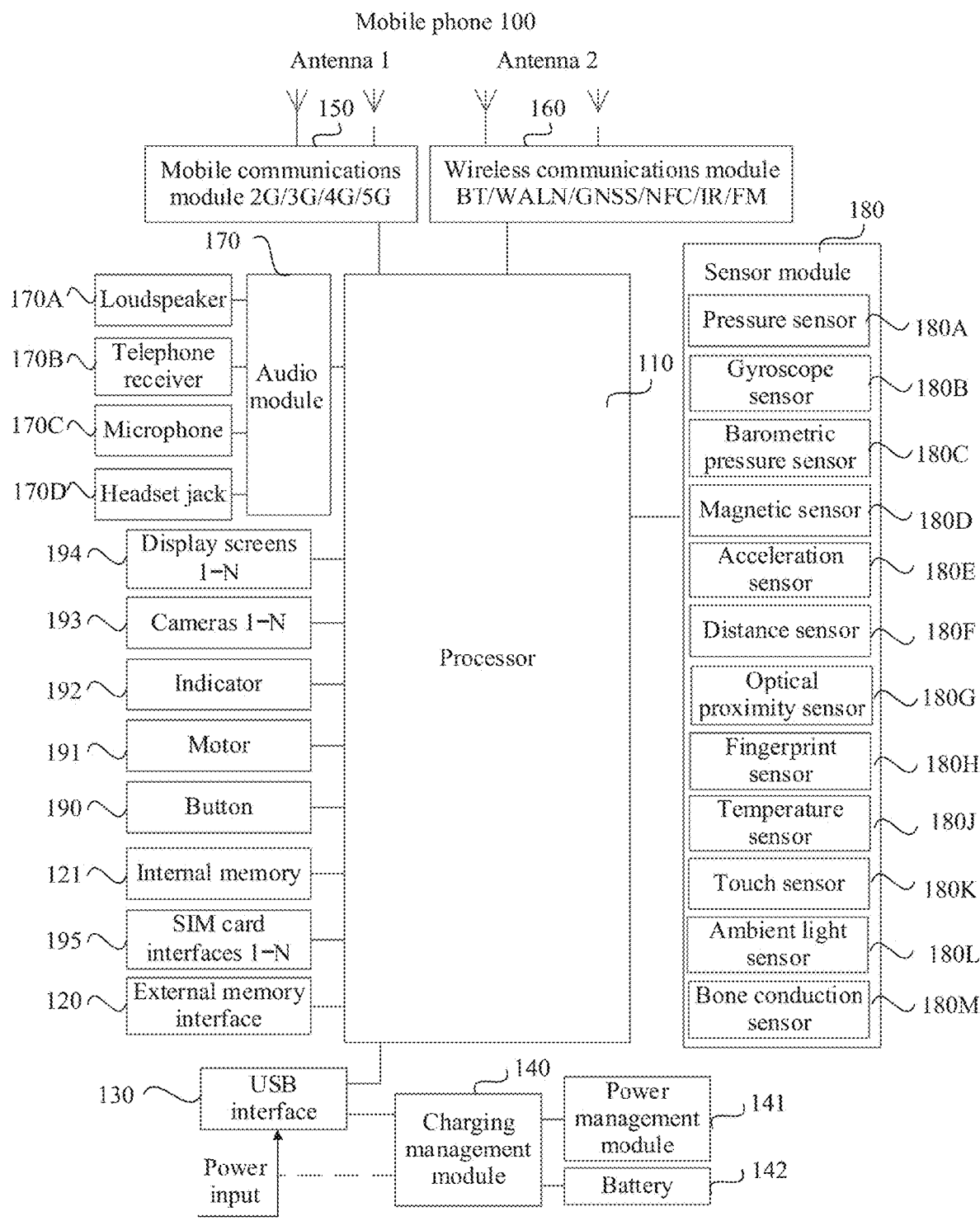
FIG. 2 is a schematic diagram of a hardware structure of a mobile phone 100 according to an embodiment of this application.

As shown in FIG. 2, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera 193, a display screen 194, a subscriber identity module (subscriber identity module. SIM) card interface 195, and the like. The sensor module 180 may include a pressure sensor 180A, a gyroscope sensor 180B, a barometric pressure sensor 180O, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the mobile phone 100. The controller may generate an operation control signal based on instruction operation code and a time sequence signal, to complete control of instruction reading and instruction execution.

The memory may be further disposed in the processor 110, to store instructions and data. In some embodiments, the memory in the processor 110 is a cache. The memory may store instructions or data used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

The processor 100 may run software code of the display method provided in the embodiments of this application, to implement a corresponding display effect.

The USB interface 130 is an interface that meets a USB standard specification, and may be specifically a mini USB interface, a micro USB interface, a USB Type-C interface, or the like. The USB interface 130 may be configured to connect to the charger to charge the mobile phone 100, or may be configured to transmit data between the mobile phone 100 and a peripheral device.

The charging management module 140 is configured to receive charging input from the charger. The power management module 141 is configured to connect the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communications module 160, and the like.

A wireless communication function of the mobile phone 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the mobile phone 100. The mobile communications module 150 may include at least one filter, a switch, a power amplifier, a low noise amplifier (low noise amplifier, LNA), and the like. The mobile communications module 150 may receive an electromagnetic wave over the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave for radiation over the antenna 1. In some embodiments, at least some function modules of the mobile communications module 150 may be disposed in the processor 110. In some embodiments, at least some function modules of the mobile communications module 150 and at least some modules of the processor 110 may be disposed in the same component.

The wireless communications module 160 may provide a solution to wireless communication applied to the mobile phone 100, for example, a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components into which at least one communications processing module is integrated. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 and the mobile communications module 150 of the mobile phone 100 are coupled, and the antenna 2 and the wireless communications module 160 of the mobile phone 100 are coupled, so that the mobile phone 100 can communicate with a network and another device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The display screen 194 is configured to display a display interface of an application, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a MiniLed, a MicroLed, a Micro-oLed, a quantum dot light emitting diode (quantum dot light emitting diode. QLED), and the like. In some embodiments, the mobile phone 100 may include one or N display screens 194, where N is a positive integer greater than 1.

The camera 193 is configured to capture a static image or a video. The camera 193 may include a front-facing camera and a rear-facing camera.

The internal memory 121 may be configured to store computer executable program code. The executable program code includes instructions. By running the instructions stored in the internal memory 121, the processor 110 executes various function applications and data processing of the mobile phone 100. The internal memory 121 may include a program storage region and a data storage region. The program storage region may store an operating system, software code of at least one application (for example, an iQIYI application or a WeChat application), and the like. The data storage region may store data (for example, an image and a video) and the like generated in a process of using the mobile phone 100. In addition, the internal memory 121 may include a high-speed random access memory, or may include a non-volatile memory such as at least one magnetic disk memory, a flash memory, or a universal flash storage (universal flash storage, UFS).

The internal memory 121 may further store the software code of the display method provided in the embodiments of this application. When the processor 110 runs the software code, a procedure step of the display method is executed, to implement a corresponding display effect.

The external memory interface 120 may be configured to connect to an external storage card such as a micro SD card, to extend a storage capability of the mobile phone 100. The external storage card communicates with the processor 110 by using the external memory interface 120, to implement a data storage function. For example, a file such as an image or a video is stored in the external storage card.

Certainly, the external memory may further store the software code of the display method provided in the embodiments of this application. When the processor 110 may run the software code by using the external memory interface 120, a procedure step of the display method is executed, to implement a corresponding display effect.

The mobile phone 100 may implement an audio function such as music playing or recording over the audio module 170, the loudspeaker 170A, the telephone receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed in the display screen 194.

The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes). The gyroscope sensor 180B may be configured to implement stabilization during photographing.

The barometric pressure sensor 180C is configured to measure atmospheric pressure. In some embodiments, the mobile phone 100 calculates an altitude based on a value of the atmospheric pressure measured by the barometric pressure sensor 180C, to assist positioning and navigation.

The magnetic sensor 180D includes a Hall effect sensor. The mobile phone 100 may detect opening and closing of a flip leather cover by using the magnetic sensor 180D. In some embodiments, when the mobile phone 100 is a clamshell phone, the mobile phone 100 may detect opening and closing of a clamshell by using the magnetic sensor 180D. Further, a feature such as automatic unlocking of the clamshell is set based on a detected open/closed state of the leather cover or a detected open/closed state of the clamshell.

The acceleration sensor 180E may detect a magnitude of acceleration of the mobile phone 100 in various directions (usually on three axes). When the mobile phone 100 is static, a value and a direction of gravity may be detected. The mobile phone 100 may be further configured to recognize a posture of the electronic device, and applied to applications such as landscape/portrait orientation switching and a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The mobile phone 100 may emit infrared light by using the light emitting diode. The mobile phone 100 detects reflected infrared light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may be further configured to automatically unlock and lock the screen in a leather cover mode and a pocket mode.

The ambient light sensor 180L is configured to sense luminance of ambient light. The mobile phone 100 may adaptively adjust luminance of the display screen 194 based on the sensed luminance of the ambient light. The ambient light sensor 180L may be further configured to automatically adjust white balance during photographing. The ambient light sensor 180L may further cooperate with the optical proximity sensor 180G to detect whether the mobile phone 100 is in a pocket, thereby preventing an accidental touch.

The fingerprint sensor 180H is configured to collect a fingerprint. The mobile phone 100 may implement fingerprint unlock, application lock access, fingerprint photographing, fingerprint-based call answering, and the like by using a feature of the collected fingerprint.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed in the display screen 194, and the touch sensor 180K and the display screen 194 constitute a touchscreen that is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide, over the display screen 194, visual output related to the touch operation. In other embodiments, the touch sensor 180K may be alternatively disposed on a surface of the mobile phone 100, and is located in a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal.

The button 190 includes a power-on button, a volume button, and the like. The button 190 may be a mechanical button, or may be a touch key. The mobile phone 100 may receive button input, and generate button signal input related to user setting and function control of the mobile phone 100. The motor 191 may generate a vibration prompt. The motor 191 may be configured to provide a vibration prompt for an incoming call, and may be further configured to provide a touch vibration feedback. For example, touch operations performed on different applications (for example, photographing and audio playing) may correspond to different vibration feedback effects. The indicator 192 may be an indicator light, may be configured to indicate a charging state and a battery change, and may be further configured to indicate a message, a missed call, a notification, and the like. The SIM card interface 195 is configured to connect to a SIM card. The SIM card may be inserted into the SIM card interface 195 or detached from the SIM card interface 195, to implement contact with and detaching from the mobile phone 100.

It may be understood that the components shown in FIG. 2 constitutes no limitation on the mobile phone 100. The mobile phone 100 may include more or fewer components than those shown in the figure; or some components may be combined; or some components may be split; or different component arrangements may be used.

It should be understood that, because the foldable mobile phone 100 has a relatively large display screen, application windows of a plurality of applications may be displayed on the display screen of the mobile phone 100 at the same time by using the display method provided in the embodiments of this application, thereby facilitating user operation. The following describes an implementation process of the display method provided in the embodiments of this application. In the following, the mobile phone 100 (the foldable mobile phone) is used as an example. For example, the unfolding angle of the mobile phone 100 is 180 degrees. The solutions in the embodiments of the present invention may be applied to any device with a relatively large screen, but may also be applied to a device with a small screen. This is not limited in the present invention.

Figure 3A:
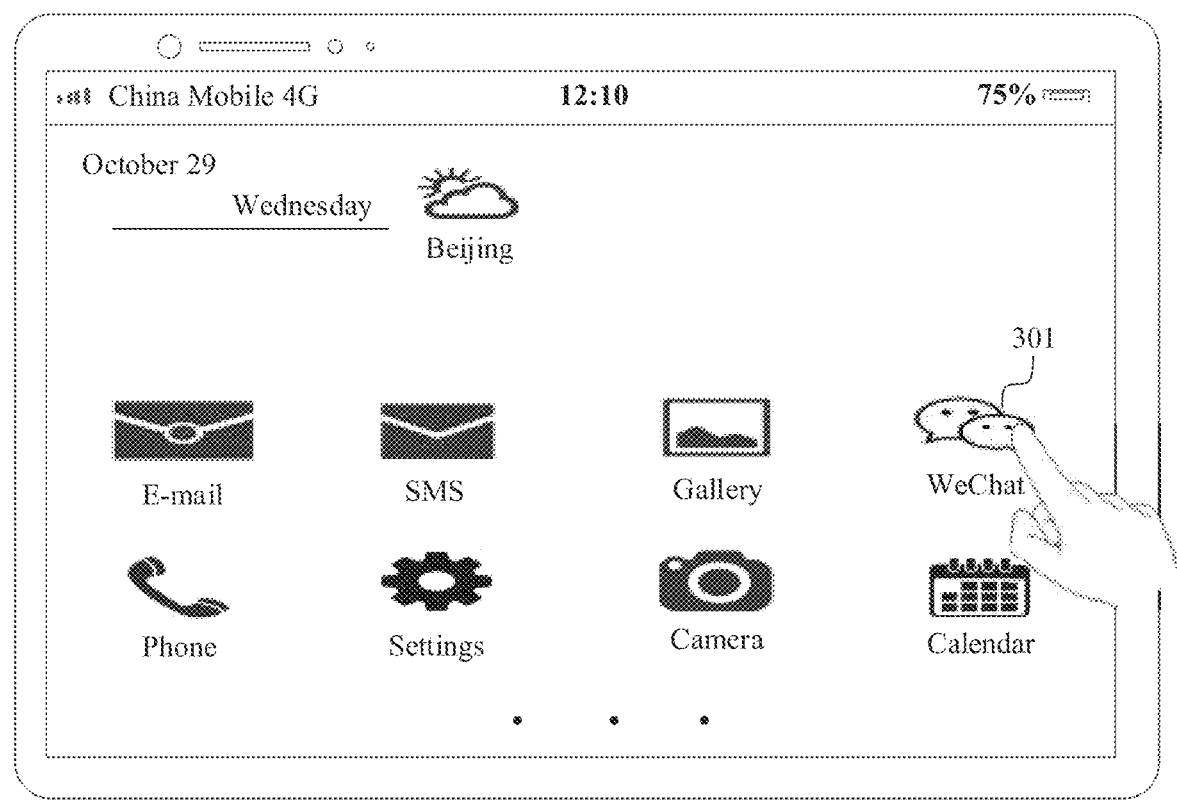
FIG. 3A is a schematic diagram of a user graphical interface of a mobile phone 100 according to an embodiment of this application.
Figure 3A:
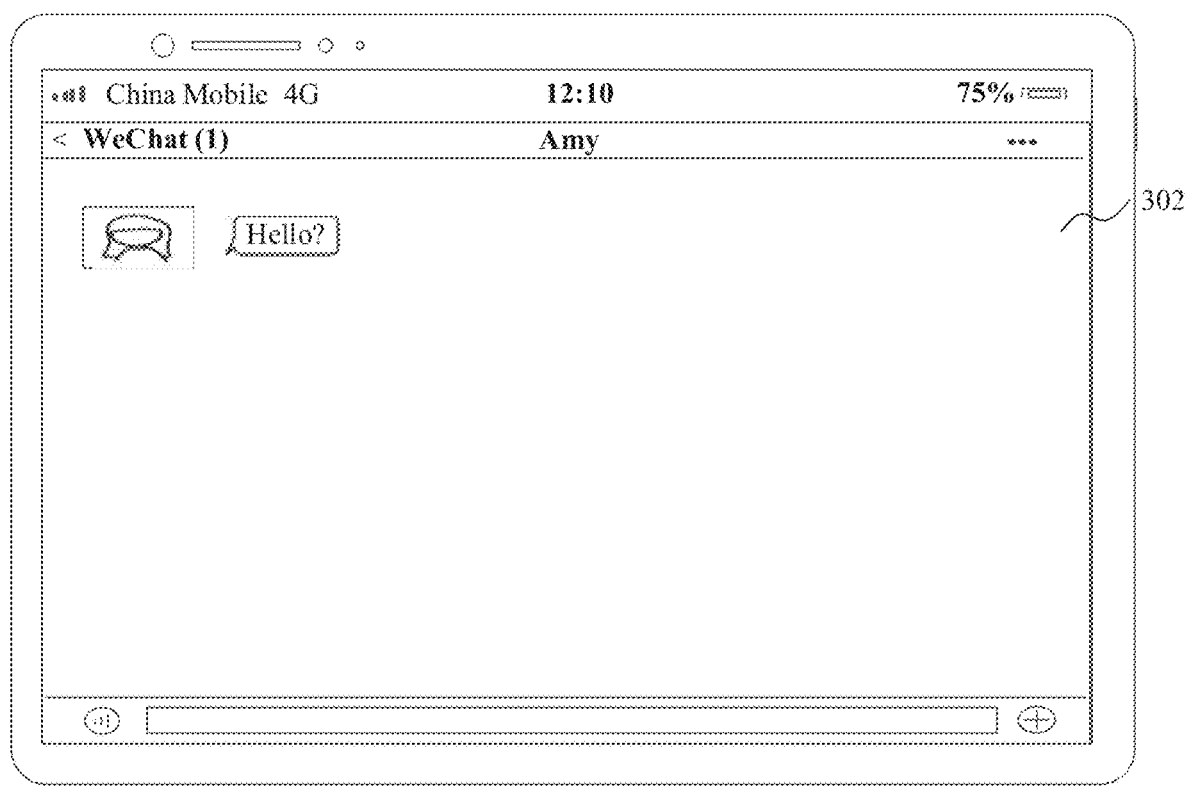

With reference to FIG. 3A(a), a home screen (home screen) is displayed on the display screen of the mobile phone 100. The home screen includes icons of a plurality of applications, for example, an icon of an email application, an icon of an SMS application, and an icon of a gallery application. When the mobile phone 100 detects that the user triggers an icon 301 of a WeChat application, the mobile phone 100 displays an interface 302. As shown in FIG. 3A(b), the interface 302 includes a window of the WeChat application.

In some embodiments, when the mobile phone 100 displays the window of the WeChat application, the mobile phone 100 may display a window of another application at the same time. The mobile phone 100 may determine, based on a selection operation of the user, a window of a specific application to be displayed at the same time with the window of the WeChat application. For example, the mobile phone 100 may provide, by using a "multi-task manager" application, a plurality of applications for the user to select.

Figure 3B:
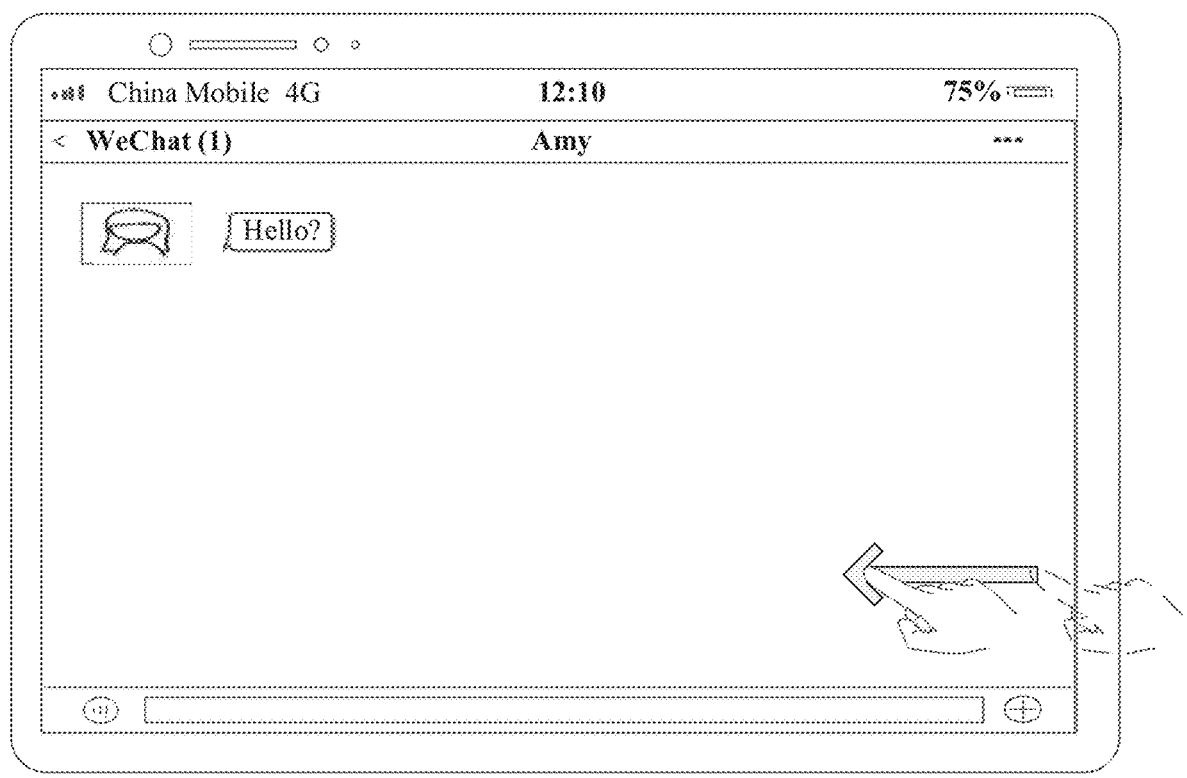
FIG. 3B is a schematic diagram of a user graphical interface of a mobile phone 100 according to an embodiment of this application.
Figure 3B:
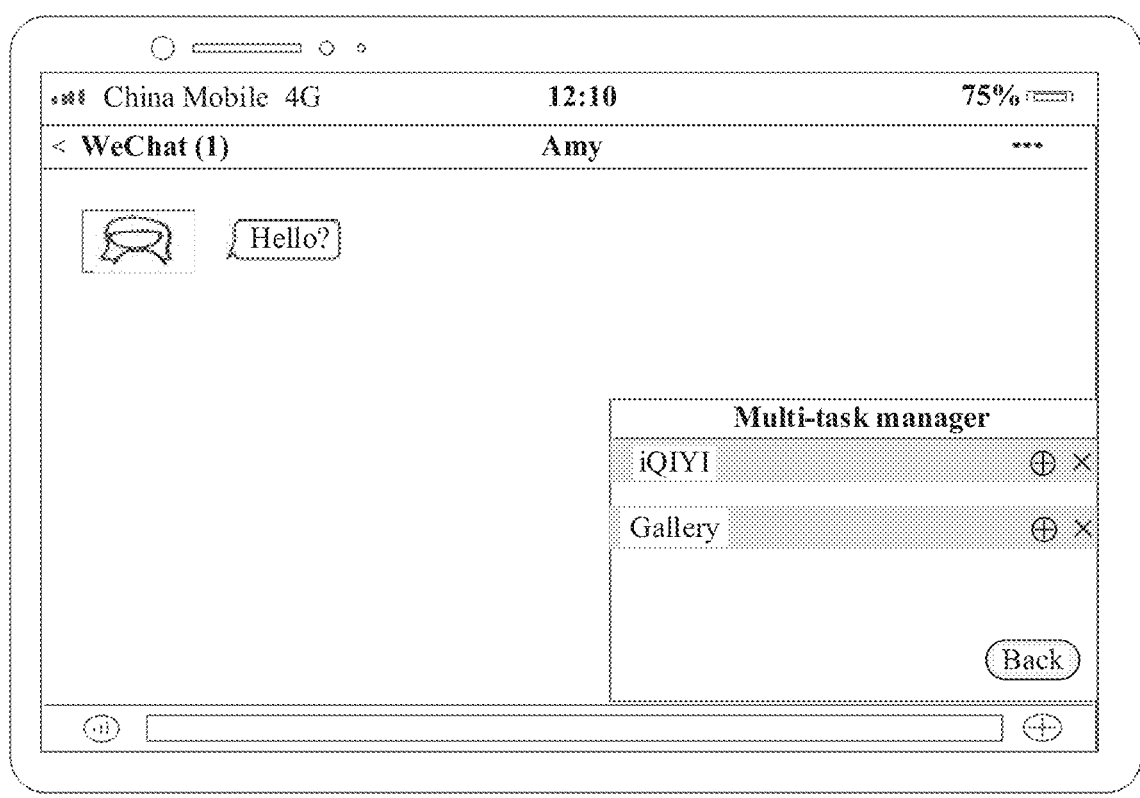

Manner 1: With reference to FIG. 3B(a), the mobile phone 100 displays the window of the WeChat application. When the mobile phone 100 detects a gesture operation, the mobile phone 100 displays a window of the "multi-task manager". In some embodiments, with reference to FIG. 3B(a), the gesture operation may be a right-to-left sliding operation on the display screen of the mobile phone 100. When the mobile phone 100 detects the right-to-left sliding operation, with reference to FIG. 3B(b), the mobile phone 100 displays the window of the "multi-task manager". In some embodiments, the right-to-left sliding operation may be a leftward sliding operation starting from any position on the display screen. For example, a position that is close to an edge of the display screen but has a specific distance to the edge is a start point. In some embodiments, the window of the "multi-task manager" may be displayed in a part of a region in the display screen (for example, the window of the "multi-task manager" and the window of WeChat are displayed at the same time, and the two windows may overlap or may not overlap), or the window of the "multi-task manager" may be displayed in an entire display region of the display screen (all regions that may be used to display an application window) (for example, the mobile phone 100 displays the window of the "multi-task manager" in response to a sliding operation, and does not display the window of WeChat). This is not limited in this embodiment of this application.

In other embodiments, the gesture operation may be another operation, for example, a left-to-right sliding operation, a top-to-bottom sliding operation, or a bottom-to-top sliding operation. In another embodiment, the gesture operation may alternatively be the right-to-left sliding operation/ the left-to-right sliding operation/the top-to-bottom sliding operation/the bottom-to-top sliding operation with certain pressure. For example, the mobile phone 100 detects the right-to-left sliding operation, and a pressure sensor disposed on the display screen detects that a pressure value generated by the sliding operation is greater than a threshold. In this case, a display interface of the "multi-task manager" is displayed.

In another embodiment, the gesture operation may alternatively be the right-to-left sliding operation/the left-to-right sliding operation/the top-to-bottom sliding operation/the bottom-to-top sliding operation, and the sliding operation continuously stays in an end position or implements touch-and-hold in an end position for preset duration. For example, when the mobile phone 100 detects the right-to-left sliding operation, and the mobile phone 100 detects that the sliding operation slides to the end position, the mobile phone 100 displays the display interface of the "multi-task manager" after the sliding operation stays in the end position or implements touch-and-hold for the preset duration (for example, 2 seconds).

In another embodiment, the gesture operation may alternatively be another operation, for example, an operation of drawing a circle or a polygon on the display screen; or the gesture operation may alternatively be an operation such as "shake". This is not limited in this embodiment of this application.

Figure 3C:
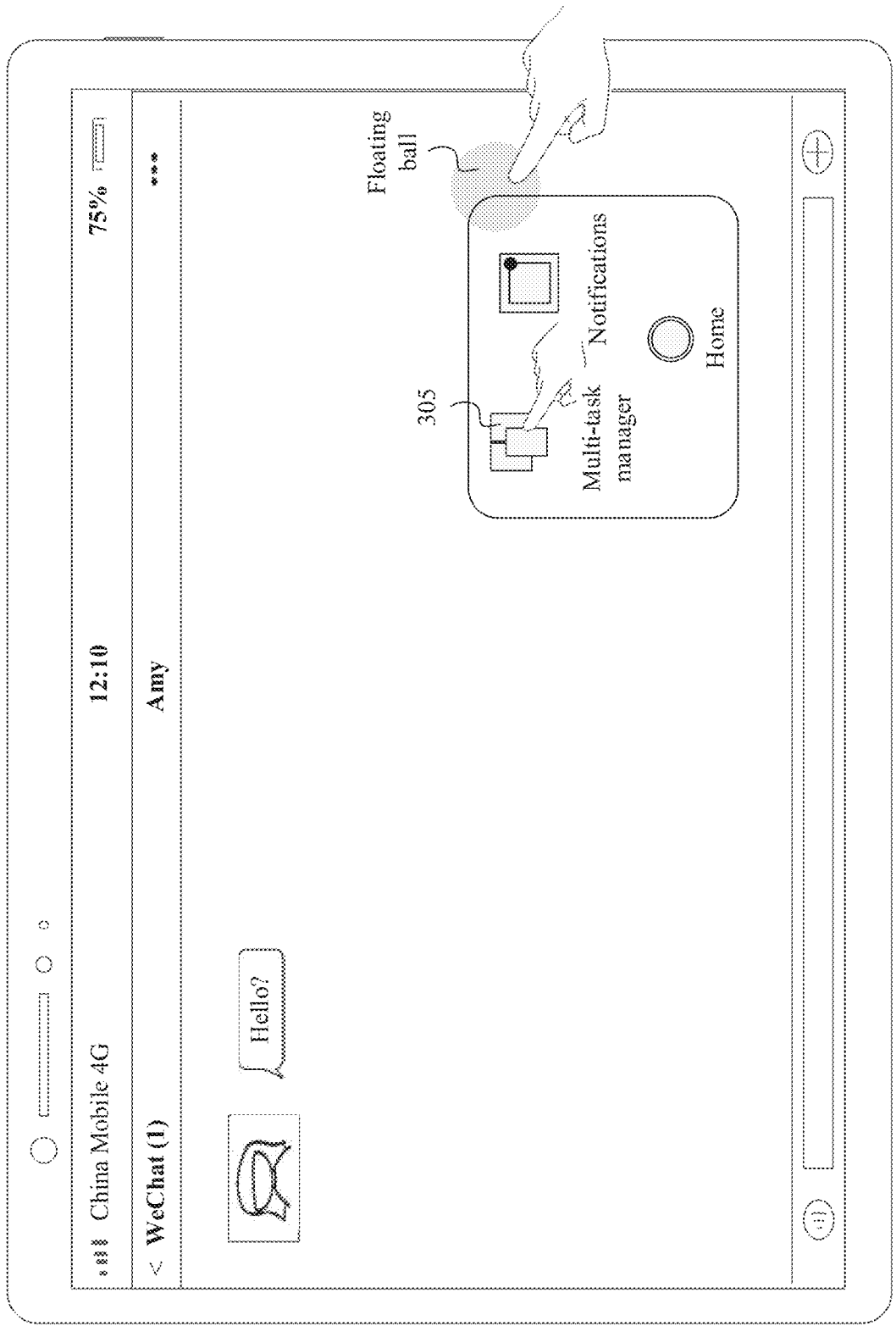
FIG. 3C is a schematic diagram of a user graphical interface of a mobile phone 100 according to an embodiment of this application.
Figure 3C:
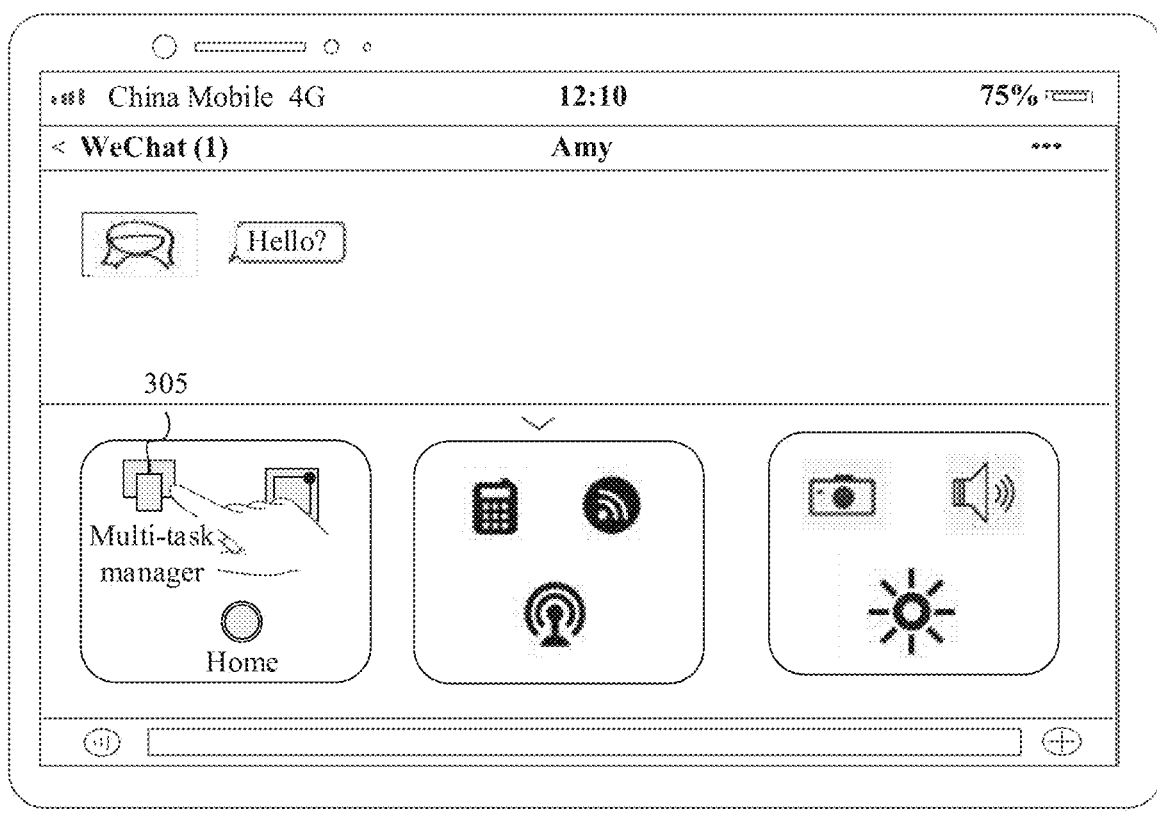

Manner 2: With reference to FIG. 3C(a), a floating ball is displayed in an interface of the WeChat application. When the mobile phone 100 detects that the floating ball is triggered, the mobile phone 100 displays a plurality of shortcut operation controls including a "multi-task manager" control 305. When the mobile phone 100 detects that the control 305 is triggered, the mobile phone 100 displays the interface of the "multi-task manager" application. This is described in the following.

Manner 3: With reference to FIG. 3C(b), the mobile phone 100 displays the interface of the WeChat application. When the mobile phone 100 detects an upward sliding operation of the user (for example, an upward sliding operation starting from a lower edge of the display screen), the mobile phone 100 displays a pull-up list, and a plurality of shortcut controls including a "multi-task manager" control 305 are displayed in the pull-up list.

The following embodiments describe several possible manners in which the mobile phone 100 flexibly sets a plurality of application windows to be displayed at the same time by using the "multi-task manager".

Example 1

Figure 4A:
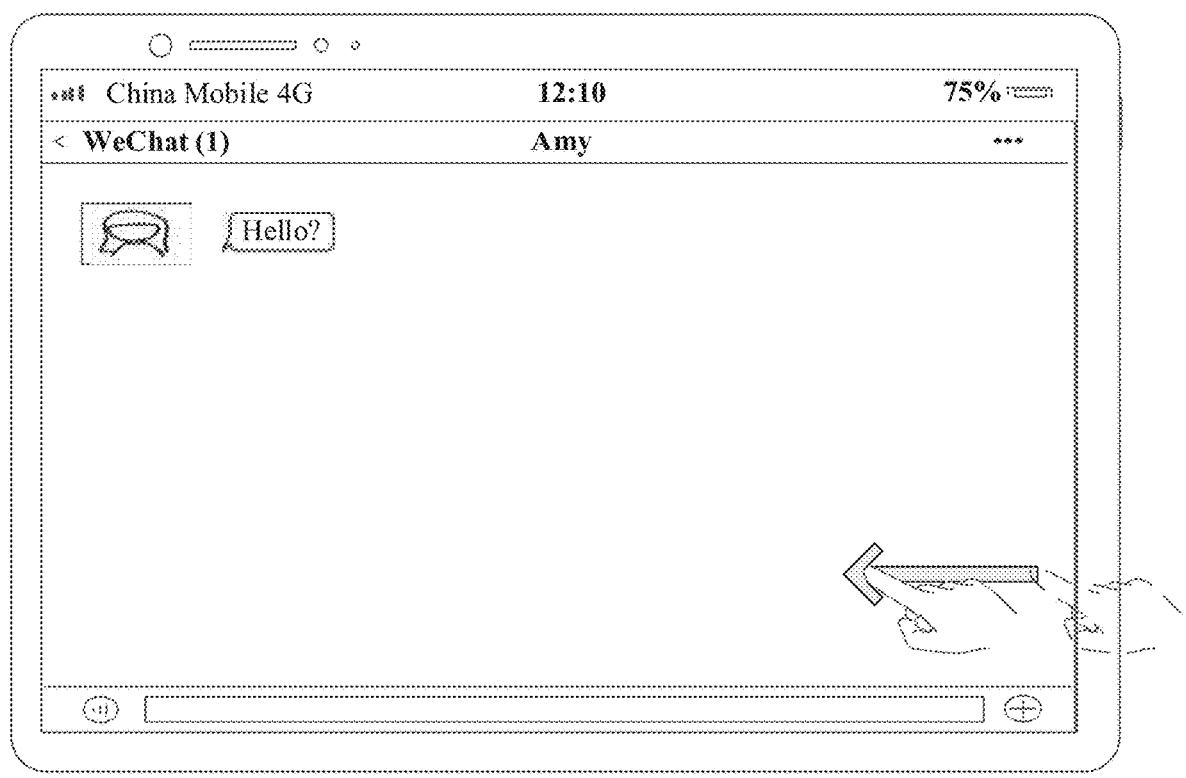
FIG. 4A is a schematic diagram of a user graphical interface of a mobile phone 100 according to an embodiment of this application.
Figure 4A:
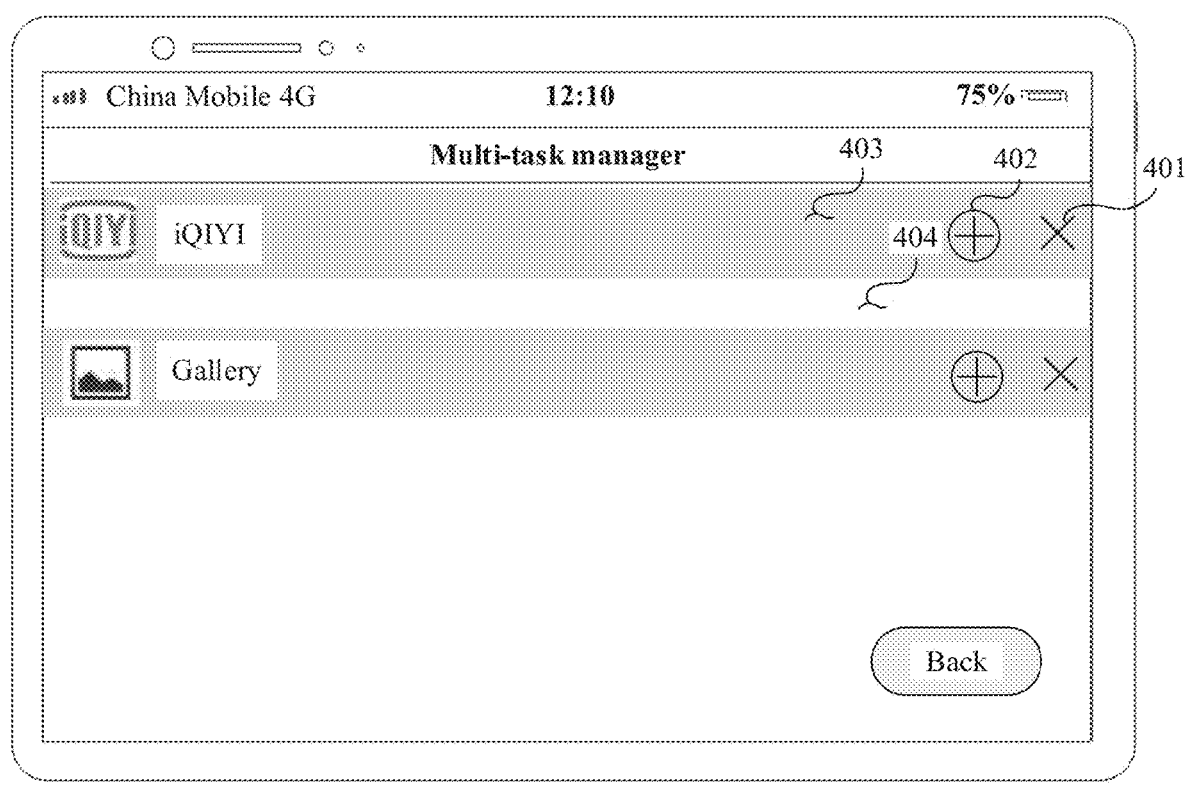

With reference to FIG. 4A(a), the mobile phone 100 displays the interface of the WeChat application. When the mobile phone 100 detects a gesture operation, as shown in FIG. 4A(b), the mobile phone 100 displays the interface of the "multi-task manager". In some embodiments, the interface of the "multi-task manager" includes identifiers of all applications running in the background of the mobile phone 100, or includes identifiers of all applications on the mobile phone 100, or includes an identifier of a preset application, or includes an identifier of an application recently used by the user. The preset application may be an application selected by the user from the mobile phone 100, or an application set before the mobile phone 100 is delivered from a factory. In other embodiments, for example, in FIG. 4A, the mobile phone 100 detects a gesture operation in the interface of the WeChat application, and switches to the interface of the "multi-task manager". Therefore, the interface of the "multi-task manager" may not include the WeChat application.

In some embodiments, an identifier of an application may be displayed in the interface of the "multi-task manager". The identifier of the application may be a screenshot of an application interface, or may be an application icon, or may be a list item, or may be an application window (for example, when the application included in the multi-task manager is an enabled application such as an application running in the background, the application window may be used to display a currently running interface; for another example, when the application included in the multi-task manager is an application that is not enabled, the application window may be used to display in gray or in another color). When the identifier is triggered in a first manner, the application corresponding to the identifier may be enabled to run in the foreground through switching, and an application interface of the application corresponding to the identifier is displayed.

With reference to FIG. 4A(b), each application identifier in the interface of the "multi task manager" may correspond to an operable region, one or more controls, and the like. An application identifier of iQIYI is used as an example. A delete control 401, an add control 402, an operable region 403 (for example, a gray region in the figure), and an operable region 404 (for example, a white region in the figure) may all be used to control the iQIYI application. In some embodiments, for example, in FIG. 4A, the mobile phone 100 detects a gesture operation in the interface of the WeChat application, and switches to the interface of the "multi-task manager". Therefore, the interface of the "multi-task manager" may include an identifier of the WeChat application. However, a control (for example, an add control) corresponding to the identifier of the WeChat application may be not displayed in the interface of the "multi-task manager"; or a control (for example, an add control) corresponding to the identifier of the WeChat application may be displayed in the interface of the "multi-task manager", but displayed in a specific color (to indicate that the control does not respond); or a control (for example, an add control) corresponding to the identifier of the WeChat application may be displayed in the interface of the "multi-task manager". When the mobile phone 100 detects that the user triggers the control (for example, the add control 402) corresponding to the application, the mobile phone 100 outputs prompt information to prompt the user that the application runs in the foreground, and/or a touch control function of the operable region corresponding to the identifier of the WeChat application is disabled.

For example, in FIG. 3B(a), the mobile phone 100 displays the window of the WeChat application. When the mobile phone 100 detects a gesture operation, the displayed interface of the "multi-task manager" application may not include the identifier of the WeChat application; or include the identifier of the WeChat application but not include the "add" control corresponding to the identifier of the WeChat application; or include the identifier of the WeChat application, where the one or more controls corresponding to the identifier of the WeChat application are displayed in gray. In this manner, the user can be prompted that the WeChat application runs in the foreground, and does not need to be further switched to the foreground.

In some embodiments, the interface shown in FIG. 4A(b) is used as an example. The mobile phone 100 detects an operation of touching and holding and/or dragging the operable region 403 corresponding to the identifier of the "iQIYI" application (for example, touching and holding and/or dragging any position in a gray region corresponding to the identifier of the iQIYI application). The mobile phone 100 displays the interface shown in FIG. 4B(a). The interface includes the window of the WeChat application, and further includes a window of the iQIYI application. A position of the window of the iQIYI application may be moved when being dragged under the drag operation. Therefore, when the mobile phone 100 detects an operation of touching and holding and/or dragging the operable region 403 corresponding to the identifier of iQIYI in the window of the "multi-task manager", in response to the operation, the mobile phone 100 does not display the window of the "multi-task manager" but displays the interface shown in FIG. 4B(a). In some embodiments, the touch-and-hold operation and the drag operation may include a touch-and-hold operation performed on the identifier of the iQIYI application and a move operation or a drag operation uninterrupted from the touch-and-hold operation and performed after the touch-and-hold operation. Therefore, in some cases, in response to the drag operation, the mobile phone 100 may cancel displaying the window of the "multi-task manager" but display the interface shown in FIG. 4B(a).

Figure 4B:
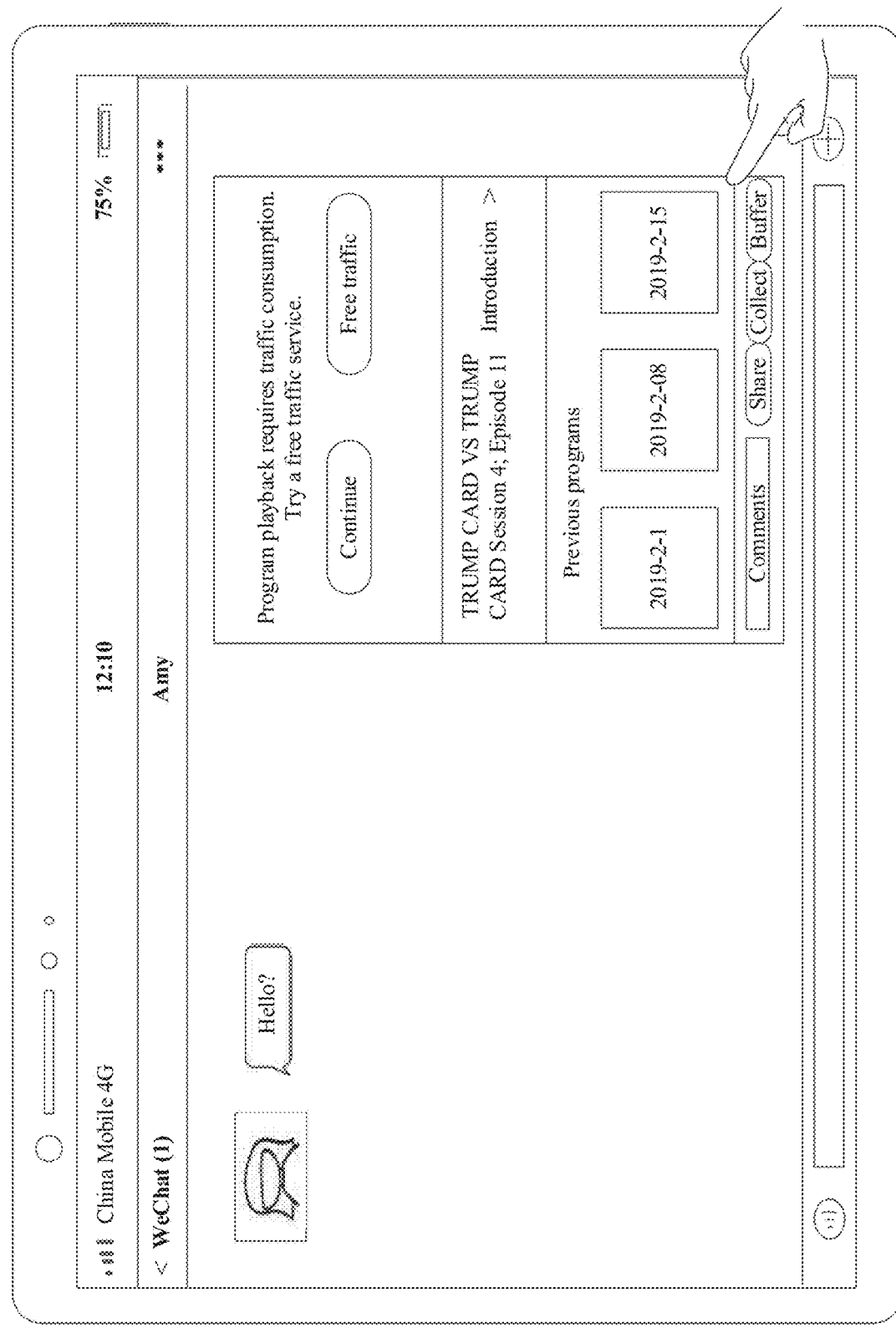
FIG. 4B is a schematic diagram of a user graphical interface of a mobile phone 100 according to an embodiment of this application.
Figure 4B:
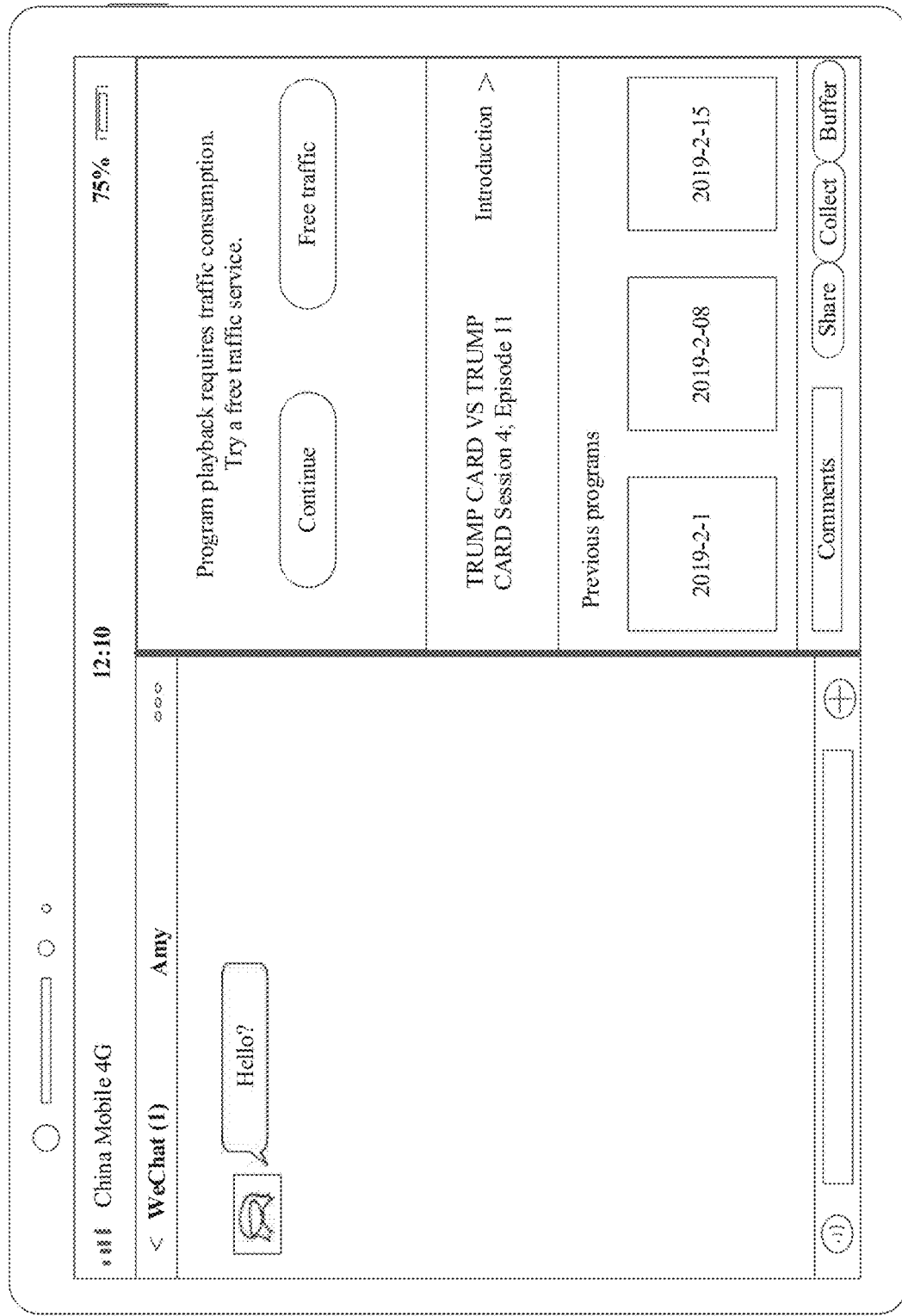

In some embodiments, still with reference to FIG. 4B(a), when the mobile phone 100 detects that the window of the iQIYI application is dragged to and then released in a specific region (for example, a right-side display region), as shown in FIG. 4B(b), the mobile phone 100 displays the window of the iQIYI application in the region, scales down the window of the WeChat application, and displays the scaled-down window of the WeChat application in the remaining region (for example, a left-side display region).

It should be noted that, in a possible case, an icon of an application is displayed in the window of the "multi-task manager". After the mobile phone 100 detects an operation (for example, the touch-and-hold operation and the drag operation) performed on an icon of iQIYI, in response to the operation, the mobile phone 100 cancels displaying the window of the "multi-task manager" and displays the window of WeChat and the window of iQIYI. The window of iQIYI moves with the drag operation. In another possible case, an icon of an application is displayed in the window of the "multi-task manager". After the mobile phone 100 detects an operation (for example, the touch-and-hold operation and the drag operation) performed on the icon of iQIYI, in response to the operation, the mobile phone 100 cancels displaying the window of the "multi-task manager" and displays the window of WeChat and the icon of iQIYI. The icon of iQIYI moves with the drag operation. The mobile phone 100 displays the window of iQIYI only after detecting that the icon of iQIYI is dragged to a specific display region (for example, the right-side display region).

In some embodiments, if the application in the "multi-task manager" is all applications on the mobile phone 100. As shown in FIG. 4A(b), after the mobile phone 100 detects the drag operation performed on the icon of iQIYI, the mobile phone 100 determines whether iQIYI runs; and if iQIYI does not run, enables iQIYI, and displays the interface shown in FIG. 4B(a). An initial interface of iQIYI after being enabled is displayed in the window of iQIYI in the interface. In other embodiments, as shown in FIG. 4A(b), after the mobile phone 100 detects the drag operation performed on the icon of iQIYI, the mobile phone 100 determines whether iQIYI runs; and if iQIYI does not run, displays the interface shown in FIG. 4B(a). The window of iQIYI in the interface is displayed in gray (to indicate that iQIYI is not enabled). After the mobile phone 100 detects that the window of iQIYI is moved to and then released in the right-side display region, as shown in FIG. 4B(b), the mobile phone 100 enables iQIYI, and displays the enabled initial interface in the window of iQIYI. In other embodiments, as shown in FIG. 4A(b), after the mobile phone 100 detects the drag operation performed on the icon of iQIYI, the mobile phone 100 determines whether iQIYI runs; and if iQIYI runs, displays the interface shown in FIG. 4B(a). A currently running interface of iQIYI (for example, a newly generated interface of iQIYI when iQIYI runs in the background) is displayed in the window of iQIYI in the interface.

In this embodiment, the user may drag a specific application in the interface of the "multi-task manager" to enable the application to run in the foreground through switching. A window of the application is displayed on the display screen. In addition, a display position of the window of the application may be determined by the user, to facilitate user operation.

Figure 4C:
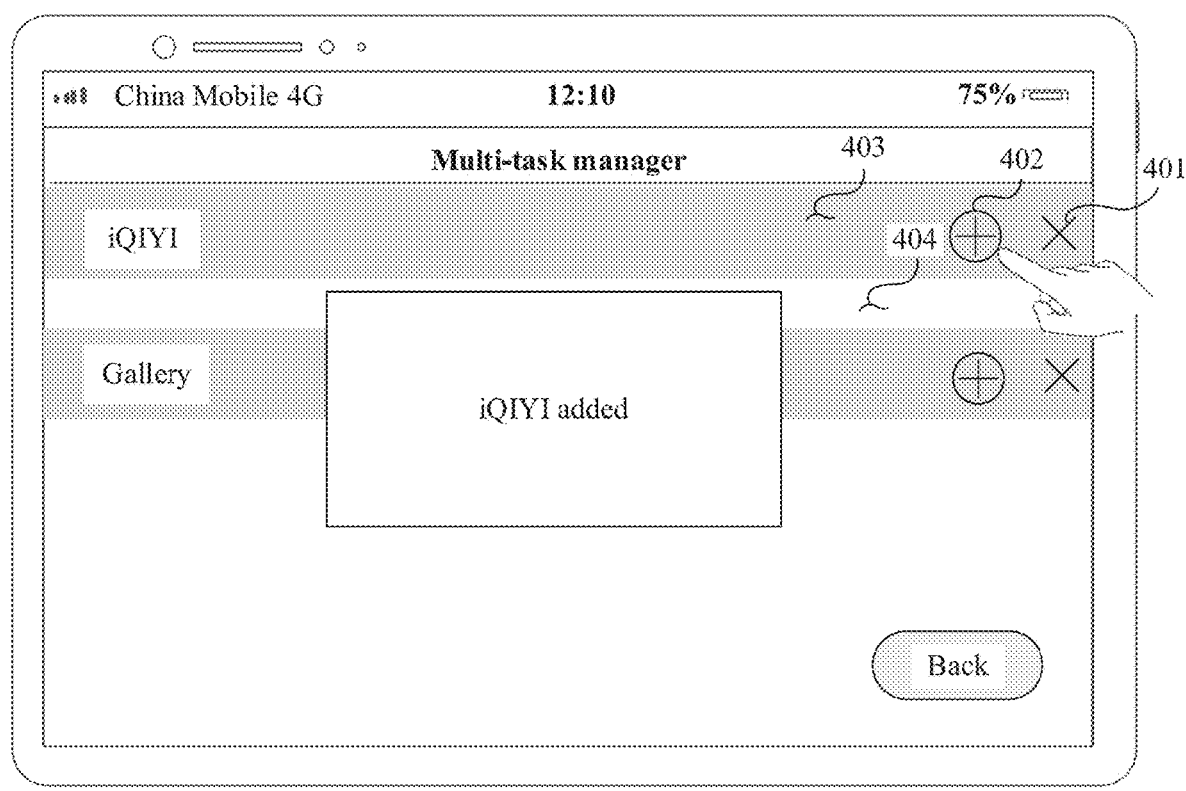
FIG. 4C is a schematic diagram of a user graphical interface of a mobile phone 100 according to an embodiment of this application.
Figure 4C:
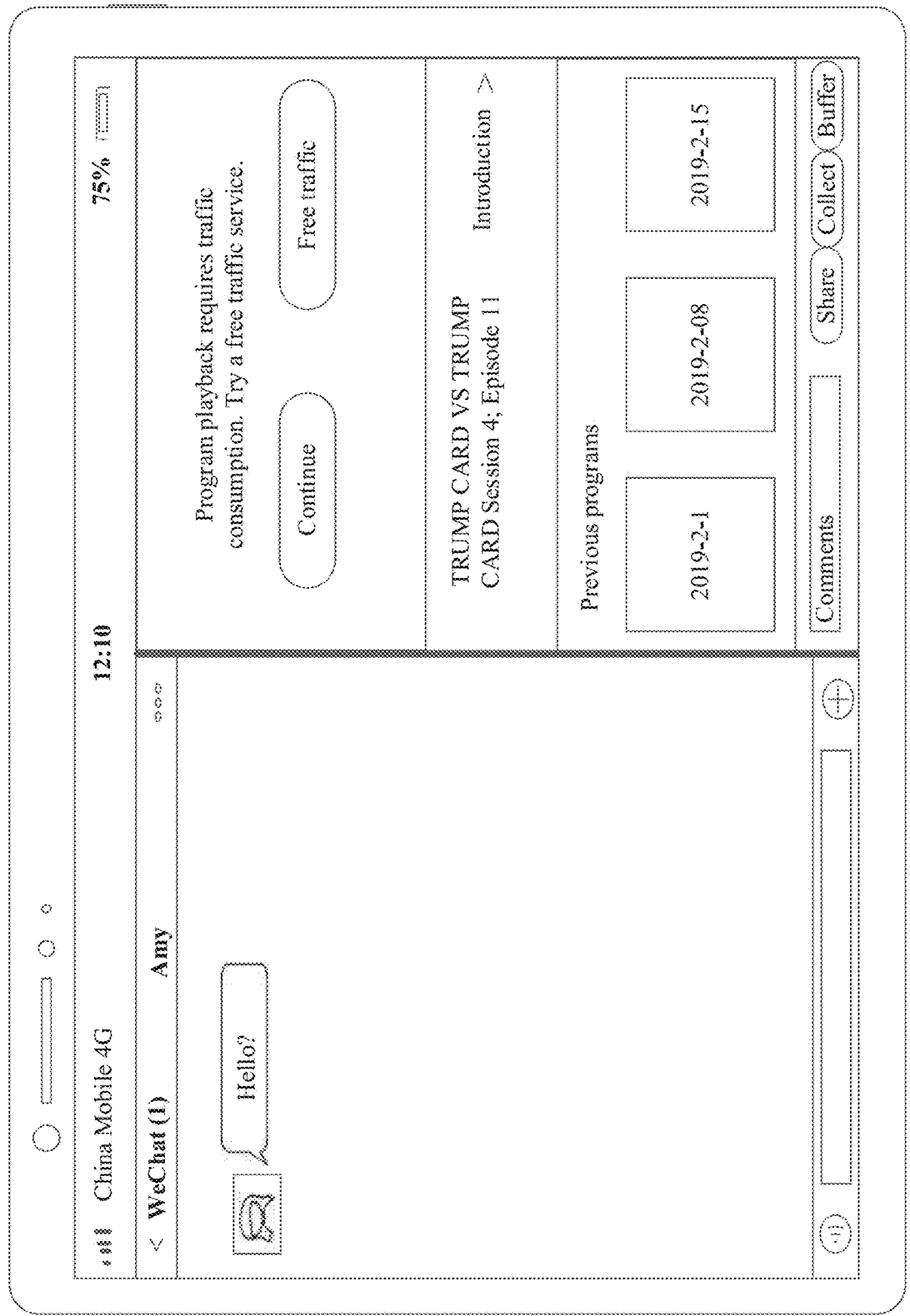

In other embodiments, still with reference to FIG. 4C(a), when the mobile phone 100 detects an operation performed on the add control 402 corresponding to the identifier of the iQIYI application, the mobile phone 100 enables the iQIYI application to run in the foreground through switching. Therefore, as shown in FIG. 4C(b), the window of the iQIYI application is displayed on the display screen of the mobile phone 100. For example, when the mobile phone 100 detects an operation performed on the add control 403 corresponding to the identifier of the iQIYI application, the mobile phone 100 may display the iQIYI application in a right-side display region, a left-side display region, an upper-side display region, a lower-side display region, or the like. For example, a window of an added application may be set in the left-side/right-side/upper-side/lower-side display region by the user, or may be set by default before the mobile phone 100 is delivered from a factory.

In some examples, when the mobile phone 100 detects the operation performed on the add control 402 corresponding to the identifier of the iQIYI application, the mobile phone 100 may jump to an interface shown in FIG. 4C(b).

In other examples, still with reference to FIG. 4C(a), when the mobile phone 100 detects the operation performed on the add control 403 corresponding to the identifier of the iQIYI application, the mobile phone 100 may output prompt information "iQIYI added". The user may continue to perform an operation on the interface of the "multi-task manager" (for example, continue to add another application). For example, the interface 401 of the "multi-task manager" may further include a "back" control 406. When the mobile phone 100 detects that the "back" control 406 is triggered, the mobile phone 100 displays the interface shown in FIG. 4C(b).

In some embodiments, if an application list displayed in the interface of the "multi-task manager" application is an application running in the background, after the mobile phone 100 detects the add key 402 corresponding to the identifier of the "iQIYI" application, the currently running interface of iQIYI is displayed in the right-side display region in the interface of the mobile phone 100 shown in FIG. 4C(b). If an application list displayed in the interface of the "multi-task manager" application is all applications, after the mobile phone 100 detects the add key 402 corresponding to the identifier of the "iQIYI" application, the mobile phone 100 determines whether the iQIYI application runs; and if the iQIYI application does not run, enables the iQIYI application. The initial interface of iQIYI after being enabled is displayed in the right-side display region in the interface displayed by the mobile phone 100 shown in FIG. 4C(b).

Figure 4D:
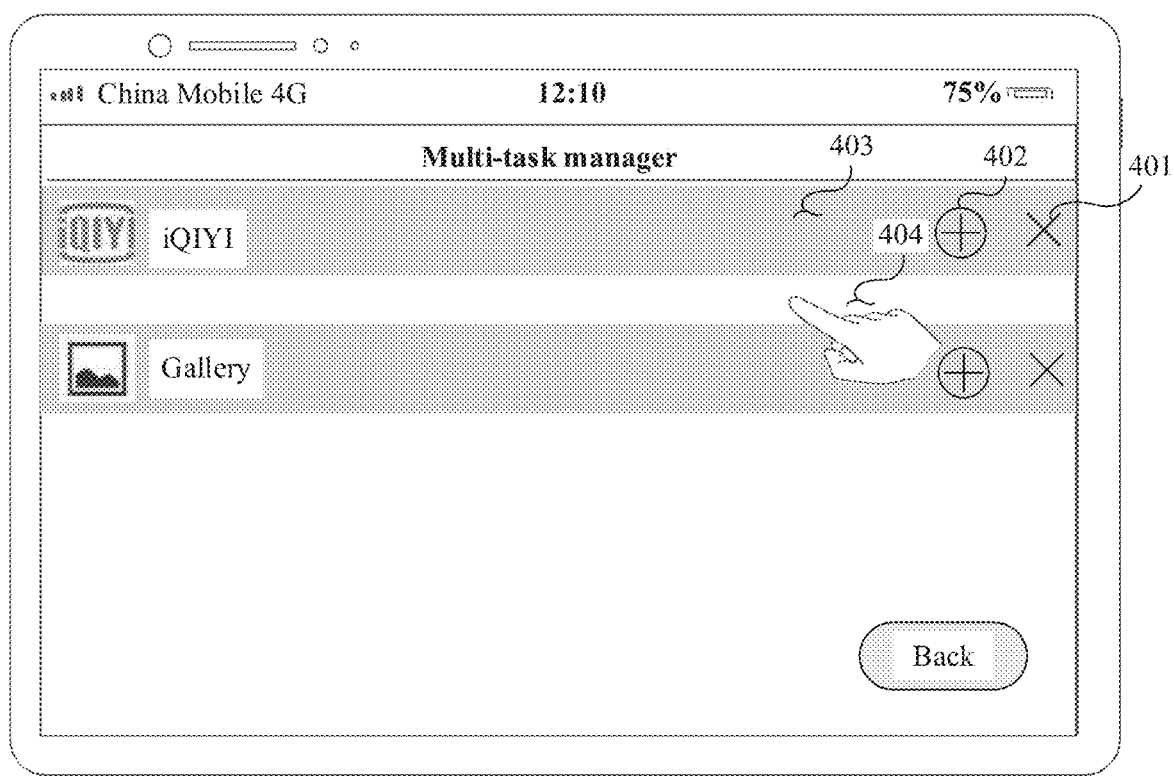
FIG. 4D is a schematic diagram of a user graphical interface of a mobile phone 100 according to an embodiment of this application.
Figure 4D:
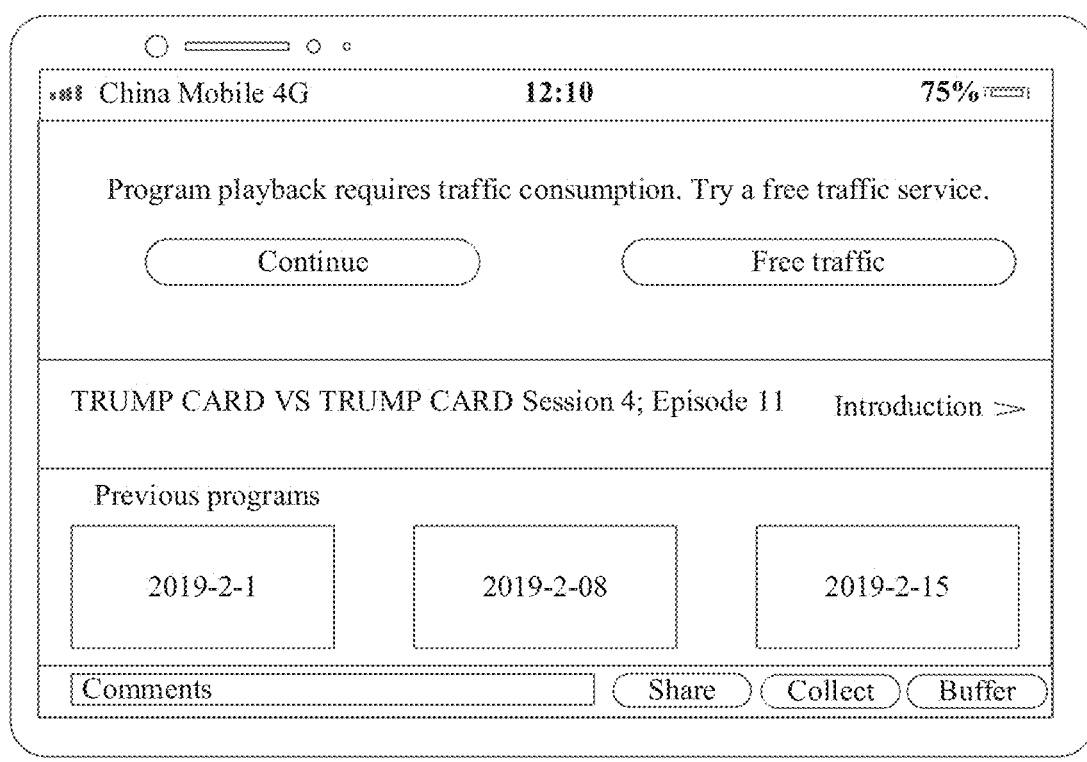

In other embodiments, for example, in FIG. 4D(a), when the mobile phone 100 detects an operation such as a tap operation, a double-tap operation, or a touch-and-hold operation performed on the operable region 404 corresponding to the identifier of the "iQIYI" application (for example, any position in a white region corresponding to the identifier of the iQIYI application), the mobile phone 100 displays an interface shown in FIG. 4D(b). The interface is an interface of the iQIYI application in the foreground that is switched from the iQIYI application in the background. In other words, the mobile phone 100 may close the window of the WeChat application, and display the interface of the iQIYI application running in the background. In some embodiments, that the mobile phone 100 closes the window of the WeChat application may be that the WeChat application is closed or the WeChat application stays and runs in the background but the interface of the WeChat application is not displayed. If the WeChat application still runs in the background, when the mobile phone 100 detects again an operation for opening the "multi-task manager" application, the identifier of the WeChat application is added to the interface of the "multi-task manager" application.

If the application list displayed in the interface of the "multi-task manager" application is an application running in the background, when the mobile phone 100 detects an operation performed on the operable region 404 corresponding to the identifier of the "iQIYI" application, the currently running interface of the iQIYI application is the interface displayed on the mobile phone 100 shown in FIG. 4D(b). If the application list displayed in the interface of the "multi-task manager" application is all applications, when the mobile phone 100 detects an operation performed on the operable region 404 corresponding to the identifier of the "iQIYI" application, the mobile phone 100 determines whether the iQIYI application runs in the background; and if the iQIYI application does not run in the background, enables the iQIYI application. The initial interface of iQIYI after being enabled is the interface displayed on the mobile phone 100 shown in FIG. 4B(b).

In another embodiment, when the mobile phone 100 detects an operation performed on the close control 401 corresponding to the identifier of the iQIYI application, the mobile phone 100 may close the iQIYI application (for example, close/exit the iQIYI application when the iQIYI application currently runs), or delete the iQIYI application from the interface of the "multi-task manager" but not close the iQIYI application.

Example 2

The interface of the "multi-task manager" may be alternatively presented in another manner. For example, with reference to FIG. 4E(a), the interface of the "multi-task manager" includes an application list. An application identifier (for example, an application name or an application icon) may be displayed in each row of the application list, and one or more controls may be further displayed in each row of the application list, for example, a close control 402, an add control 403, a drag control 404, and a cover control 405. It should be noted that a name of a control in this specification is merely an example. In an actual product design, the name of the control may be any name; or the control is identified by using an icon, an image, or the like instead of a text. This is not limited in this specification.

In some embodiments, for example, in FIG. 4A, the mobile phone 100 detects a gesture operation in the interface of the WeChat application, and switches to the interface of the "multi-task manager". Related information of the WeChat application (for example, the identifier of the WeChat application, or one or more controls corresponding to the identifier of the WeChat application) may be not displayed in the interface of the "multi-task manager". Alternatively, the identifier of the WeChat application may be displayed in the interface of the "multi-task manager", but the add control, the cover control, the drag control, and/or the like corresponding to the identifier of the WeChat application may be not displayed in the interface of the "multi-task manager". Alternatively; one or more controls corresponding to the identifier of the WeChat application may be displayed in gray (to indicate that the controls do not respond) in the interface of the "multi-task manager". Alternatively, one or more controls corresponding to the identifier of the WeChat application may be displayed in the interface of the "multi-task manager". When the mobile phone 100 detects that the user triggers the control, the mobile phone 100 outputs prompt information to prompt the user that the application runs in the foreground.

In some embodiments, for example operations performed on the close control 402 and the add control 403, refer to the description of Example 1 above. Details are not described herein again.

Figure 4E:
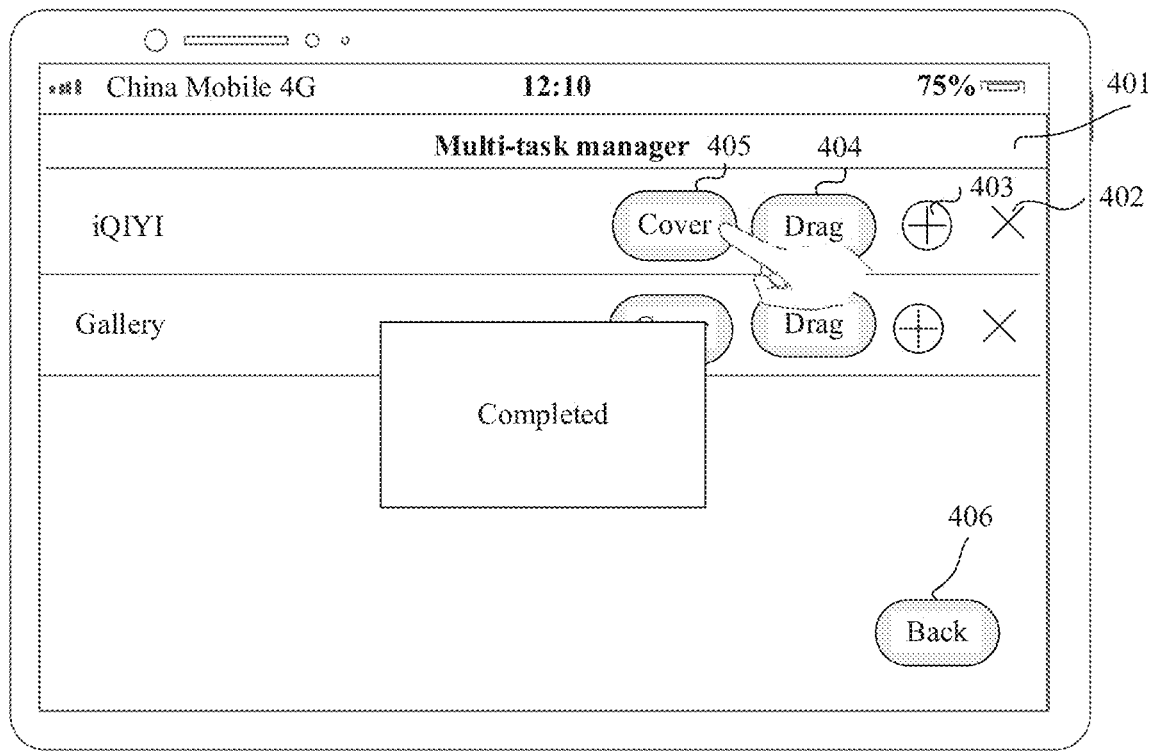
FIG. 4E is a schematic diagram of a user graphical interface of a mobile phone 100 according to an embodiment of this application.
Figure 4E:
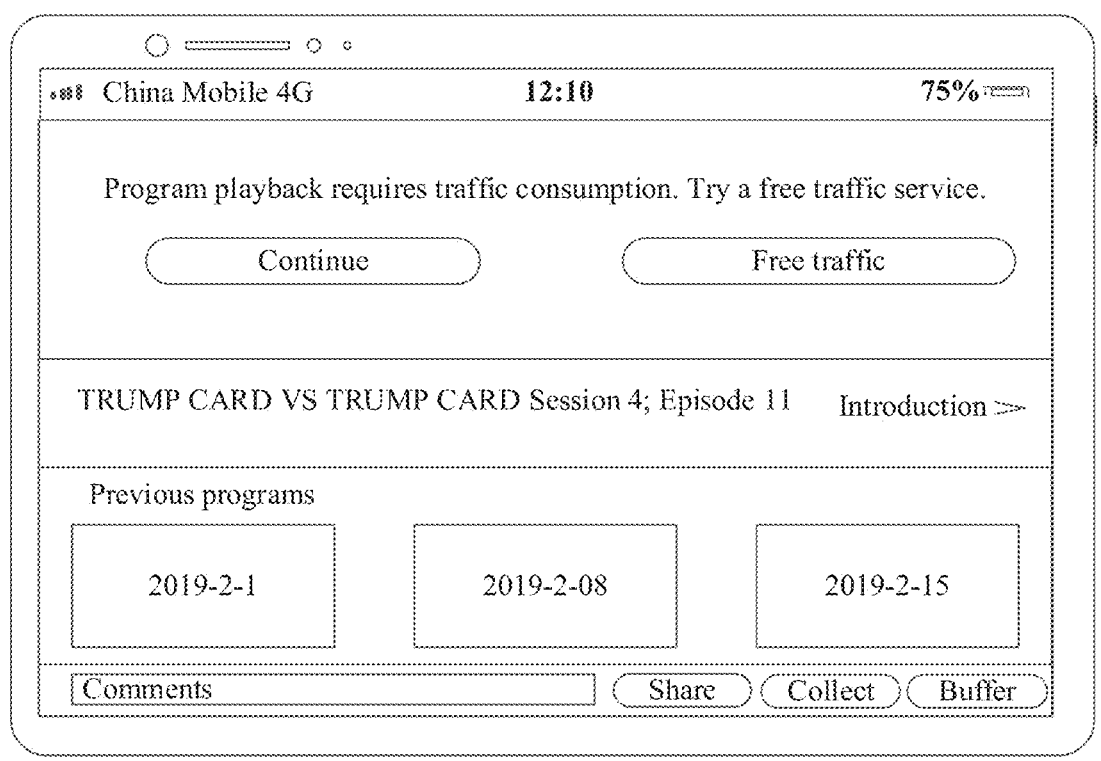

In other embodiments, with reference to FIG. 4E(a), when the mobile phone 100 detects that the "cover" control 405 corresponding to the identifier of the iQIYI application is triggered, as shown in FIG. 4E(b), the mobile phone 100 may close the window of the WeChat application, and display only the window of the iQIYI application. For example, the mobile phone 100 may run the WeChat application in the background, or exit the WeChat application. For example, with reference to FIG. 4E(a), when the mobile phone 100 detects an operation performed on the "cover" control 405, the mobile phone 100 may automatically display an interface shown in FIG. 4E(b); or when the mobile phone 100 detects an operation performed on the "cover" control 405, the mobile phone 100 may display prompt information "completed". The user may continue to perform an operation on the interface of the "multi-task manager". When the mobile phone 100 detects an operation of triggering the "back" control 406, the mobile phone 100 displays the interface shown in FIG. 4E(b).

Figure 4F:
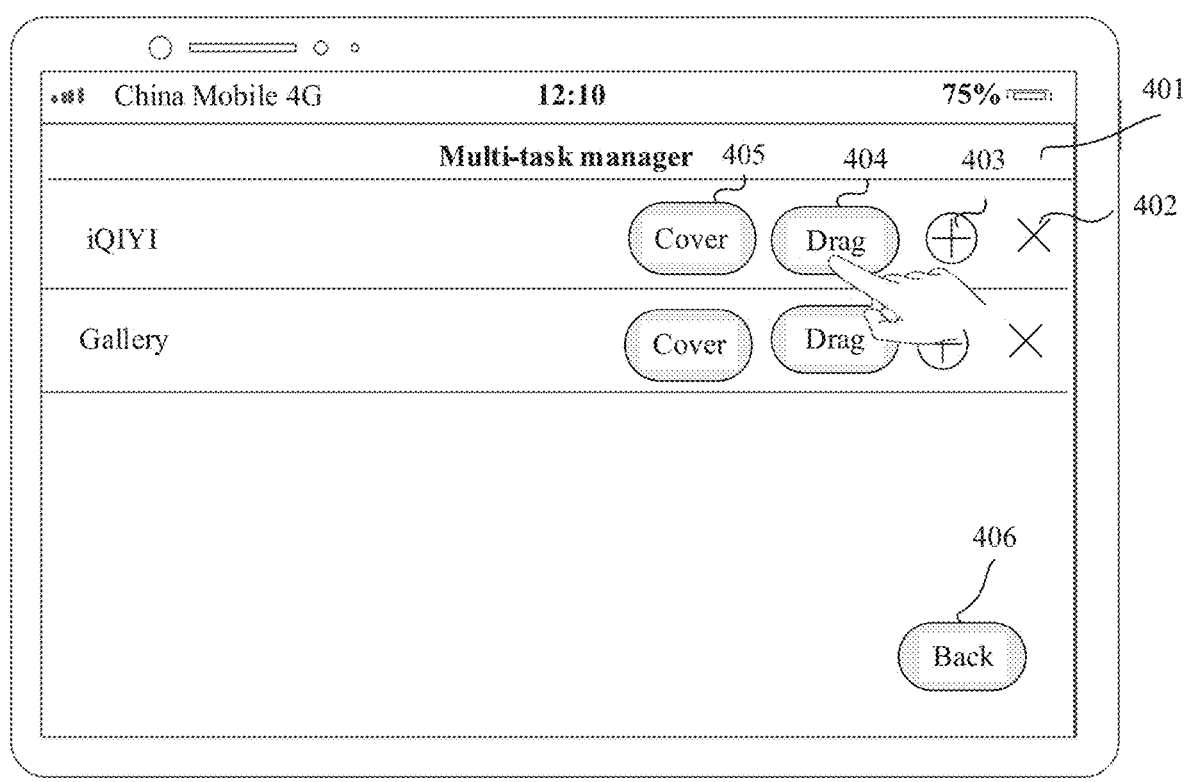
FIG. 4F is a schematic diagram of a user graphical interface of a mobile phone 100 according to an embodiment of this application.
Figure 4F:
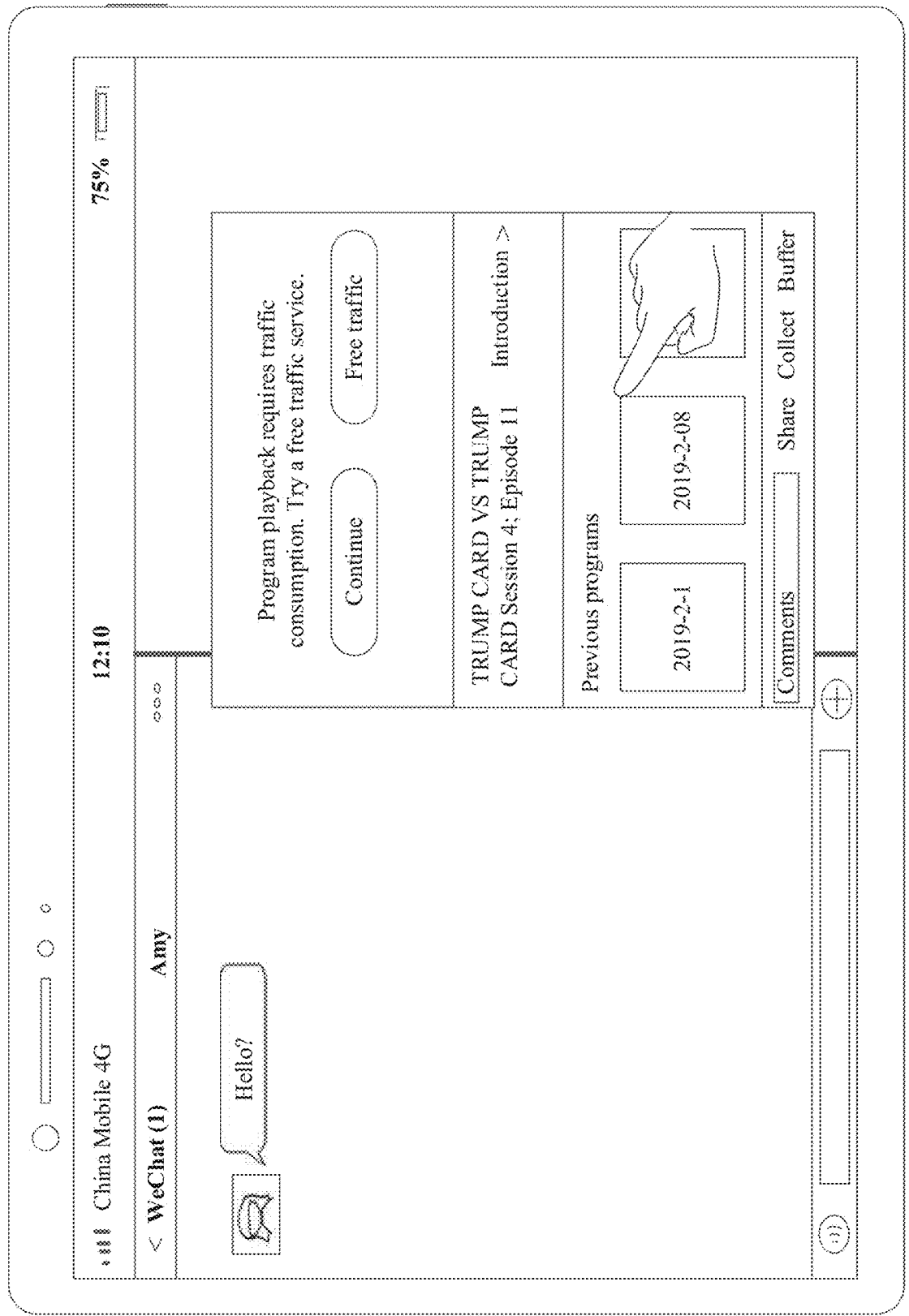
Figure 4F:
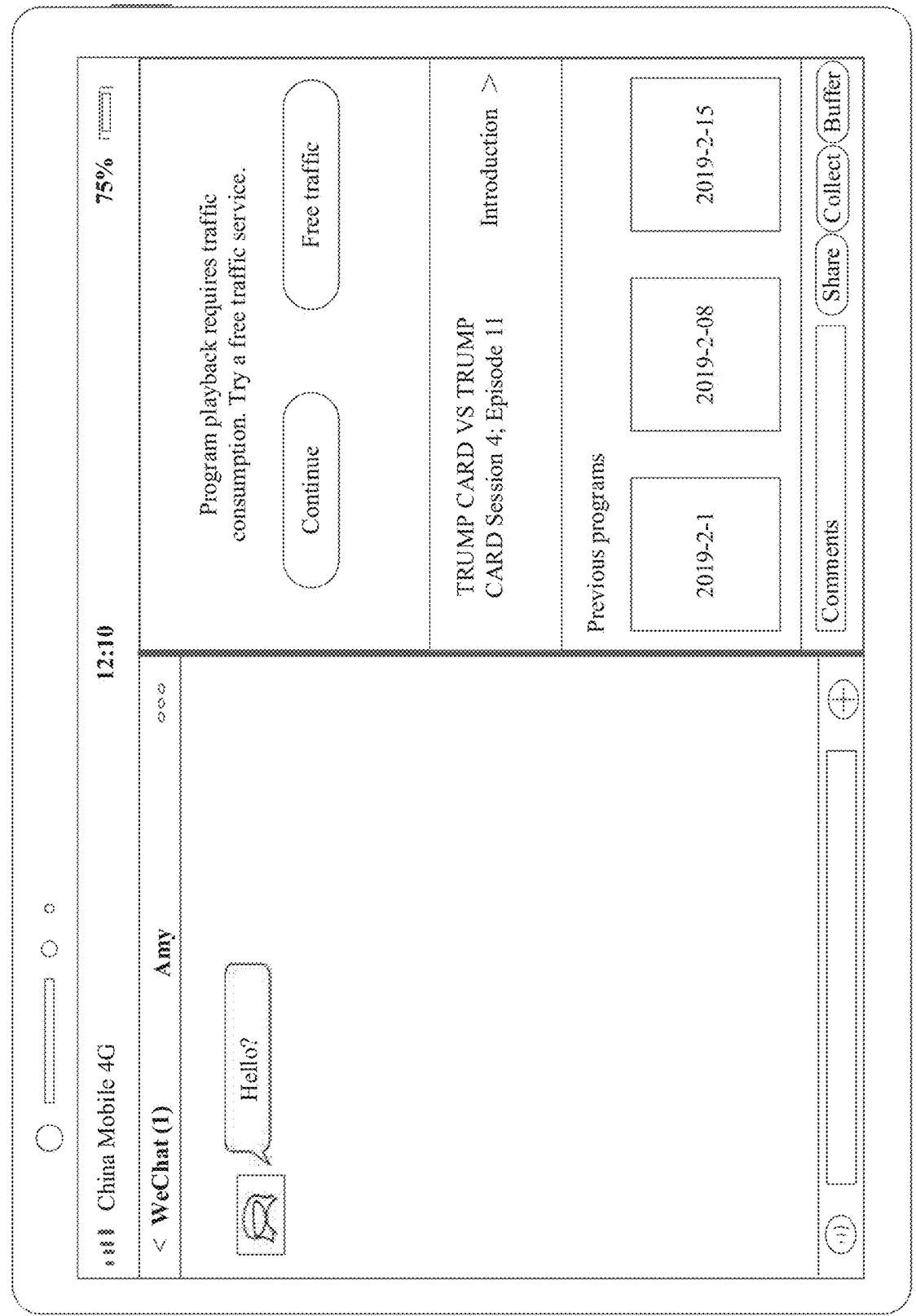
Figure 4F:
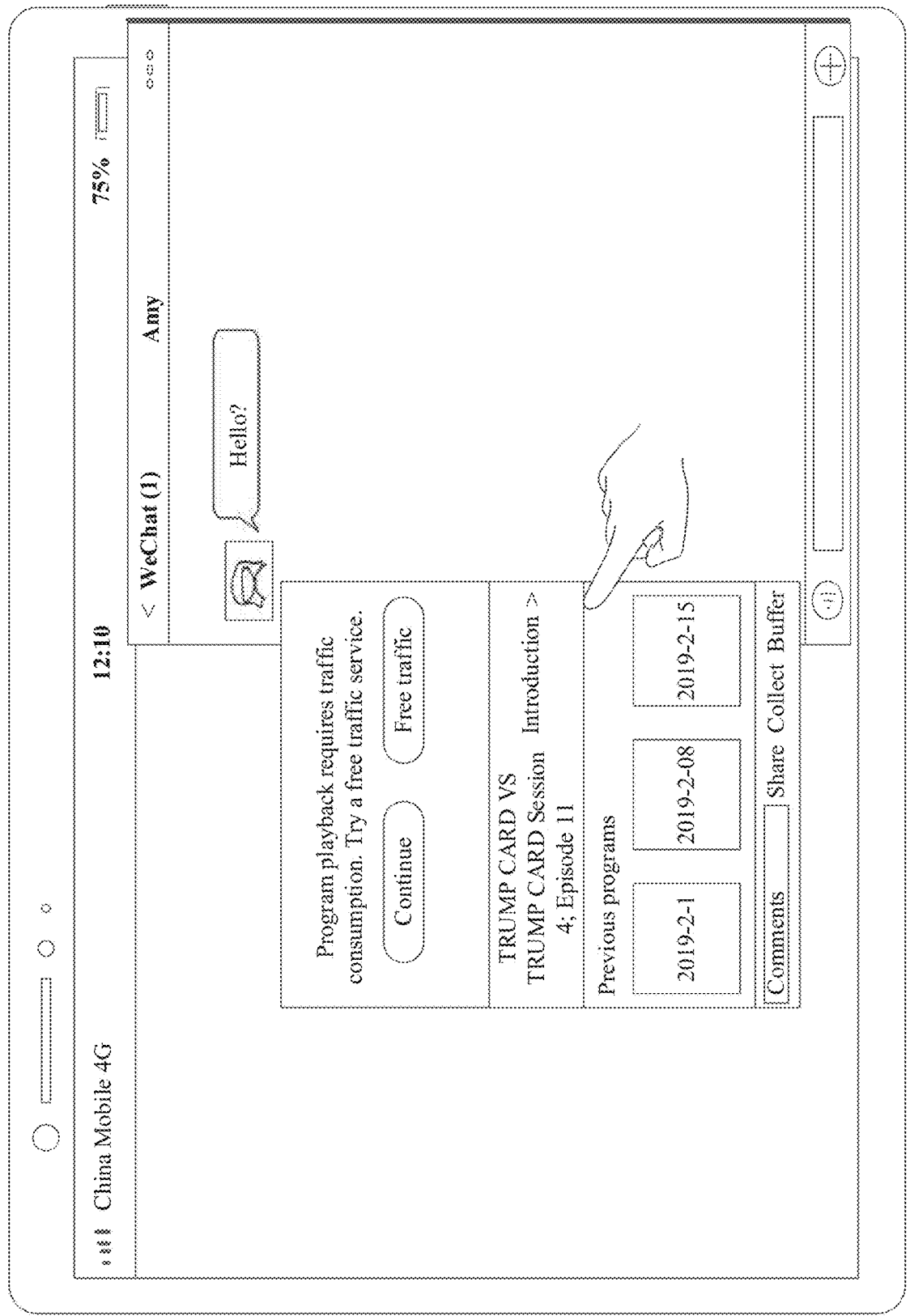
Figure 4F:
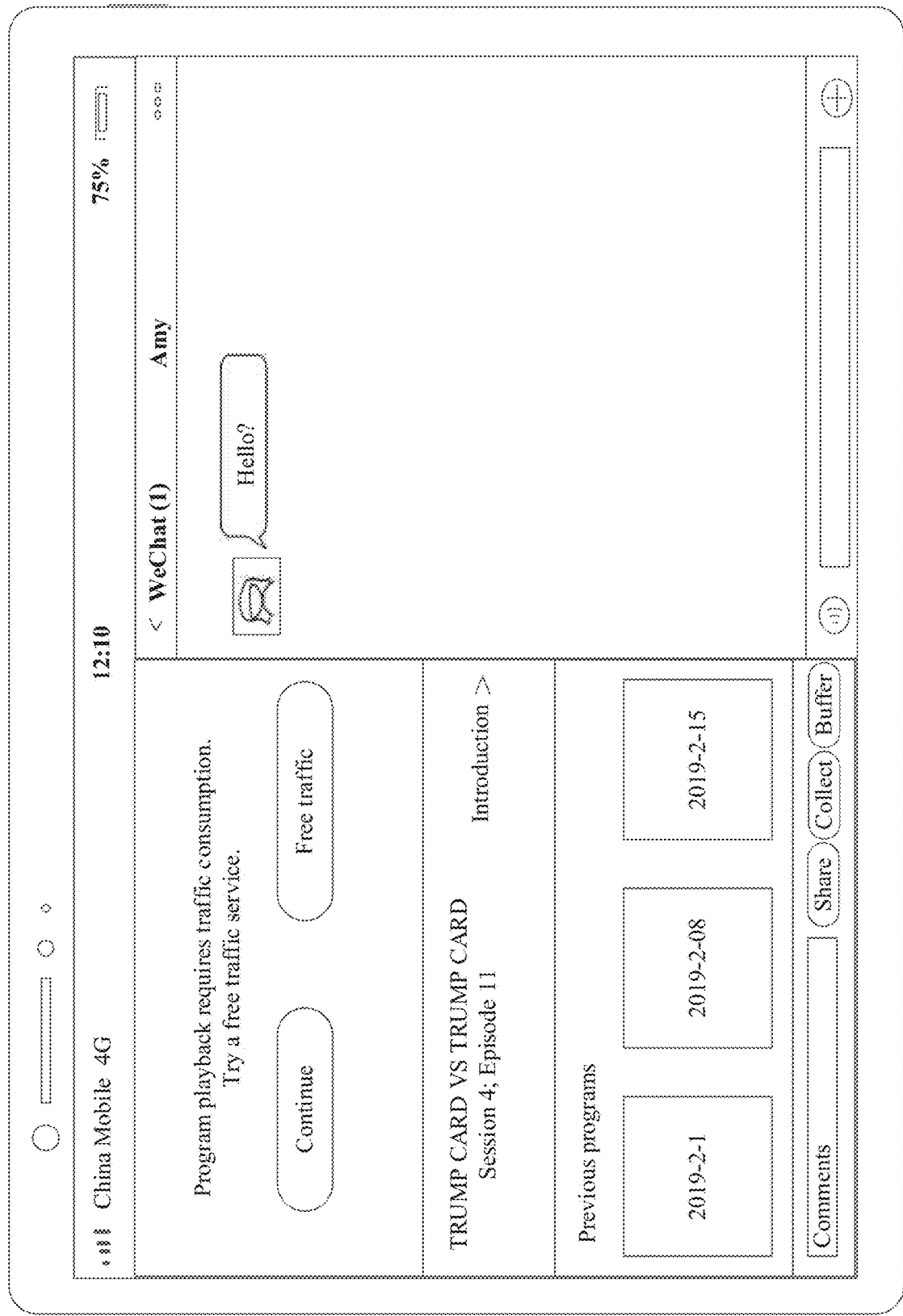

In another embodiment, as shown in FIG. 4F(a), when the mobile phone 100 detects an operation (for example, a drag operation) performed on the "drag" control 404 corresponding to the identifier of the iQIYI application, the mobile phone 100 displays an interface shown in FIG. 4F(b). The interface includes two display regions. One display region is used to display the window of the WeChat application, and the other display region is a blank region. The interface is further used to display the window of the iQIYI application. A position of the window of the iQIYI application may be moved under the drag operation. For example, with reference to FIG. 4F(b), when the mobile phone 100 detects that the window of the iQIYI application is dragged to a right-side display region (an overlapping area between the window of the iQIYI application and the blank region of the right-side display region is greater than a preset area), the mobile phone 100 automatically moves the window of the WeChat application to a left-side display region to display the window. When the mobile phone 100 detects that the window of the iQIYI application is released, with reference to FIG. 4F(c), the mobile phone 100 displays the window of the iQIYI application in the right-side display region. Alternatively, with reference to FIG. 4F(d), when the mobile phone 100 detects that the window of the iQIYI application is dragged to a left-side display region (an overlapping area between the window of the iQIYI application and the left-side display region is greater than a preset area), the mobile phone 100 automatically moves the window of the WeChat application to a right-side display region to display the window. When the mobile phone 100 detects that the window of the iQIYI application is released, with reference to FIG. 4F(e), the mobile phone 100 displays the window of the iQIYI application in the left-side display region.

In an example shown in FIG. 4F, the mobile phone 100 may place, according to a user requirement, the window of the iQIYI application in a display region in which the user wants to place the window.

Figure 4G:
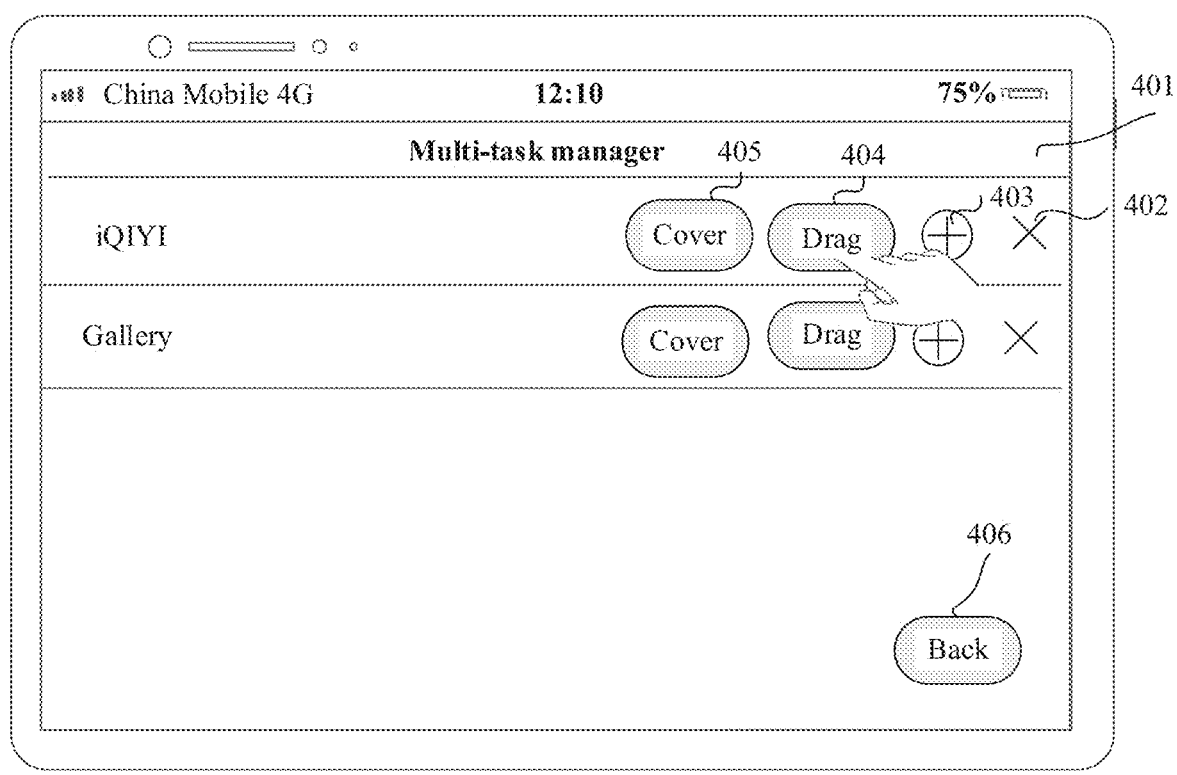
FIG. 4G is a schematic diagram of a user graphical interface of a mobile phone 100 according to an embodiment of this application.
Figure 4G:
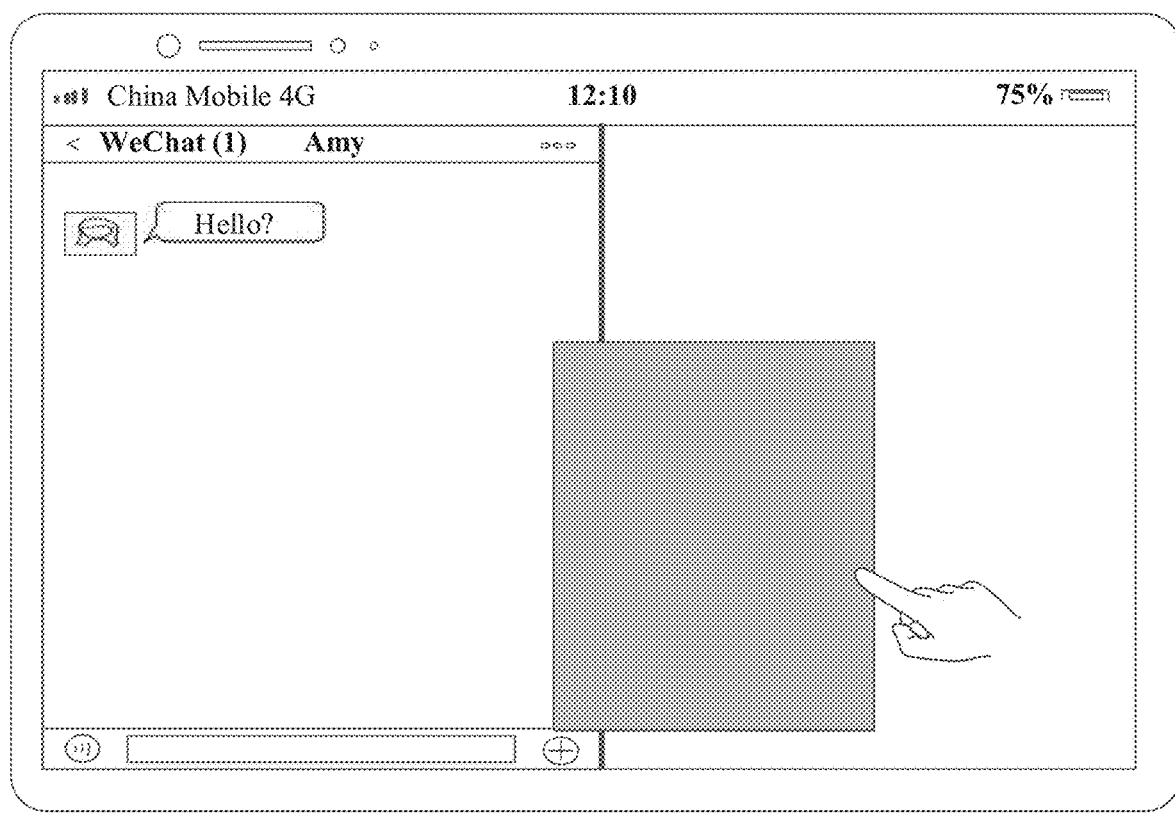
Figure 4G:
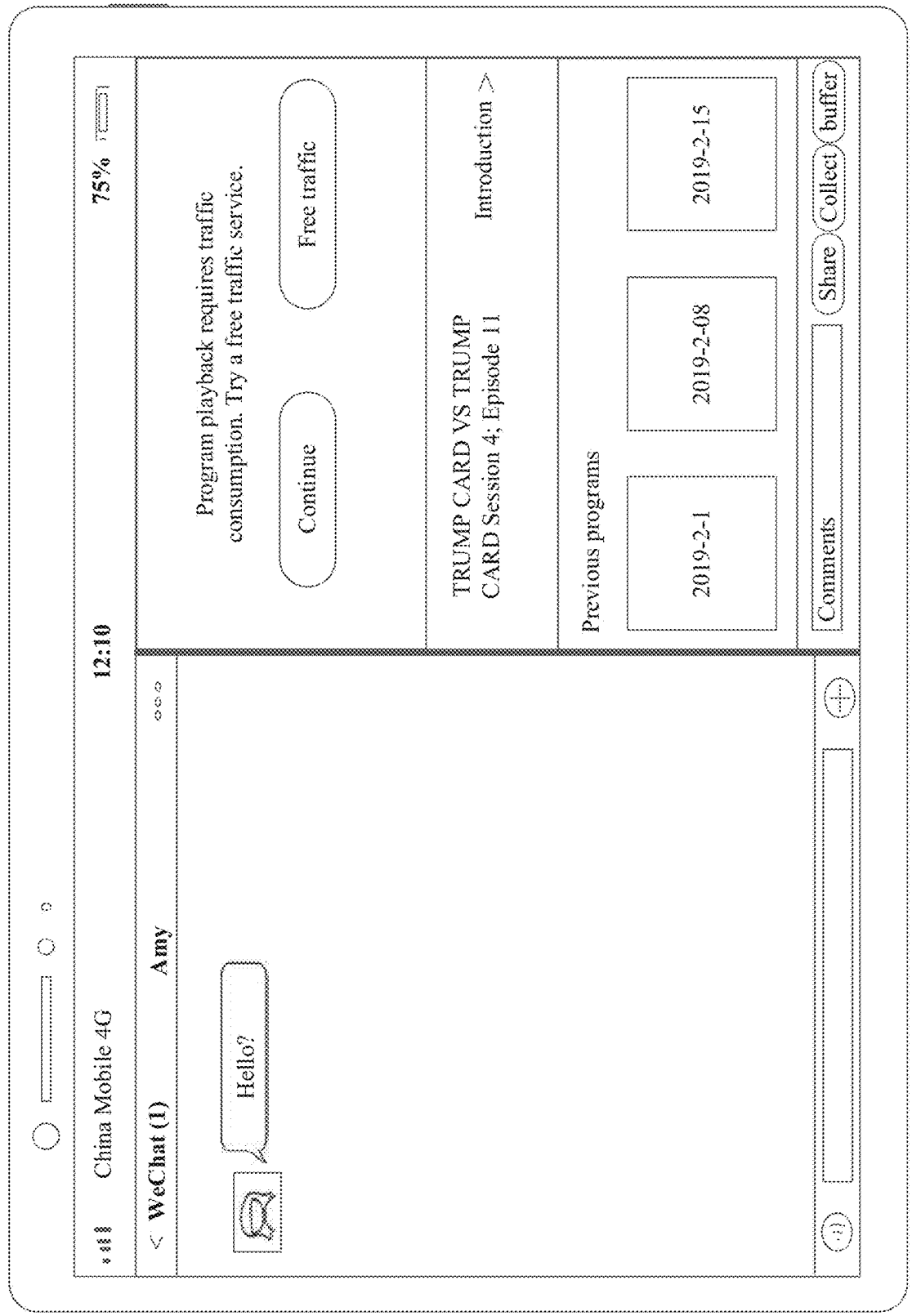

In some embodiments, if the application list displayed in the interface of the "multi-task manager" application is an identifier of an application running in the background, when the mobile phone 100 detects an operation performed on the "drag" control 404 corresponding to the identifier of the iQIYI application, as shown in FIG. 4F(b), the currently running interface of iQIYI is displayed in the window of the iQIYI application (a window that can be moved under the drag operation). In other embodiments, if identifiers of all applications on the mobile phone 100 are displayed in the interface of the "multi-task manager" application, after the mobile phone 100 detects an operation performed on the "drag" control 404 corresponding to the identifier of the iQIYI application, the mobile phone 100 displays an interface shown in FIG. 4G(b) when the mobile phone 100 determines that the iQIYI application is not an application running in the background. The interface includes two display regions. One display region is used to display the window of the WeChat application, and the other display region is a blank region. A scaled-down window (the window of the iQIYI application) is further displayed. The window is in a gray state (to indicate that the iQIYI application is not enabled). When the mobile phone 100 detects that the window is moved to and then released in the right-side display region, the mobile phone 100 enables the iQIYI application, and displays, in the right-side display region, the initial interface of the iQIYI application after being enabled.

Figure 4K:
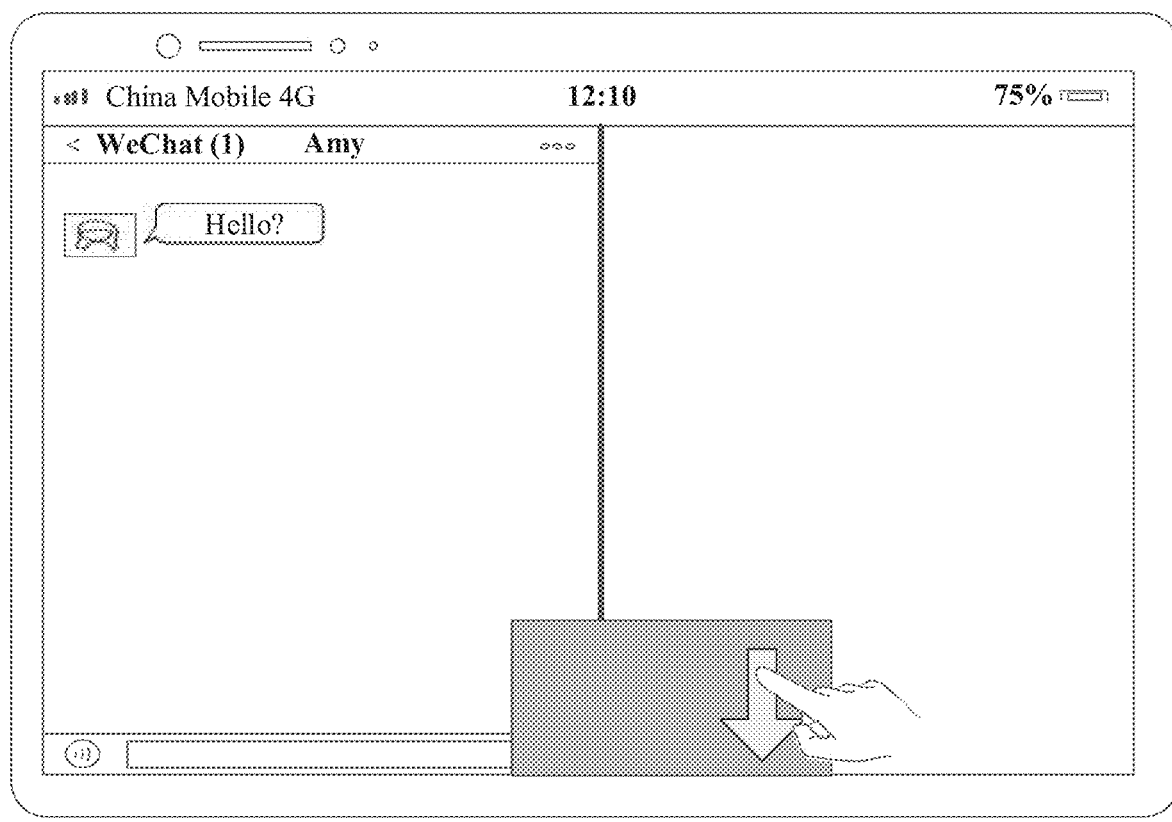
FIG. 4K is a schematic diagram of a user graphical interface of a mobile phone 100 according to an embodiment of this application.

For example, as shown in FIG. 4K, in a moving process of an application window displayed in gray (the iQIYI application is not enabled), if the mobile phone 100 detects that the window is dragged out of the display screen, the mobile phone 100 does not need to enable the iQIYI application.

Example 3

Figure 5A:
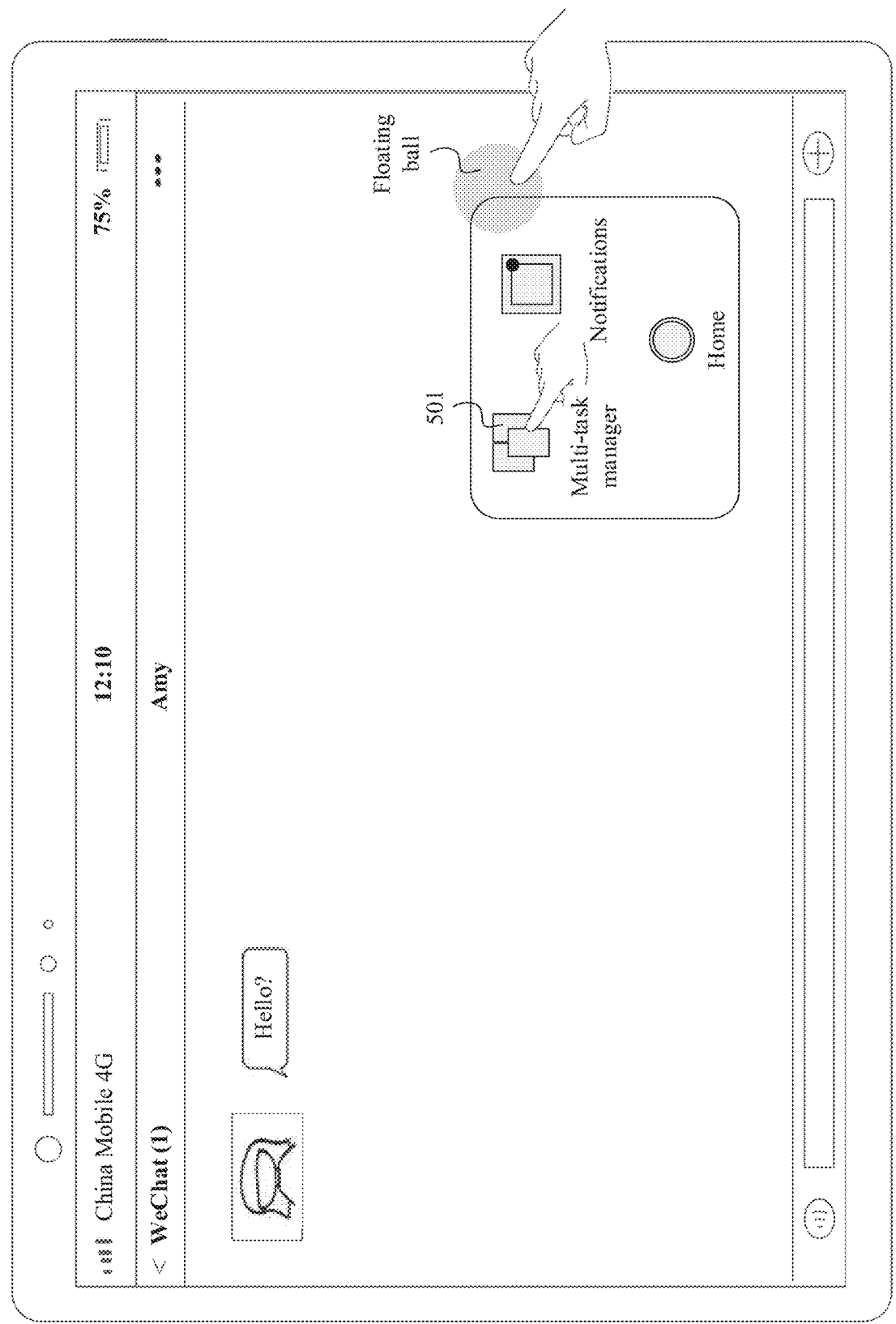
FIG. 5A is a schematic diagram of a user graphical interface of a mobile phone 100 according to an embodiment of this application.
Figure 5A:
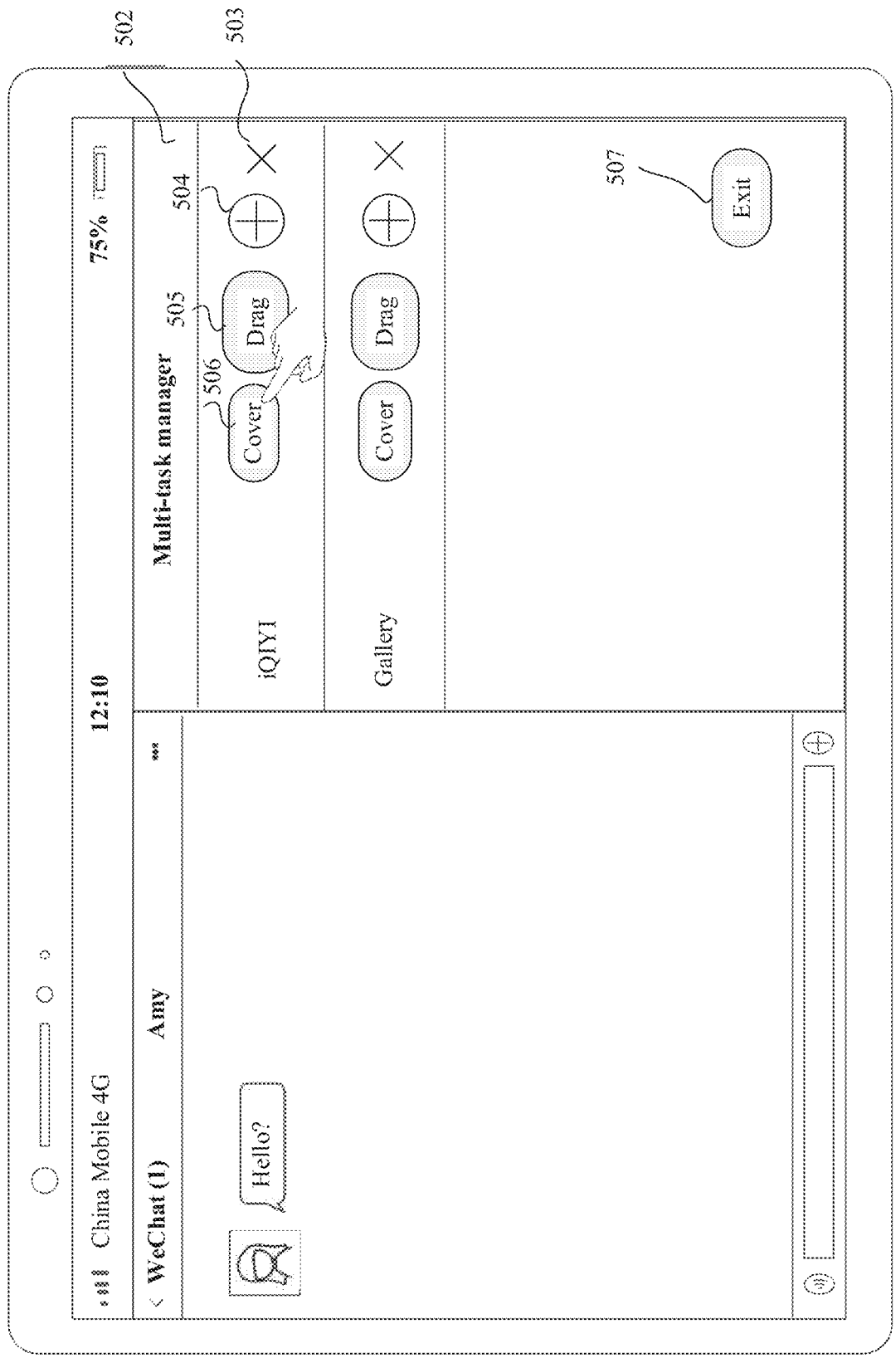

With reference to FIG. 5A(a), the mobile phone 100 displays the interface of the WeChat application. When the mobile phone 100 detects that the floating ball is triggered, the mobile phone 100 displays a "multi-task manager" control 501. When the mobile phone 100 detects that the "multi-task manager" control 501 is triggered, as shown in FIG. 5A(b), the mobile phone 100 displays the interface of the WeChat application in a left-side display region, and a "multi-task manager" interface 502 is displayed in a right-side display region.

Figure 5B:
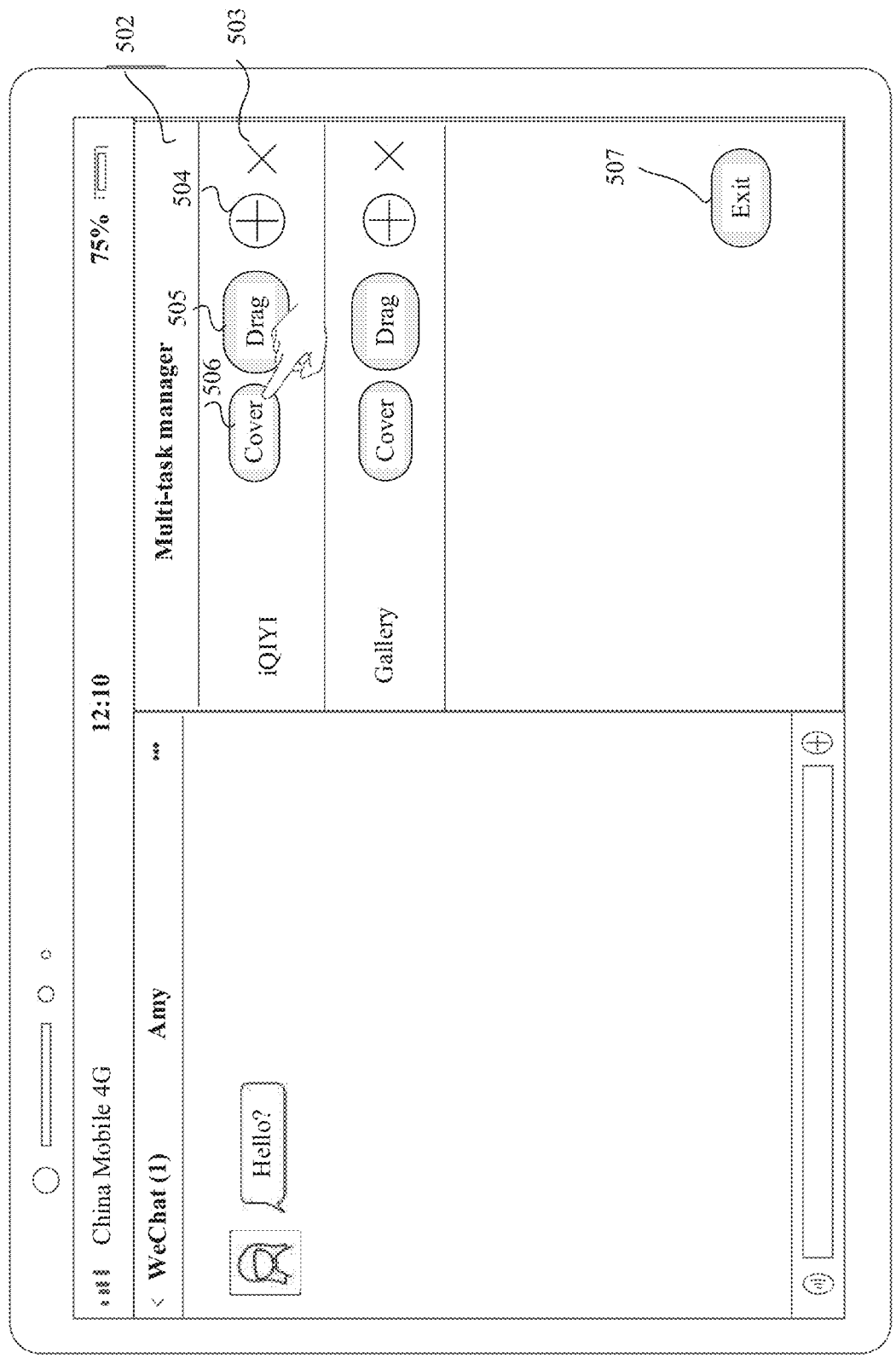
FIG. 5B is a schematic diagram of a user graphical interface of a mobile phone 100 according to an embodiment of this application.
Figure 5B:
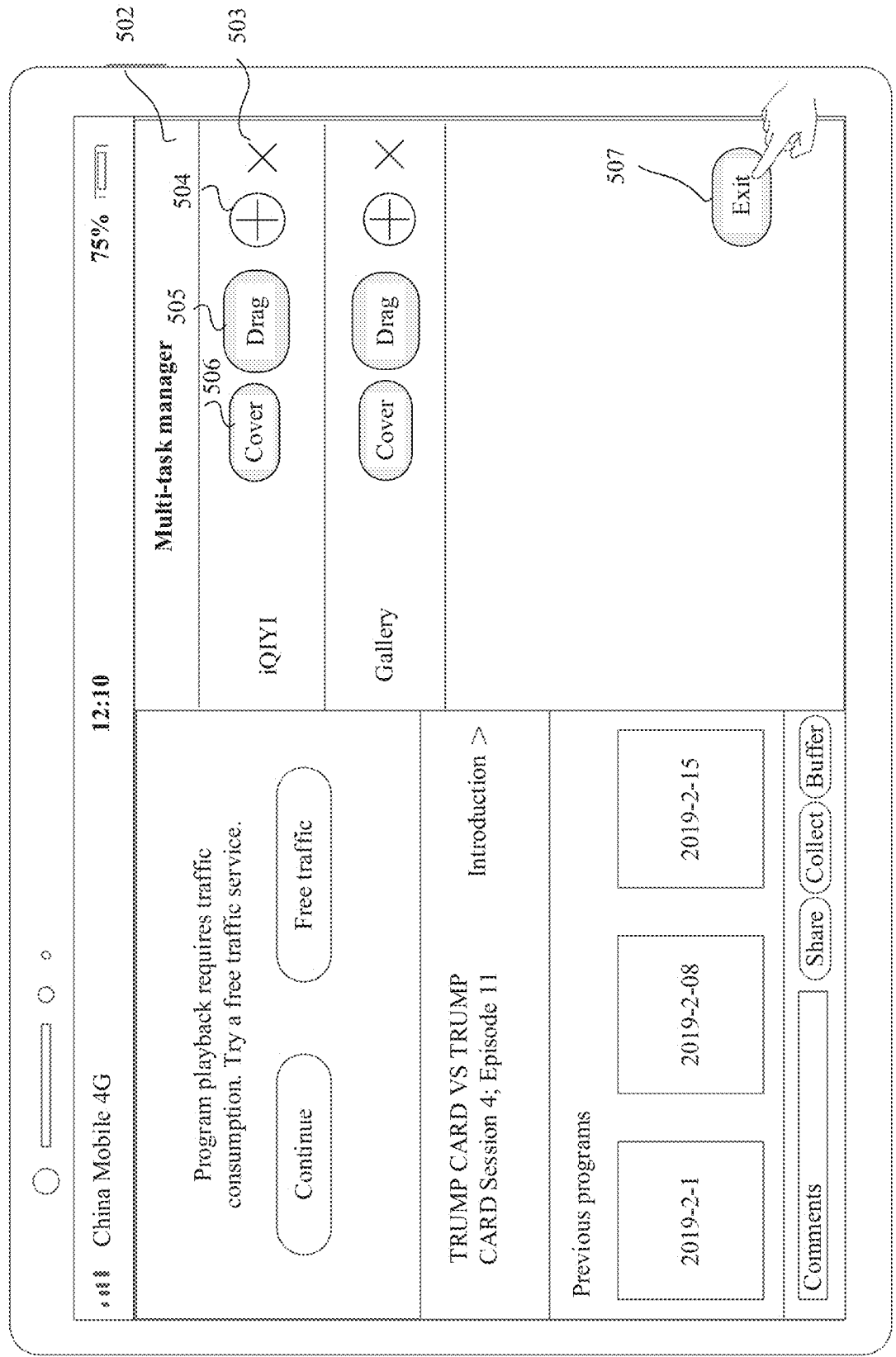
Figure 5B:
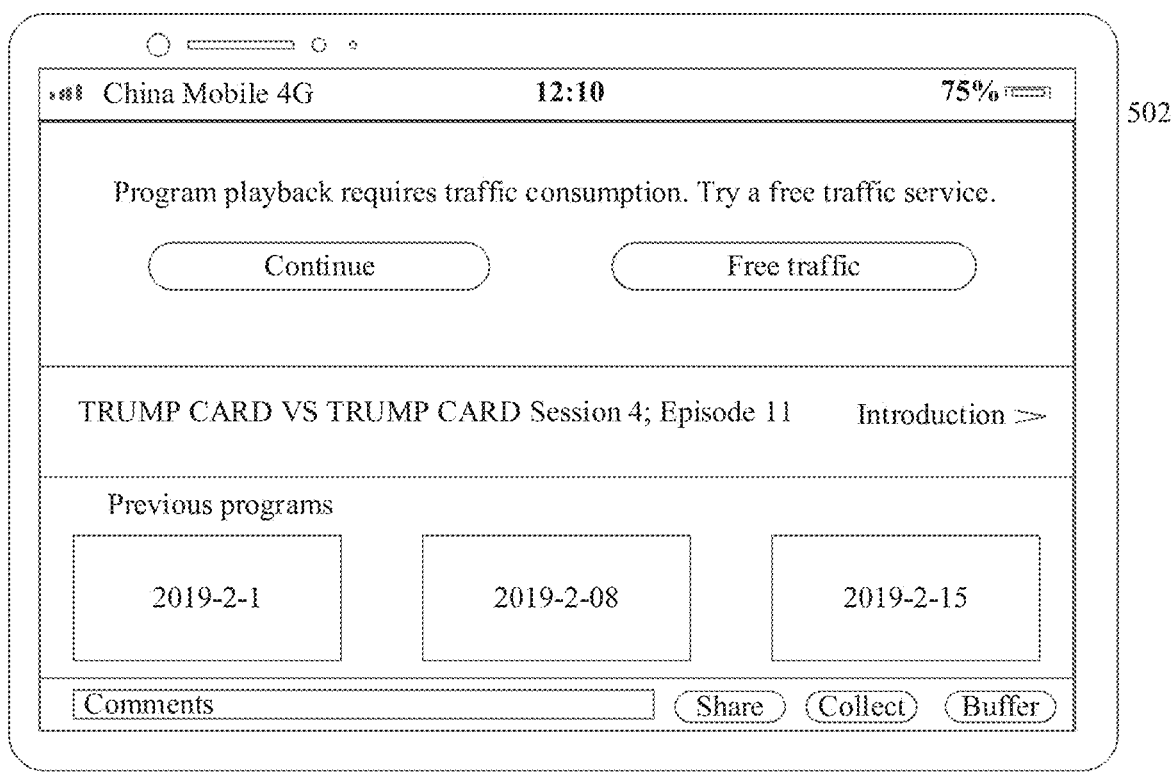

In some embodiments, with reference to FIG. 5B(a), when the mobile phone 100 detects that the user triggers a "cover" control 506, as shown in FIG. 5B(b), the mobile phone 100 closes the window of the WeChat application, and displays the window of the iQIYI application in the left-side display region. For example, when the mobile phone 100 detects that an "exit" control 507 in the interface of the "multi-task manager" application is triggered, as shown in FIG. 5B(c), the mobile phone 100 closes the window of the "multi-task manager" application, and the display screen of the mobile phone 100 displays only the window of the iQIYI application.

Figure 5C:
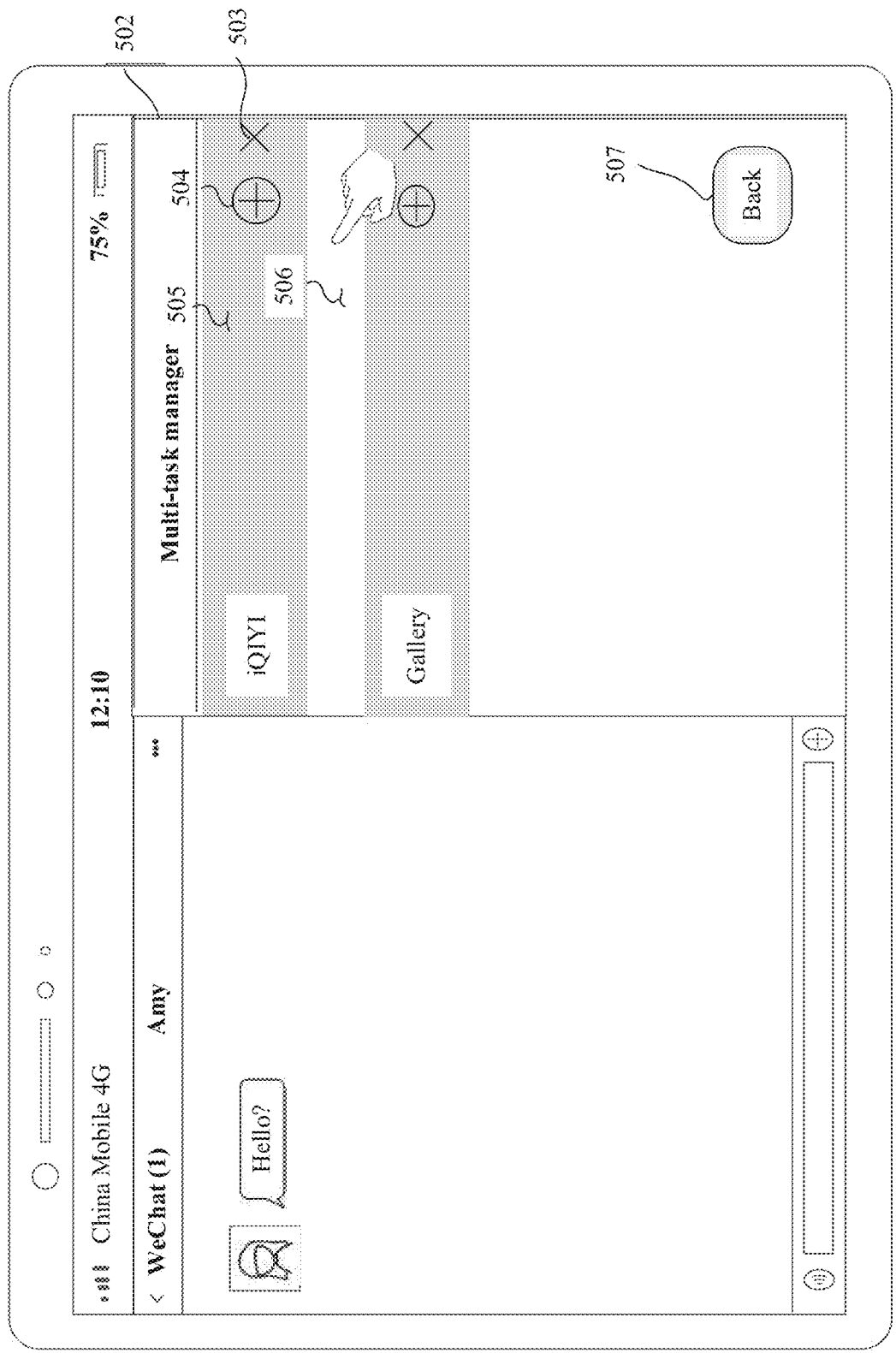
FIG. 5C is a schematic diagram of a user graphical interface of a mobile phone 100 according to an embodiment of this application.
Figure 5C:
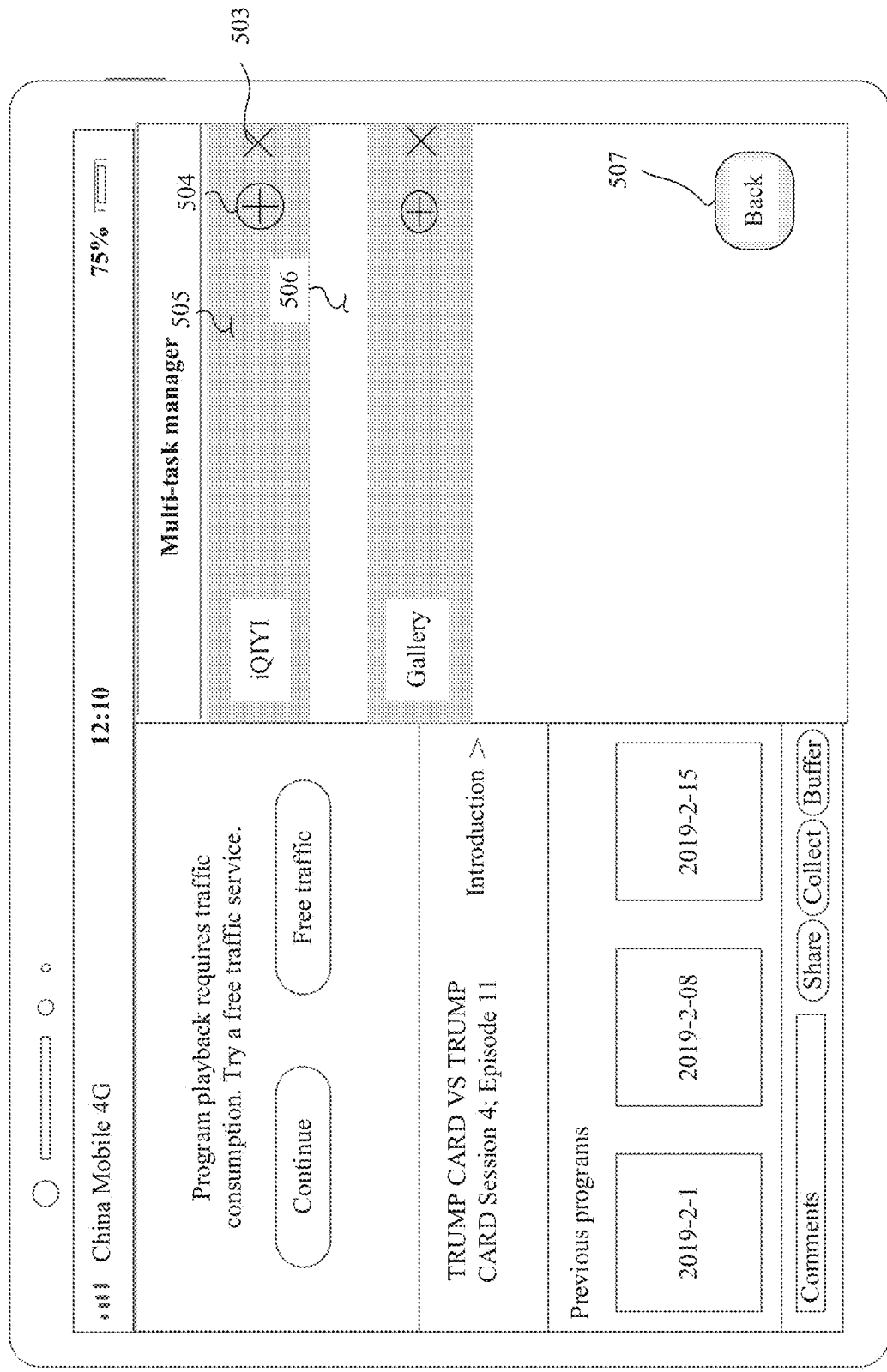

In other embodiments, the interface of the "multi-task manager" is displayed in another manner. For example, with reference to FIG. 5C(a), when the mobile phone 100 detects an operation performed on an operable region 506 corresponding to the identifier of the iQIYI application, as shown in FIG. 5C(b), the mobile phone closes the window of the WeChat application, and displays the window of the iQIYI application in the left-side display region.

Figure 5D:
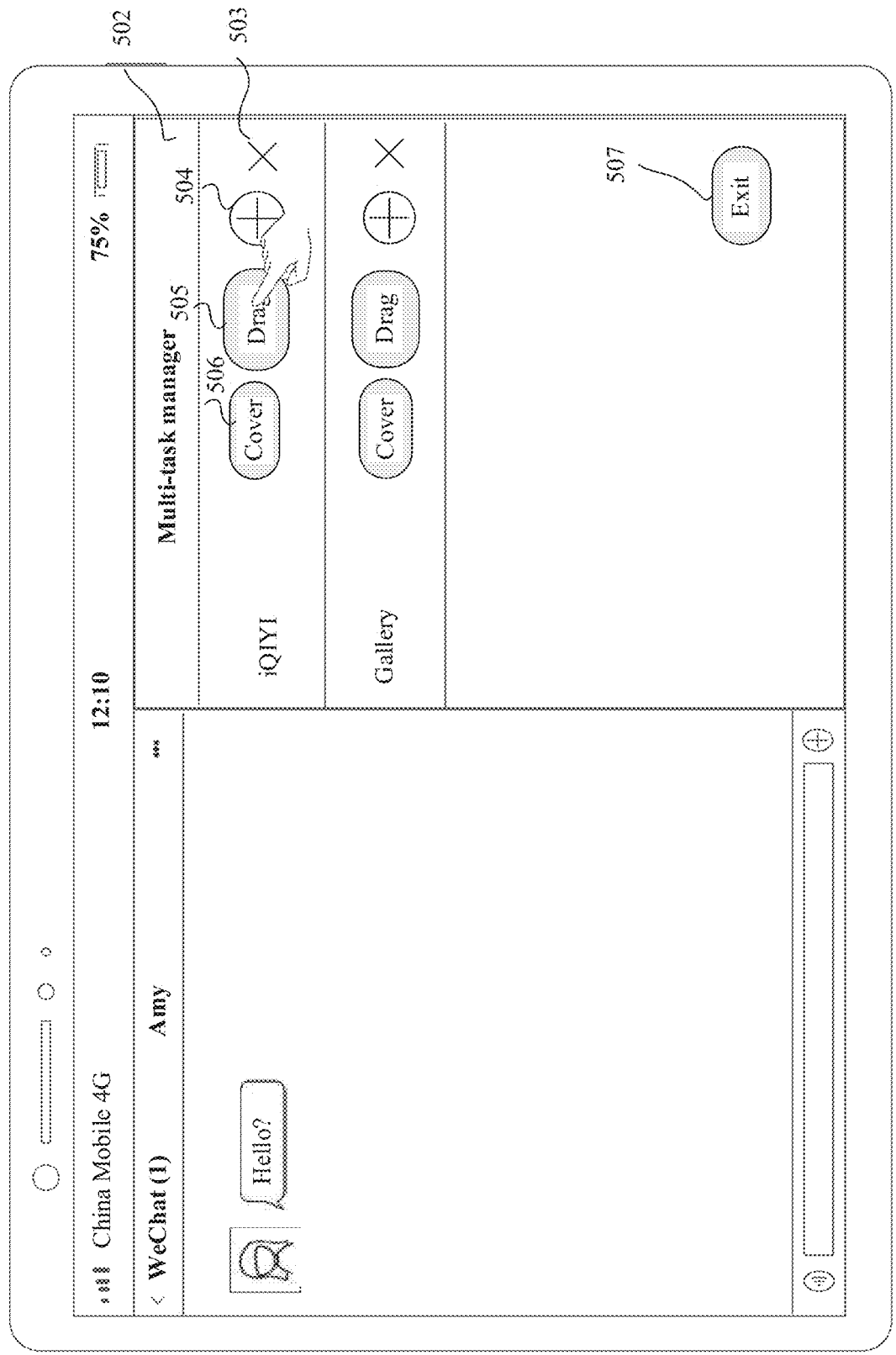
FIG. 5D is a schematic diagram of a user graphical interface of a mobile phone 100 according to an embodiment of this application.
Figure 5D:
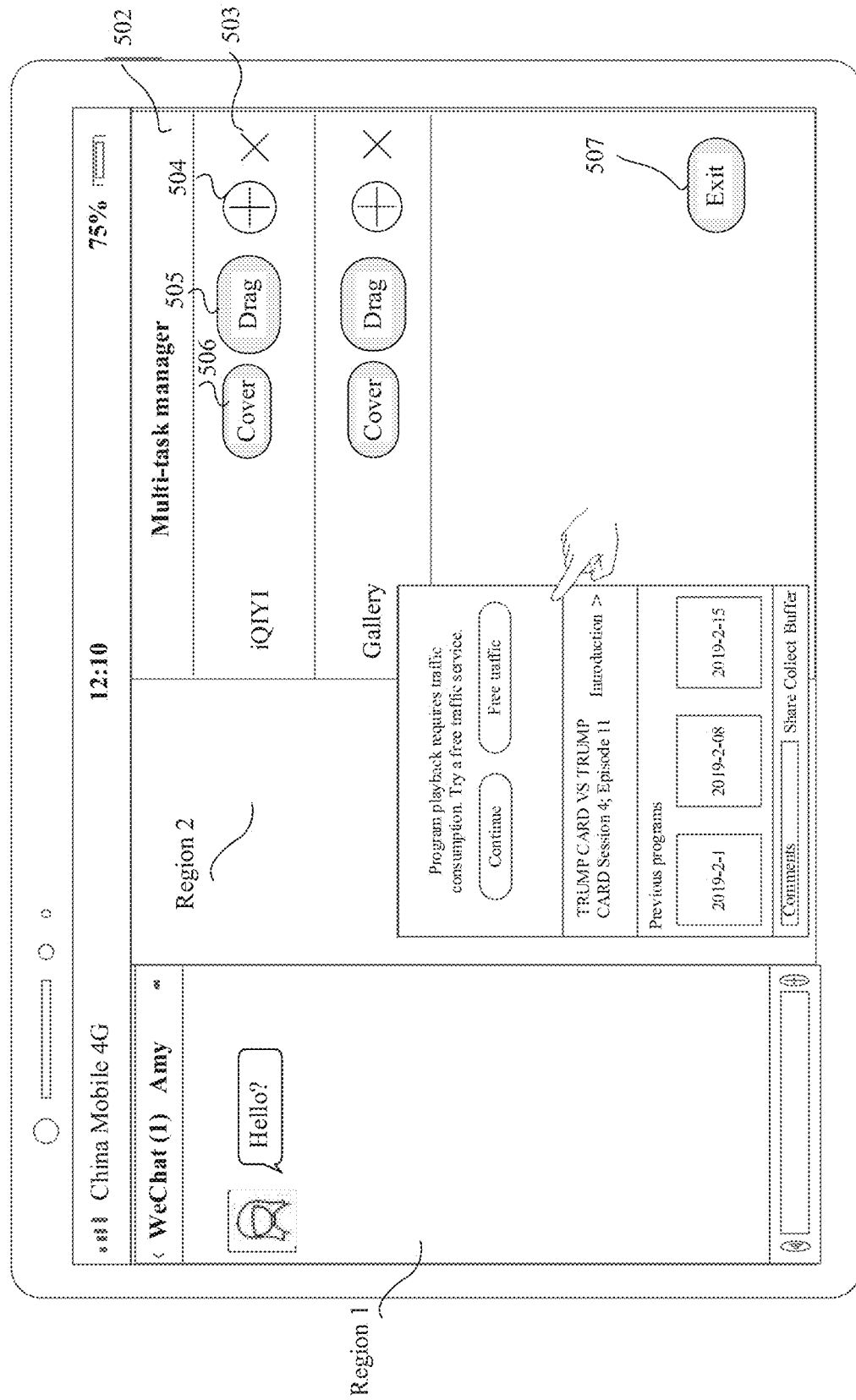
Figure 5D:
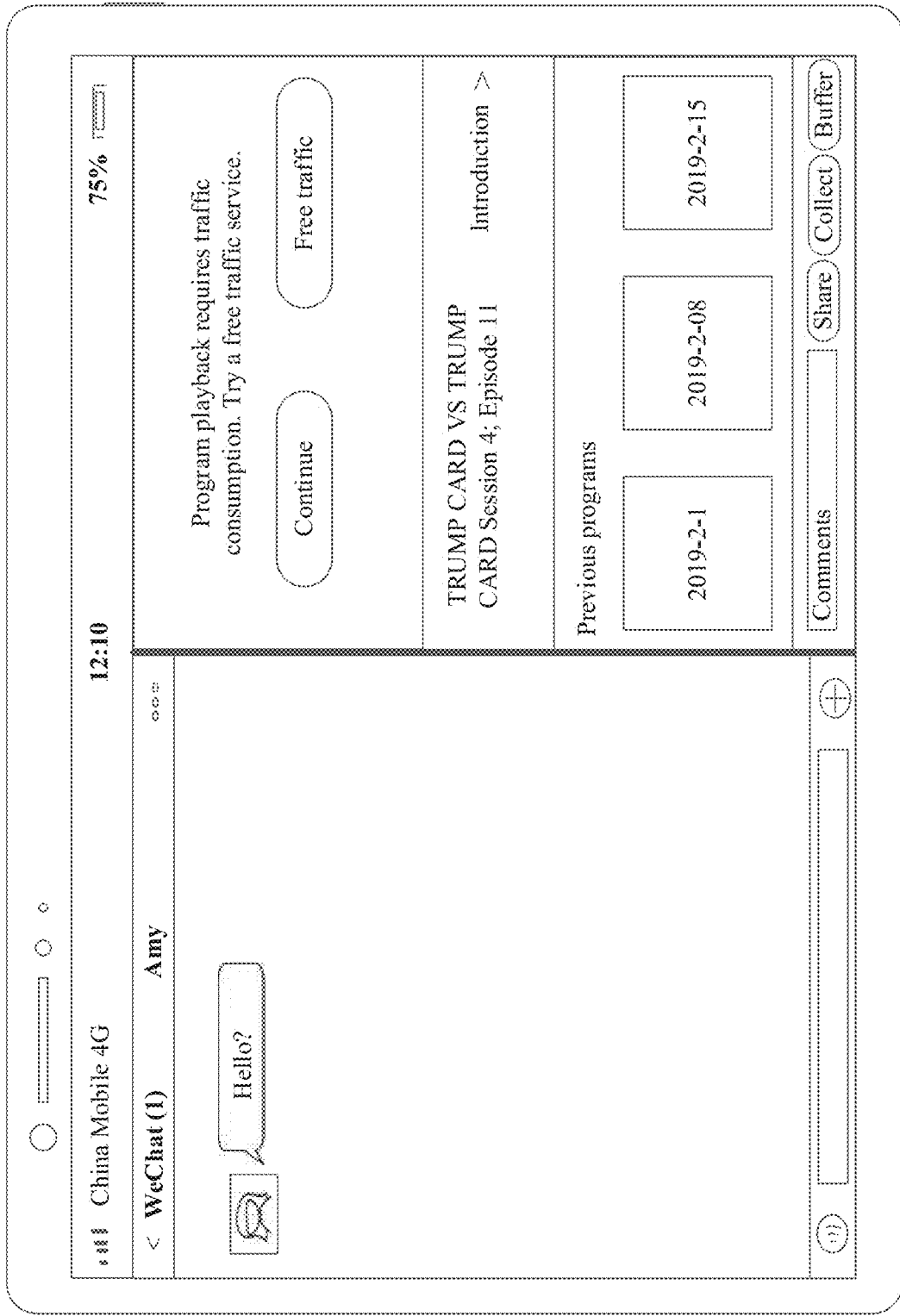

In some embodiments, as shown in FIG. 5D(a), when the mobile phone 100 detects an operation (for example, a drag operation) performed on a "drag" control 505, the left-side display region of the mobile phone 100 is divided into two display regions. With reference to an interface shown in FIG. 5C(b), the left-side display region in the interface is divided into a region 1 and a region 2. The region 1 is used to display the window of the WeChat application, and the region 2 is a blank region. The interface further includes the window of the iQIYI application. A position of the window may be moved under the drag operation. If the mobile phone 100 detects that the window of iQIYI is dragged to the region 2 in the left-side display region, the window of the WeChat application is moved to and then displayed in the region 1 in the left-side display region. When the mobile phone 100 detects that the window of the iQIYI application is released, the mobile phone 100 displays the window of the iQIYI application in the region 2. Alternatively, if the mobile phone 100 detects that the window of iQIYI is dragged to the region 1 in the left-side display region, the window of the WeChat application is moved to the region 2 in the left-side display region. When the mobile phone 100 detects that the window of the iQIYI application is released, the mobile phone 100 displays the window of the iQIYI application in the region 1.

It should be noted that, when FIG. 5D(a) is still used as an example, the mobile phone 100 may drag applications corresponding to two or more application identifiers in the interface of the "multi-task manager" to the left-side display region and then display the applications at the same time. For example, a composite key is used to simultaneously select the two or more application identifiers in the interface of the "multi-task manager". Then, windows of the applications corresponding to these application identifiers are moved to the left-side interface at the same time. For example, still with reference to FIG. 5D(b), when the mobile phone 100 detects that the user triggers an operation performed on the "exit" control 507 in the interface of the "multi-task manager" application, as shown in FIG. 5D(c), the mobile phone 100 closes the window of the "multi-task manager" application, and scales up and displays the application window in the left-side display region.

Figure 5E:
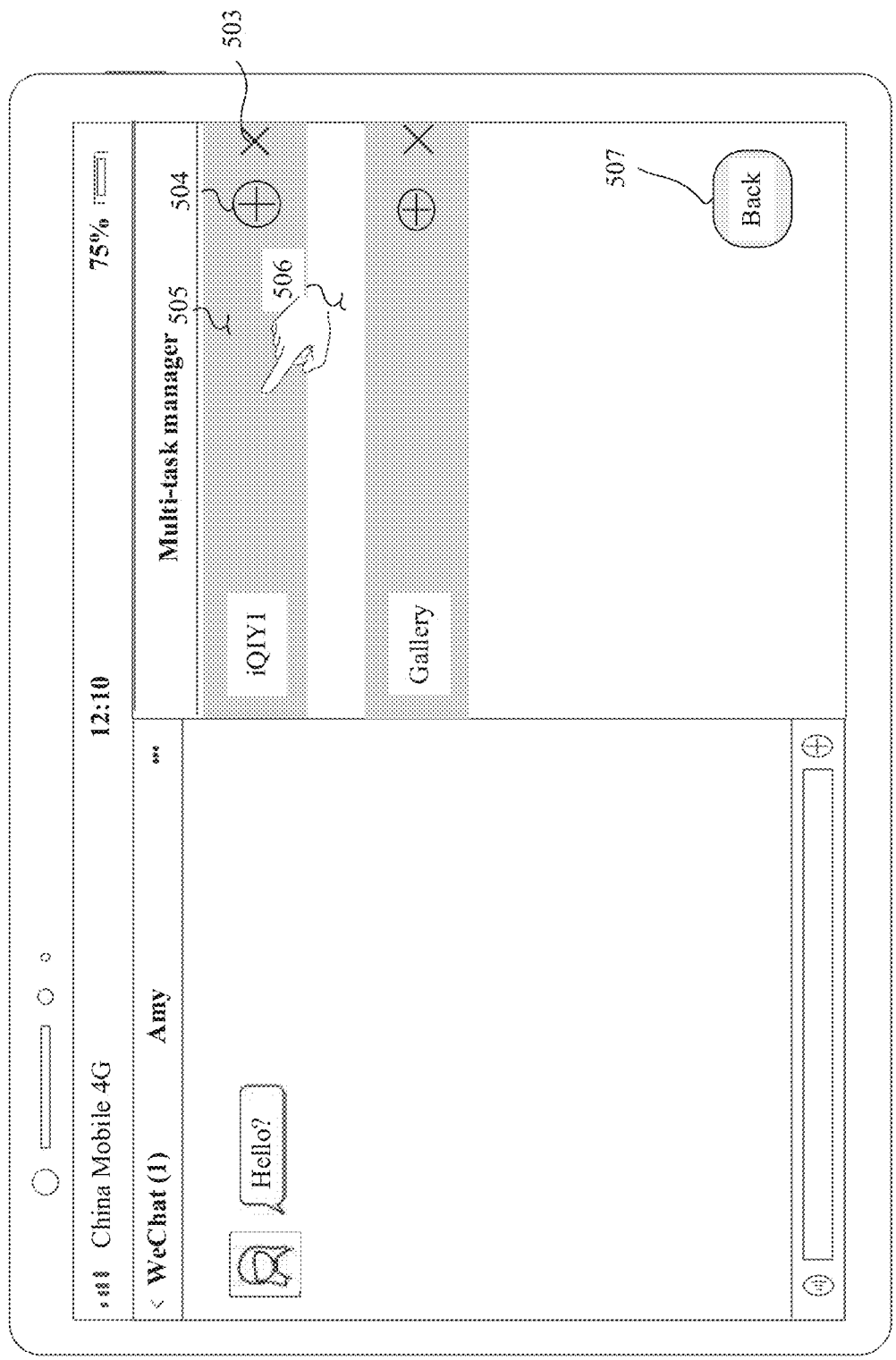
FIG. 5E is a schematic diagram of a user graphical interface of a mobile phone 100 according to an embodiment of this application.
Figure 5E:
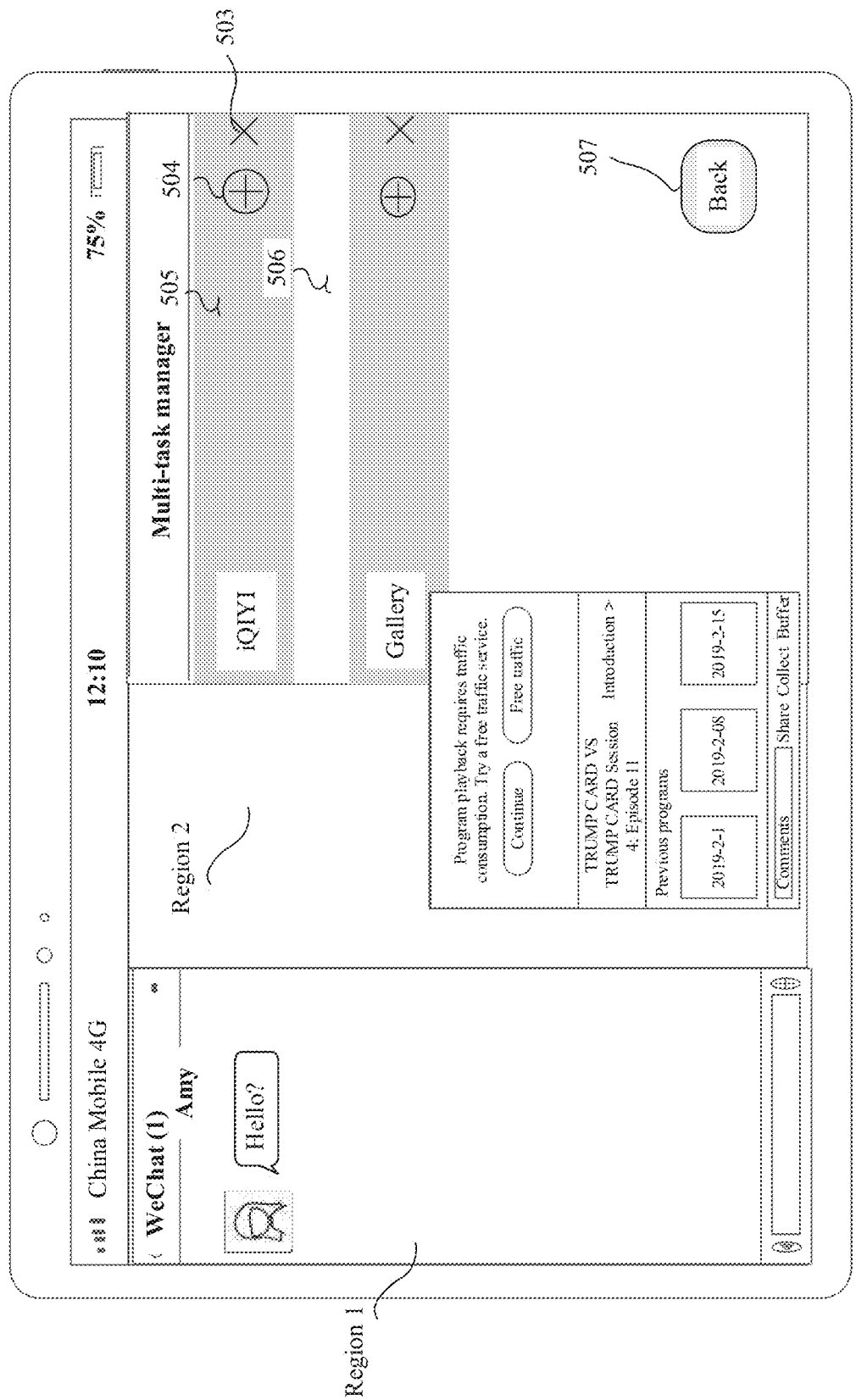

In other embodiments, the interface of the "multi-task manager" is displayed in another manner. With reference to FIG. 5E(a), when the mobile phone 100 detects an operation performed on an operable region 505 corresponding to the identifier of the iQIYI application, the mobile phone 100 displays an interface shown in FIG. 5E(b).

Figure 5F:
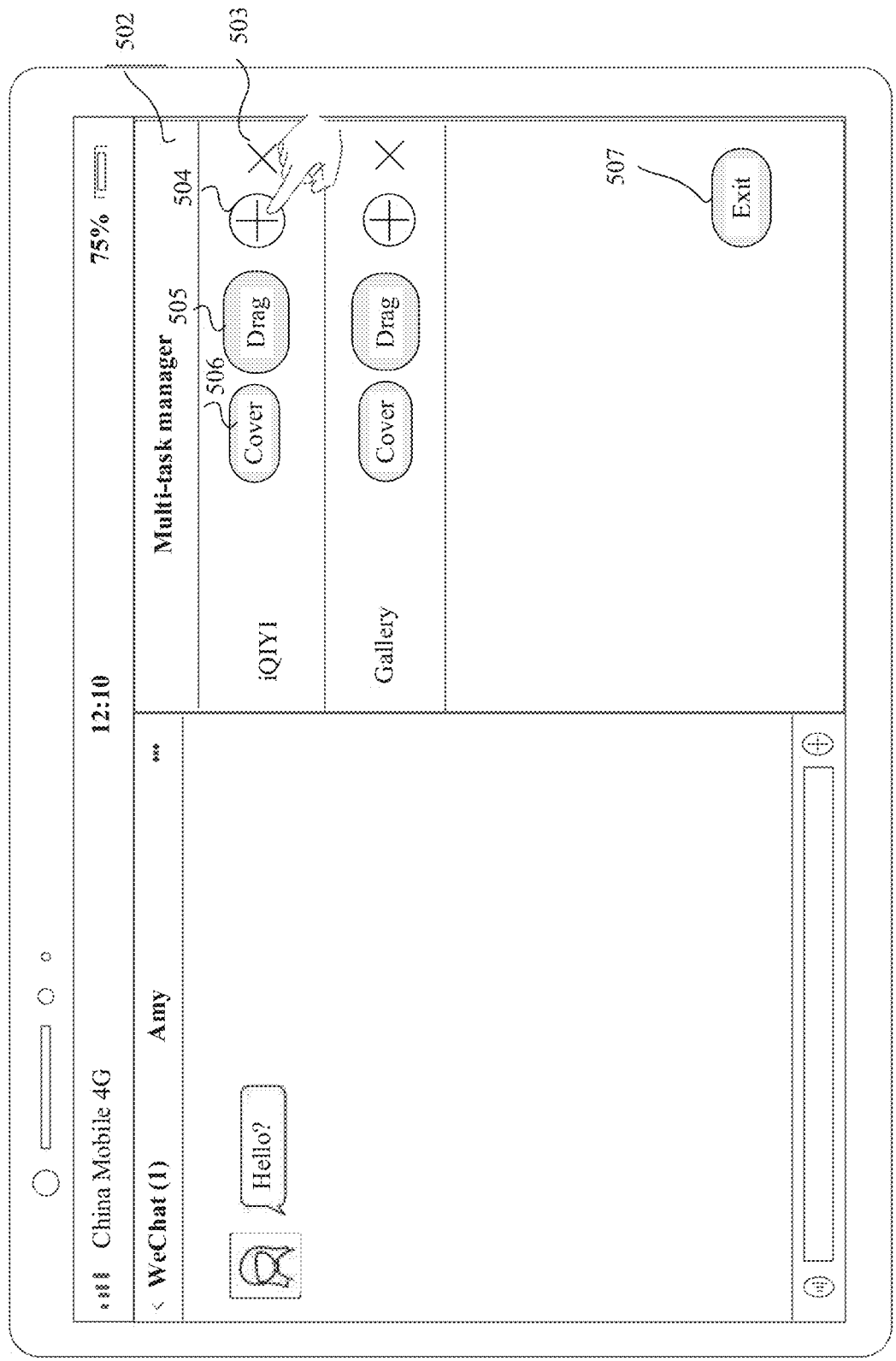
FIG. 5F is a schematic diagram of a user graphical interface of a mobile phone 100 according to an embodiment of this application.
Figure 5F:
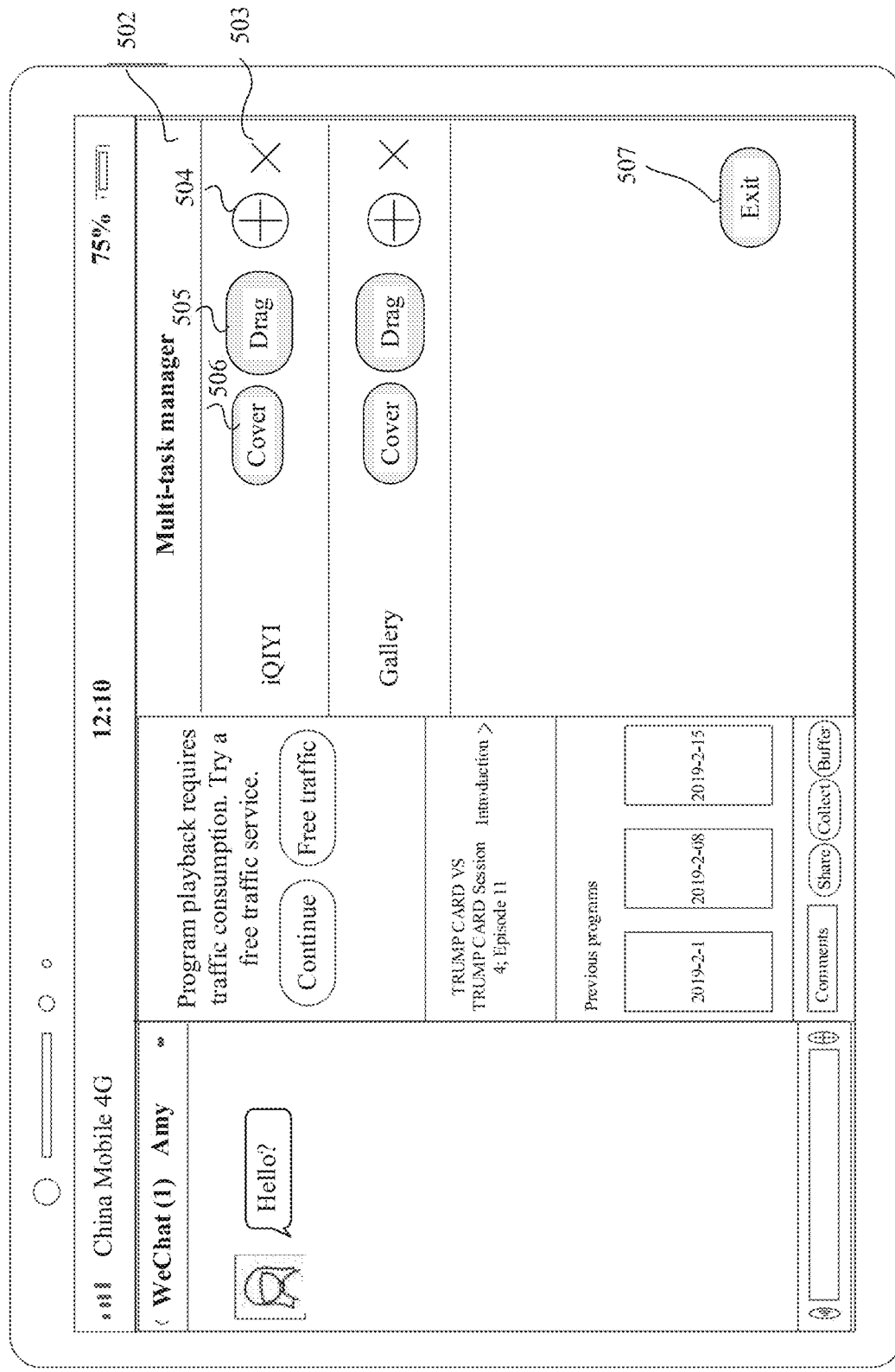

In some embodiments, with reference to FIG. 5F(a), when the mobile phone 100 detects an operation performed on an "add" control 504 corresponding to the identifier of the iQIYI application, as shown in FIG. 5F(b), the mobile phone 100 may add the window of the iQIYI application in the left-side display region. For example, when the mobile phone 100 detects the "exit" control 507, the mobile phone 100 closes the window of the "multi-task manager", and scales up and displays the window in the left-side display region.

It should be understood that, still with reference to FIG. 5F(b), when the mobile phone 100 detects that the user triggers an operation performed on an add control corresponding to an identifier of a gallery application, the mobile phone 100 continues to add a window of the gallery application in the left-side display region. Alternatively, when the mobile phone 100 detects that the user triggers an operation performed on a cover control corresponding to an identifier of a gallery application, a window of a specific application in the left-side display region is replaced with a window of the gallery application. Alternatively, when the mobile phone 100 detects that the user triggers a drag operation corresponding to an identifier of a gallery application, the mobile phone 100 drags a window of the gallery application to a target display region that the user desires. In this manner, a window of an application running in the foreground may be displayed in the left-side display region of the mobile phone 100, and the interface of the "multi-task manager" may be displayed in the right-side display region. The mobile phone 100 may implement operations such as covering, dragging, and adding by using one or more controls corresponding to each application identifier displayed in the interface of the "multi-task manager", to display the application running in the background in the left-side display region. The left-side display region provides a preview of the application running in the foreground, so that the user directly views a result of the operation.

Example 4

Figure 6A:
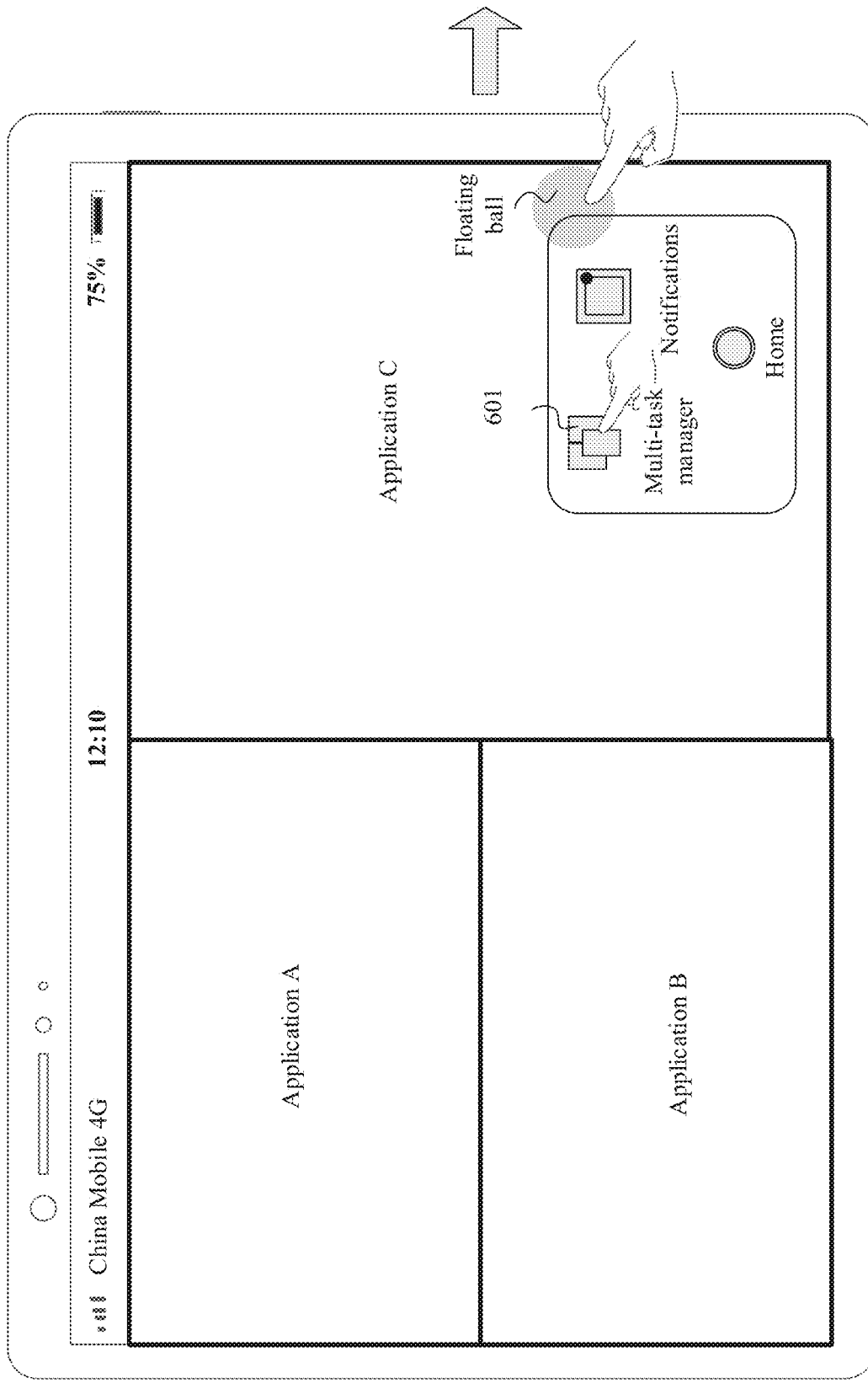
FIG. 6A is a schematic diagram of a user graphical interface of a mobile phone 100 according to an embodiment of this application.
Figure 6A:
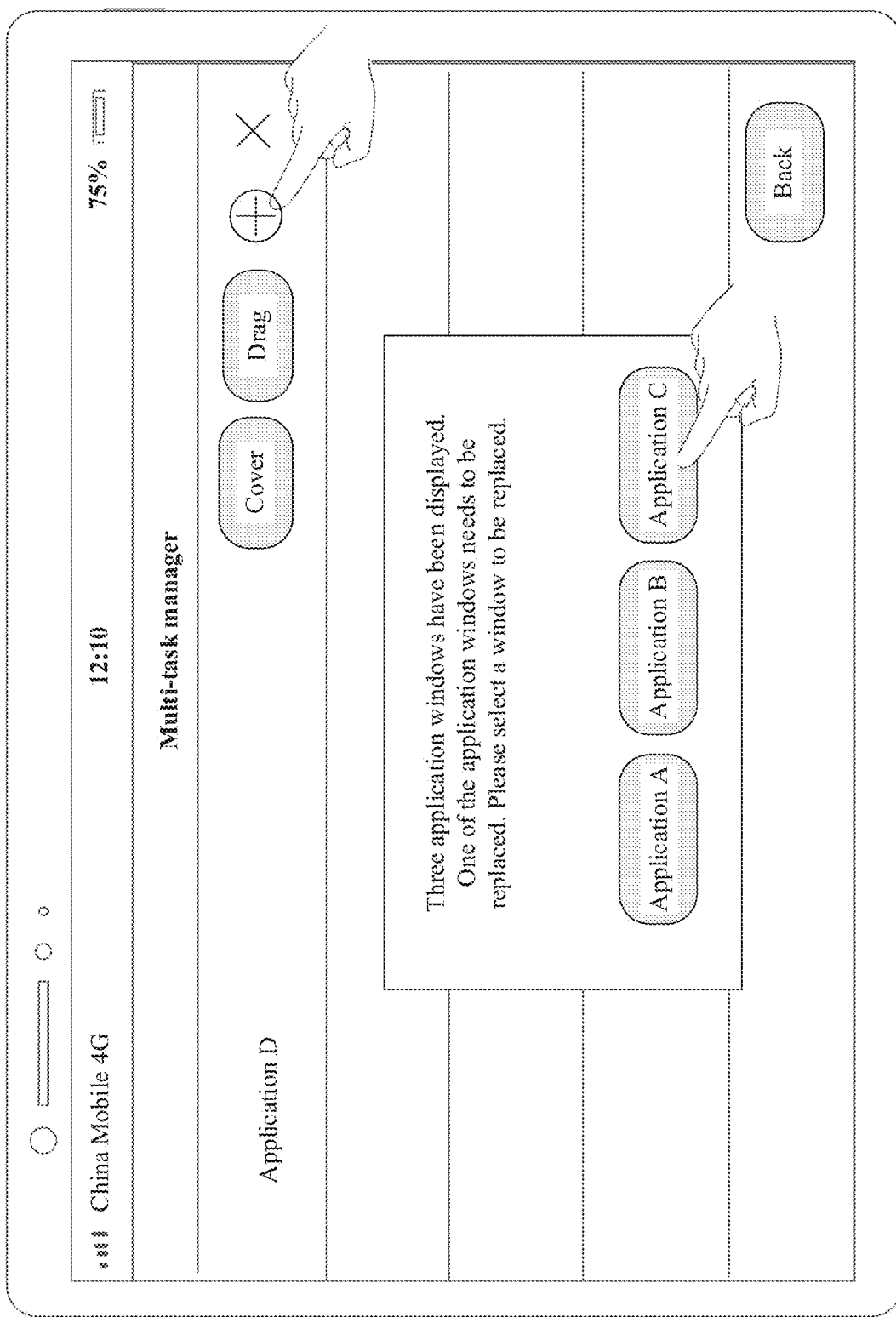
Figure 6A:
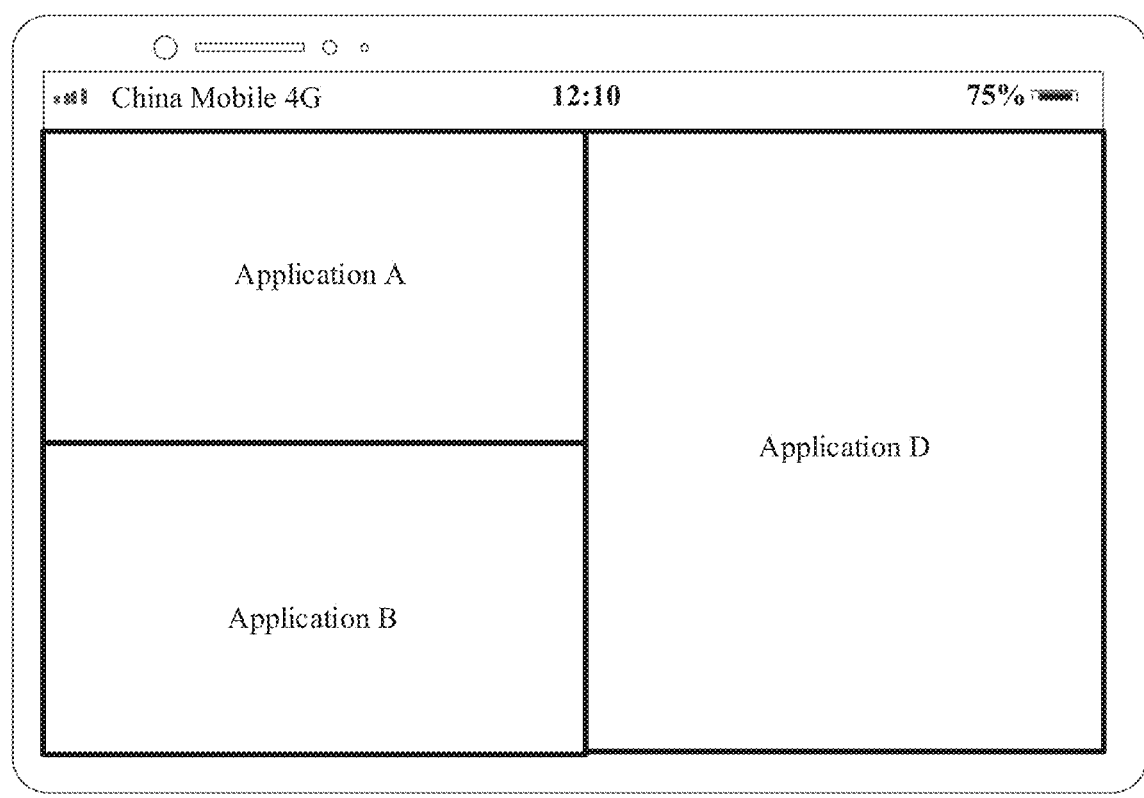

This example describes a possible processing manner of the mobile phone 100 when the display screen of the mobile phone 100 displays a maximum quantity of application windows at the same time.
Manner 1:
With reference to FIG. 6A(a), the display screen of the mobile phone 100 displays windows of three applications at the same time. When a control 601 of the "multi-task manager" application in the floating ball is triggered in the mobile phone 100, the mobile phone 100 displays an interface shown in FIG. 6A(b). When the mobile phone 100 detects an "add" control corresponding to an identifier of an application D, the mobile phone 100 displays prompt information 602. The prompt information 602 is used to prompt the user that the display screen displays the windows of the three applications at the same time and cannot display more windows of applications at the same time, and prompt the user to select a window to be replaced. The mobile phone 100 may further display three options of an application A, an application B, and an application C. If the mobile phone 100 detects that the user triggers the option of the "application C", the mobile phone 100 replaces a window of the application C with a window of the application D. When the mobile phone 100 detects that a "back" control is triggered, the mobile phone 100 displays an interface shown in FIG. 6A(c).
Manner 2:
Still with reference to FIG. 6A(a), it is assumed that, before the mobile phone 100 detects that the floating ball is triggered, a focus position on the display screen is in the window of the application C (that is, the window of the application C is a focus window). After the mobile phone 100 opens the interface of the "multi-task manager" application and detects that the user triggers the add control, the mobile phone 100 replaces a display position of the application C with a display position of the application D by default (because the window of the application C is a focus window). To be specific, the mobile phone 100 closes the window of the application C, and displays the application C in the display position of the application C. Alternatively, after the mobile phone 100 detects that the user triggers the add control of the application D, one window is selected from non-focus windows (for example, when there are a plurality of non-focus windows, one window may be randomly selected from the plurality of non-focus windows, or a window with a largest or smallest display area may be selected from the plurality of non-focus windows, or an earliest opened window may be selected from the plurality of non-focus windows, or a latest opened window may be selected from the plurality of non-focus windows). Then, the selected non-focus window is replaced with the window of the application D.

Figure 6B:
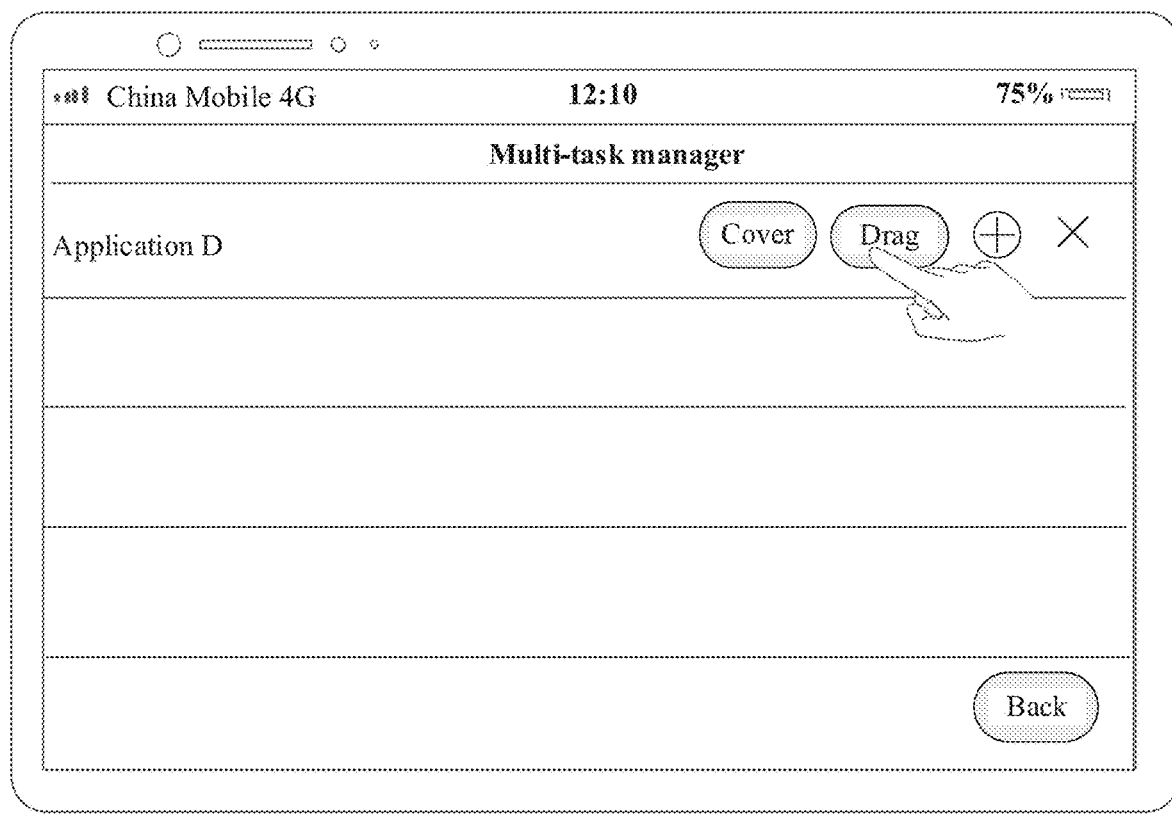
FIG. 6B is a schematic diagram of a user graphical interface of a mobile phone 100 according to an embodiment of this application.
Figure 6B:
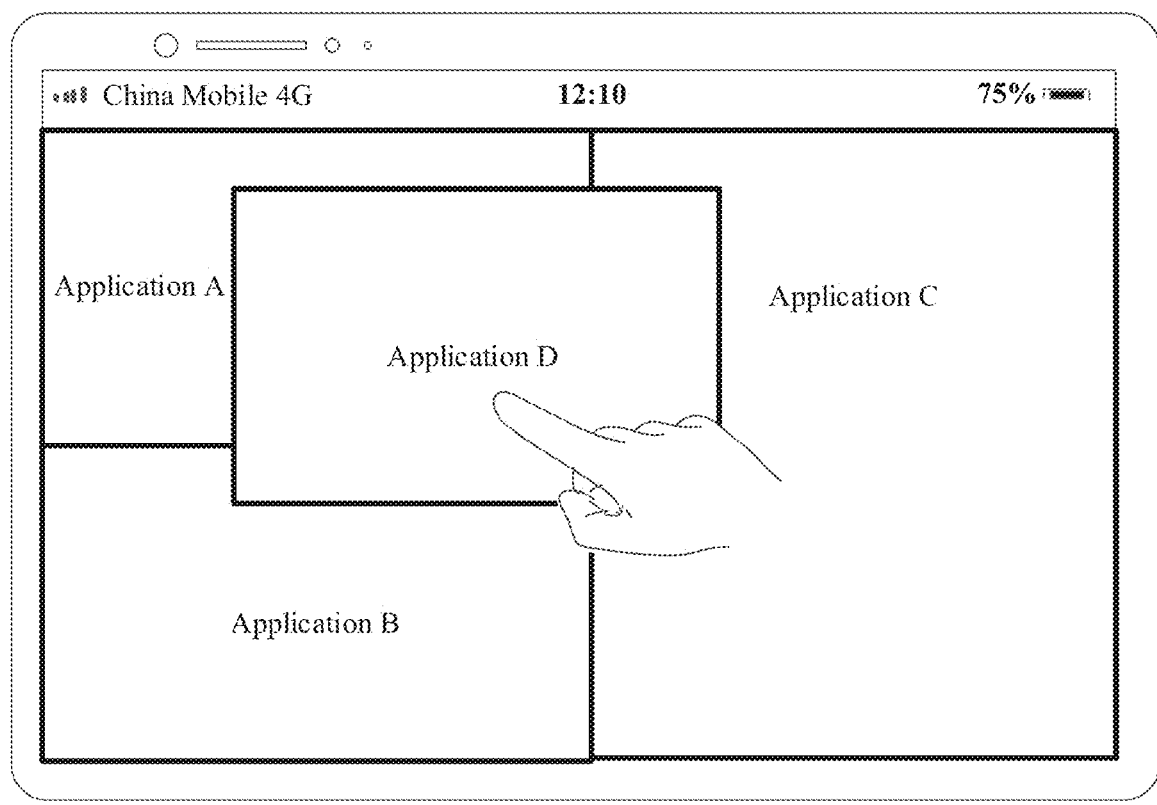
Figure 6B:
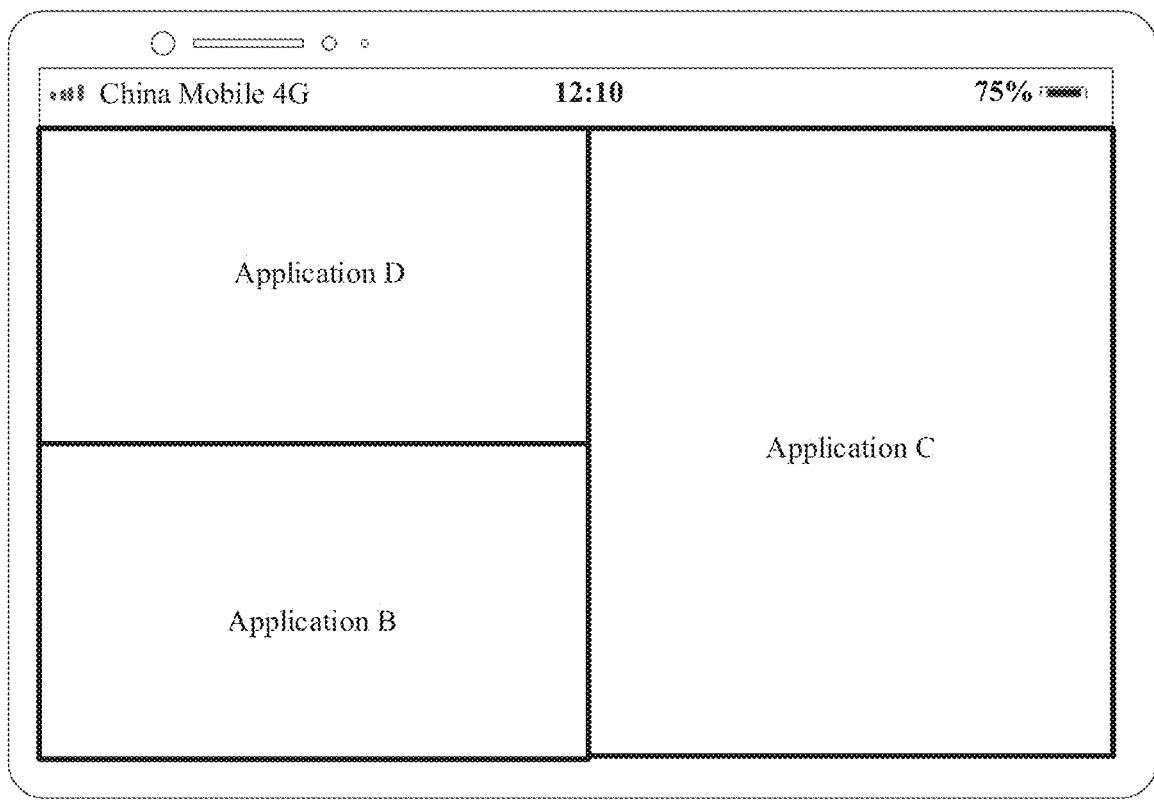

In some embodiments, the focus window may be a window in which content displayed in the window is being edited (for example, a window in which text information is being input based on an input operation of the user, or a window in which a cursor is located); or a window in which display content is edited for a largest quantity of times in all windows on the display screen (for example, a window in which a cursor stays for longest duration); or a window of an application that is opened earliest or latest in all windows on the display screen; or a window corresponding to a most frequently used application in all applications corresponding to all windows. It should be understood that the non-focus window may be another window in all the windows except the focus window.
Manner 3:
For example, still with reference to FIG. 6A(b), when the mobile phone 100 detects an operation performed on a "cover" control corresponding to the identifier of the application D, the mobile phone 100 may also output prompt information, to prompt the user that the mobile phone 100 displays three application windows at the same time and cannot display more application windows at the same time, and prompt the user to select a window to be replaced. In addition, the mobile phone 100 outputs the options of the application A, the application B, and the application C for the user to select.
Manner 4:
With reference to FIG. 6B(a), when the mobile phone 100 detects an operation performed on a "drag" control corresponding to the identifier of the application D, the mobile phone 100 displays an interface shown in FIG. 6B(b). The user may drag the window of the application D to any position. It is assumed that the mobile phone 100 detects that the window of the application D is dragged to and then released in a region of the window of the application A, as shown in FIG. 6B(c), the mobile phone 100 closes the window of the application A, and displays the window of the application D in a display region of the application A.

For example, the mobile phone 100 may determine an area proportion of the window of the application D to the display region of the application A, to determine whether the window of the application D is dragged into the display region of the window of the application A. For example, with reference to FIG. 6B(b), if the mobile phone 100 determines that an area of a window area of the application D occupying the display region of the application A is greater than a preset area, the mobile phone 100 determines that the application D is dragged to the display region of the application A.

It should be noted that, in Example 3, when a quantity of application windows displayed on the display screen of the mobile phone 100 at the same time reaches a maximum value, if the mobile phone 100 detects that a window of a new application is added on the display screen, the mobile phone 100 may output prompt information, to prompt the user to replace a window of a specific application that is displayed at the same time, with the window of the new application.

It should be understood that a quantity of application windows displayed on the mobile phone 100 at the same time may be set before the mobile phone 100 is delivered from a factory; or may be customized by the user. This is not limited in this embodiment of this application.

For example, it is assumed that the display screen of the mobile phone 100 displays windows of three applications at most at the same time. When the display screen of the mobile phone 100 displays windows of three applications at the same time, and a control of the "multi task manager" application in the floating ball is triggered on the mobile phone 100, the interface of the "multi-task manager" displayed on the mobile phone 100 may not include any application identifier, or include an identifier of an application running in the background. However, an "add" control corresponding to each application identifier is not displayed. In this manner, the user may be prompted that a quantity of applications running in the foreground reaches the maximum value and a window of a new application cannot be further added.

Figure 7:
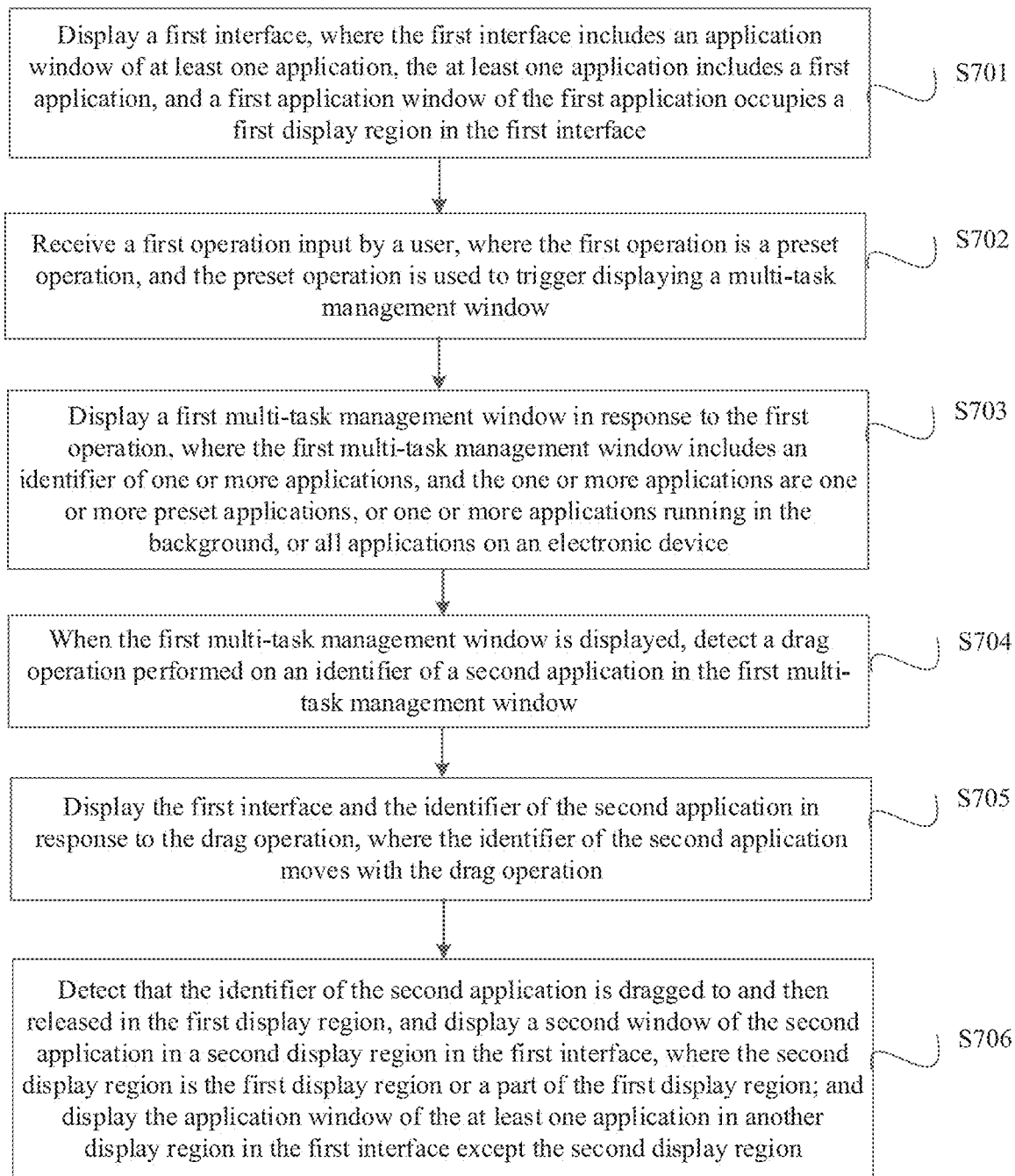
FIG. 7 is a schematic flowchart of a display method according to an embodiment of this application.

With reference to the foregoing embodiments and the related accompanying drawings, an embodiment of this application provides a display method. The method may be implemented by the electronic device (for example, a mobile phone or a tablet computer) shown in FIG. 2. As shown in FIG. 7, the method may include the following steps:

701. Display a first interface, where the first interface includes an application window of at least one application, the at least one application includes a first application, and a first application window of the first application occupies a first display region in the first interface.

In some embodiments, for example, the first interface may be the interface 302 shown in FIG. 3A(b). For example, the interface 302 includes a window of one application.

In some embodiments, the first interface may occupy all regions, in the display screen of the electronic device, that can be used to display an application window.

Figure 8:
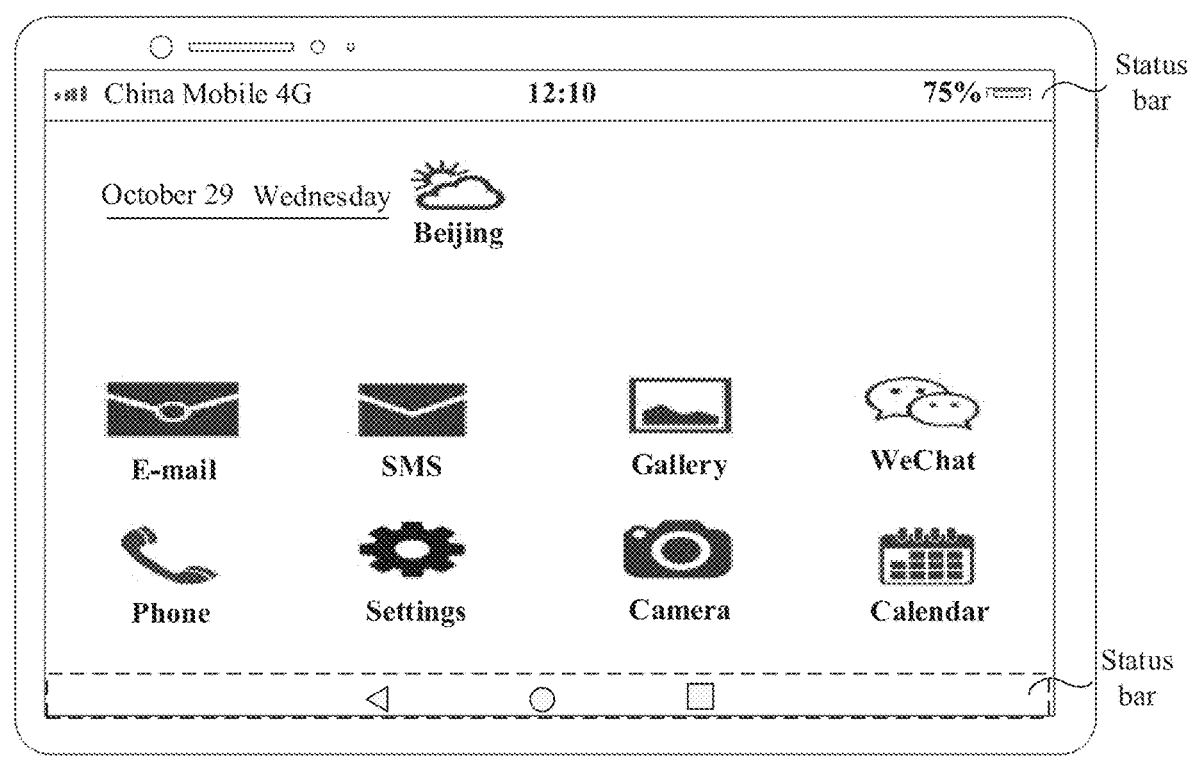
FIG. 8 is a schematic diagram of a user graphical interface of a mobile phone 100 according to an embodiment of this application.

In an example, the first interface may occupy the entire display screen (that is, occupy all the display regions in the display screen), that is, the display screen displays the first interface in full screen. In this case, the display screen may not display a status bar (a region used to display information such as a battery level, a signal strength, and an operator identifier) and a navigation bar (a region used to display a home button, a return key, and a multi-task key). For example, FIG. 8 is a schematic diagram of a status bar and a navigation bar on a display screen. In some examples, the status bar on the display screen of the electronic device may be hidden (for example, hidden after it is detected that a user triggers an operation such as a leftward or rightward sliding operation in a region of the status bar, or automatically hidden after it is determined that a current display interface is displayed for specific duration). In some other embodiments, the navigation bar may be not set on the display screen of the electronic device, or the navigation bar may be hidden. Therefore, when the status bar on the display screen is hidden, and no navigation bar exists or the navigation bar is also hidden, the first interface is displayed in all the display regions in the display screen of the electronic device, that is, the first interface occupies the display regions of the status bar and the navigation bar.

In another example, the first interface may occupy all the display regions except the display region of the status bar. For example, when the navigation bar is not set on the display screen of the electronic device or the navigation bar is hidden, the first interface may be displayed in all the display regions except the display region of the status bar.

In still another example, the first interface may occupy all the display regions except the display regions of the status bar and the navigation bar. For example, when the status bar and the navigation bar on the display screen of the electronic device are not hidden, the first interface may be displayed in all the display regions except the display regions of the status bar and the navigation bar.

In another example, the display screen of the electronic device may include some elements. In a possible case, these elements cannot be covered (for example, some elements set by the user such as an image, an icon, and a text). In other words, display regions occupied by these elements cannot be used to display a window of an application. In this case, all regions in the display screen that are used to display the window of the at least one application may not include display regions occupied by these elements. In some other possible cases, these elements are displayed at an upper layer of the display interface (for example, transparently displayed above the display interface in a form such as a floating ball). In other words, display regions occupied by these elements can be used to display a window of an application. In this case, all regions in the display screen that are used to display the window of the at least one application may include the display regions occupied by these elements, and these elements may be transparently displayed at the upper layer of the window of the at least one application.

In some embodiments, the application window that is of the at least one application and that is displayed in the first interface may occupy the entire first interface without overlapping.

702. Receive a first operation input by the user, where the first operation is a preset operation, and the preset operation is used to trigger displaying a multi-task management window.

In some embodiments, the preset operation may be a sliding operation in the first interface, for example, an operation of sliding from a right edge of the display screen (for example, a position at the right edge and close to a lower edge) to an inner side of the display screen in FIG. 3B(a). For another example, the preset operation may be alternatively a right-to-left sliding operation/a left-to-right sliding operation/a top-to-bottom sliding operation/a bottom-to-top sliding operation with certain pressure. For example, when the electronic device detects the right-to-left sliding operation and a pressure sensor disposed on the display screen detects that a pressure value generated by the sliding operation is greater than a threshold, the electronic device displays a "multi-task manager" window. In another embodiment, the preset operation may be alternatively a right-to-left sliding operation/a left-to-right sliding operation/a top-to-bottom sliding operation/a bottom-to-top sliding operation, and the sliding operation continuously stays in an end position or implements touch-and-hold in an end position for preset duration.

703. Display a first multi-task management window in response to the first operation, where the first multi-task management window includes an identifier of one or more applications, and the one or more applications are one or more preset applications, or one or more applications running in the background, or all applications on the electronic device.

In some embodiments, the electronic device may not display the first interface when the electronic device displays the first multi-task management window in response to the first operation. For example, in FIG. 4A(a), the mobile phone 100 displays the first interface. The first interface includes the window of WeChat. When the mobile phone 100 detects the sliding operation, with reference to FIG. 4A(b), the mobile phone 100 displays the window of the "multi task manager" and does not display the first interface. In other embodiments, for example, as shown in FIG. 3B(b), the electronic device may display the window of the "multi-task manager" at the upper layer of the first interface in response to the first operation. In another embodiment, the electronic device responds to the first operation, and the electronic device implements slit-screen displaying. For example, as shown in FIG. 5A(b), a first display region is used to display the window of the at least one application, and a second display region is used to display the window of the "multi-task manager".

704. When the first multi-task management window is displayed, detect a drag operation performed on an identifier of a second application in the first multi-task management window.

In some embodiments, for example, in FIG. 4D, the drag operation may be a drag operation performed on an operable region 403 corresponding to the second application such as iQIYI, or may be a drag operation performed on an icon of iQIYI.

705. Display the first interface and the identifier of the second application in response to the drag operation, where the identifier of the second application moves with the drag operation.

In some embodiments, the electronic device may not display the first multi-task management window in response to the drag operation. For example, in FIG. 4A(a), the mobile phone 100 displays the first interface. The first interface includes the window of WeChat. When the mobile phone 100 detects the preset operation, as shown in FIG. 4A(b), the mobile phone 100 displays the first multi-task management window. The mobile phone 100 detects the drag operation performed on the icon of iQIYI in the first multi-task management window, cancels displaying the first multi-task management window, and displays the first interface and the identifier of iQIYI (for example, the icon or the window of iQIYI) shown in FIG. 4B(a).

In some embodiments, the drag operation performed on the second application such as iQIYI may include a touch-and-hold operation performed on the identifier of the second application and a move operation uninterrupted from the touch-and-hold operation and performed after the touch-and-hold operation. Therefore, in a possible case, the electronic device displays the first interface in response to the touch-and-hold operation in the drag operation. For example, in FIG. 4A(b), if the mobile phone 100 detects the touch-and-hold operation performed on the icon of iQIYI, the mobile phone 100 displays the first interface, for example, the interface shown in FIG. 4B(a). The identifier of iQIYI in this interface (for example, an icon or a window) moves with the drag operation. In other possible cases, the electronic device displays the first interface in response to the move operation in the drag operation. For example, in FIG. 4A(b), the mobile phone 100 detects the touch-and-hold operation performed on the icon of iQIYI, and still stays in the window of the "multi-task manager". After the mobile phone 100 detects the move operation uninterrupted from the touch-and-hold operation, the mobile phone 100 displays the first interface, for example, the interface shown in FIG. 4B(a). The identifier (for example, an icon or a window) of iQIYI in this interface moves with the drag operation.

706. Detect that the identifier of the second application is dragged to and then released in the first display region, and display the second window of the second application in the second display region in the first interface, where the second display region is the first display region or a part of the first display region; and display the application window of the at least one application in another display region in the first interface except the second display region.

In some embodiments, the detecting that the identifier of the second application is dragged to the first display region may include: detecting that an area of the identifier of the second application in the first display region is greater than a preset area, or detecting that a ratio between an area of the identifier of the second application in the first display region and a total area of the identifier of the second application is greater than a preset ratio.

In some embodiments, the window of the second application may occupy the entire first display region of the first application. In this case, the window of the first application is displayed in another display region other than the first display region.

In other embodiments, the window of the second application may occupy a part of the first display region of the first application. In this case, the window of the first application is displayed in a remaining part of the first display region. In other words, the first application and the second application are both displayed in the first display region. For example, as shown in FIG. 4B(a), if the mobile phone 100 detects that the window of iQIYI is dragged to the right-side display region, iQIYI is displayed in the right-side display region, and the WeChat application is displayed in the left-side region. In other words, iQIYI and WeChat jointly occupy the display region originally used to display WeChat.

In some embodiments, the electronic device detects the first operation and displays the first task management window. The electronic device detects the drag operation performed on the identifier of the second application in the first task management window. The electronic device may cancel displaying the first task management window, and display the first interface and the identifier of the second application. When the electronic device detects that the identifier of the second application is dragged to and then released in the first display region occupied by the first application, the second window of the second application is displayed in the entire first display region or a part of the first display region. After the electronic device detects a second operation (for example, the second operation may be the same as the first operation, and the first operation and the second operation are both preset operations), the electronic device displays a second multi-task management window in response to the second operation. The identifier of the second application is deleted or the identifier of the second application is displayed in gray when the second multi-task management window is compared with the first multi-task management window.

In some embodiments, when the first multi-task management window is displayed, if a first trigger operation performed on a first region of the identifier of the second application in the first multi-task management window is detected, in response to the first trigger operation, the application window of the second application is displayed in full screen in a display region that is in the display screen of the electronic device and that can be used to display an application window. For example, in FIG. 4D(a), the identifier of iQIYI is displayed in the window of the multi-task manager. The electronic device detects an operation in the first region (for example, the white region 404) corresponding to iQIYI, and displays the interface shown in FIG. 4D(b). The window of iQIYI is displayed in full screen in the display region that can be used to display an application window in the interface. For the display region that can be used to display an application window, refer to the foregoing description. For another example, in FIG. 4E(a), the identifier of iQIYI is displayed in the window of the multi-task manager, and the first region corresponding to the identifier of iQIYI includes the "cover" control 405. The electronic device detects an operation performed on the "cover" control, and displays the interface shown in FIG. 4E(b). The window of iQIYI is displayed in full screen in the display region that can be used to display an application window in the interface. For the display region that can be used to display the application window, refer to the foregoing description.

In some embodiments, when the first multi-task management window is displayed, if a second trigger operation performed on a second region of the identifier of the second application in the first multi-task management window is detected, the electronic device displays a first update interface of the first interface in response to the second trigger operation. The first update interface of the first interface is used to display the application window of the at least one application and the application window of the second application. For example, in FIG. 4C(a), the identifier of iQIYI is displayed in the window of the multi-task manager, and the first region corresponding to the identifier (for example, a gray region in the figure) includes the "add" control 402. The electronic device detects an operation performed on the "add" control 402, and displays the interface shown in FIG. 4C(b). The original window of WeChat and the original window of iQIYI are displayed in the interface.

In some embodiments, when the first multi-task management window is displayed, if a second trigger operation performed on a second region of the identifier of the second application in the first multi-task management window is detected, and a quantity of application windows included in the first interface reaches an upper limit, a second update interface of the first interface is displayed in response to the second trigger operation. The second update interface of the first interface is used to display the window of the second application and a window of another application in the at least one application except a third application. The window of the second application occupies a third display region. The third display region is a display region occupied by a window of the third application in the first interface. The third application is an application on which user operation focuses in the first interface, or an application earliest opened by the user in an application on which user operation does not focus, or an application latest opened by the user in an application on which user operation does not focus, before the electronic device displays the first multi-task management window.

For example, in FIG. 5B(a), the identifier of iQIYI is displayed in the window of the multi-task manager, and the first region corresponding to the identifier of iQIYI includes the "cover" control 506. The electronic device detects an operation performed on the "cover" control 506, and displays the interface shown in FIG. 5B(b). The display region that is originally used to display the window of WeChat in the interface is used to display the window of the iQIYI application. For another example, in FIG. 6A(a), the display screen of the mobile phone 100 displays windows of three applications, and a quantity of windows reaches an upper limit. As shown in FIG. 6B(a), when the mobile phone 100 detects the "cover" control or the "add" control in a second region of an application D in the window of the "multi-task manager", the mobile phone 100 determines that an application C is an application on which user operation focuses, or an application earliest opened by the user in an application on which user operation does not focus, or an application latest opened by the user in an application on which user operation does not focus. In this case, the mobile phone 100 replaces the application C with an application B, and displays an interface shown in FIG. 6A(c).

In some embodiments, the application on which user operation focuses (for example, a cursor or a touch operation) in the first interface may be an application on which the cursor in the first interface is located (for example, content being edited, such as an application in which text is being input by using the cursor), an application on which a most recent touch operation (for example, an operation such as tap or slide) is performed in the first interface, an application with a maximum quantity of user operation times in the first interface, or the like.

In some embodiments, when the first multi-task management window is displayed, if a second trigger operation performed on a second region of the identifier of the second application in the first multi-task management window is detected, and a quantity of application windows included in the first interface reaches an upper limit, prompt information is output in response to the second trigger operation. The prompt information is used to indicate that the quantity of windows included in the first interface reaches the upper limit. After an input indication used to replace a third application in the first interface is received, a second update interface of the first interface is displayed. The second update interface of the first interface is used to display the window of the second application and a window of another application in the at least one application except the third application. The window of the second application occupies a third display region. The third display region is a display region occupied by the window of the third application in the first interface.

For example, in FIG. 6A(b), the identifier of iQIYI is displayed in the window of the multi-task manager, and the first region corresponding to the identifier of iQIYI includes the "cover" control. The electronic device detects an operation performed on the "cover" control, and displays prompt information. The prompt information is used to prompt the user that a quantity of windows reaches an upper limit. When the electronic device detects an operation of selecting the application C, the electronic device replaces the window of the application C with the window of the application D, and displays the interface shown in FIG. 6A(c). An original display region of the window of the application C in the interface is used to display the window of the application D.

Implementations of this application may be combined at random to implement different technical effects.

In the embodiments provided in this application, the method provided in the embodiments of this application is described from a perspective of the electronic device (the mobile phone 100) used as an execution entity. To implement functions in the method provided in the embodiments of this application, a terminal device may include a hardware structure and/or a software module, to implement the functions in a form of a hardware structure, a software module, or a hardware structure and a software module. Whether a function in the functions is performed in a form of a hardware structure, a software module, or a combination of a hardware structure and a software module depends on particular applications and design constraint conditions of the technical solutions.

According to the context, the term "when" or "after" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "when it is determined that" or "in response to determining" or "when (a stated condition or event) is detected" or "in response to detecting (a stated condition or event)". In addition, in the foregoing embodiments, relationship terms such as first and second are used to distinguish one entity from another entity, but do not limit any actual relationship and sequence between these entities.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

It should be noted that a part of the present patent application document includes content protected by the copyright. The copyright owner reserves the copyright except copies made for the patent documents or the recorded content of the patent documents in the Patent Office.

What is claimed is:

1. A display method, applied to an electronic device having a display screen, wherein the method comprises:
   displaying a first interface comprising a first application window of a first application, wherein the first application window occupies a first display region in the first interface;
   receiving a first operation input by a user on the first interface, wherein the first operation is a first preset operation;
   displaying a first multi-task management window in response to the first operation, wherein the first multi-task management window comprises identifiers of two or more applications, and wherein the two or more applications are two or more preset applications, two or more applications running in a background, or all applications on the electronic device, wherein each identifier contains respective visually distinct first and second control regions;
   in response to detecting a drag operation being performed on each first control region of an identifier of an application in the first multi-task management window;
      displaying the first interface and the identifier in response to the drag operation, wherein the identifier moves with the drag operation;
      making a detection that the identifier is dragged to and released in the first display region;
      displaying, in response to the detection, a second application window of the application in a second display region in the first interface, wherein the second display region partially or fully overlaps the first display region; and
      displaying the first application window of the first application in a third display region in the first interface except the second display region;
   in response to simultaneously selecting the identifiers of the two or more applications in the first multi-task management window using a composite key:
      performing a second dragging operation on the identifiers and releasing in the first display region; and
      displaying, in response to the second dragging operation, two or more application windows of the two or more applications corresponding to dragged identifiers in a fourth display region next to the first application window of the first application;
   in response to detecting a second trigger operation being performed on each second control region of an identifier of an application in the first multi-task management window, wherein the second trigger operation is not a drag operation:
      displaying a first update interface of the first interface, wherein the first update interface displays the first application window and a respective second application window corresponding to the identifier.

2. The display method of claim 1, further comprising displaying a third application window of a third application in a fifth display region in the first interface except the first display region.

3. The display method of claim 1, further comprising performing a touch-and-hold operation on each first control region of an identifier and a move operation uninterrupted from the touch-and-hold operation, wherein displaying the first interface in response to the drag operation comprises displaying the first interface in response to the touch-and-hold operation.

4. The display method of claim 1, wherein the first interface occupies all regions in the display screen to display the first application window.

5. The display method of claim 1, wherein the first application window occupies the first interface without overlapping another application window.

6. The display method of claim 1, further comprising:
   receiving a second operation input by the user, wherein the second operation is a second preset operation;
   displaying a second multi-task management window in response to the second operation; and when the second multi-task management window is compared with the first multi-task management window:
deleting the identifier, or
displaying the identifier in gray.

7. The display method of claim 1, further comprising:
when detecting the second trigger operation being performed on each second region of an identifier in the first multi-task management window and a quantity of application windows comprised in the first interface reaches an upper limit;
displaying a second update interface of the first interface in response to the second trigger operation, wherein the second update interface displays the second application window and a fourth application window of a fourth application except a third application, wherein the second application window occupies a fourth display region, wherein the fourth display region is occupied by a third application window of the third application in the first interface, and wherein the third application is on which user operation focuses in the first interface, an application earliest opened by the user in an application on which user operation does not focus, or an application latest opened by the user in an application on which user operation does not focus, before the electronic device displays the first multi-task management window.

8. An electronic device, comprising:
a display screen;
a memory coupled to the display screen and configured to store computer instructions; and
a processor coupled to the display screen and the memory, wherein when executed by the processor, the computer instructions cause the electronic device to:
display a first interface comprising a first application window of a first application, wherein the first application window occupies a first display region in the first interface;
receive a first operation input by a user on the first interface, wherein the first operation is a first preset operation;
display a first multi-task management window in response to the first operation, wherein the first multi-task management window comprises identifiers of two or more applications, and wherein the two or more applications are two or more preset applications, two or more applications running in a background, or all applications on the electronic device, wherein each identifier contains respective visually distinct first and second control regions;
in response to detecting a drag operation being performed on each first control region of an identifier of an application in the first multi-task management window:
display the first interface and the identifier in response to the drag operation, wherein the identifier moves with the drag operation;
make a detection that the identifier is dragged to and released in the first display region;
display, in response to the detection, a second application window of the application in a second display region in the first interface, wherein the second display region partially or fully overlaps the first display region; and
display the first application window of the first application in a third display region in the first interface except the second display region;
in response to simultaneously selecting the identifiers of the two or more applications in the first multi-task management window using a composite key:
perform a second dragging operation on the identifiers and release in the first display region; and
display, in response to the second dragging operation, two or more application windows of the two or more applications corresponding to dragged identifiers in a fourth display region next to the first application window of the first application;
in response to detecting a second trigger operation being performed on each second control region of an identifier of an application in the first multi-task management window, wherein the second trigger operation is not a drag operation:
display a first update interface of the first interface, wherein the first update interface displays the first application window and a respective second application window corresponding to the identifier.

9. The electronic device of claim 8, wherein when executed by the processor, the computer instructions further cause the electronic device to display a third application window of a third application in a fifth display region in the first interface except the first display region.

10. The electronic device of claim 8, wherein when executed by the processor, the computer instructions further cause the electronic device to:
perform a touch-and-hold operation on each first control region of an identifier and a move operation uninterrupted from the touch-and-hold operation; and
display the first interface in response to the touch-and-hold operation.

11. The electronic device of claim 8, wherein the first interface occupies all regions in the display screen to display the first application window.

12. The electronic device of claim 8, wherein the first application window occupies the first interface without overlapping another application window.

13. The electronic device of claim 8, wherein when executed by the processor, the computer instructions further cause the electronic device to:
receive a second operation input by the user, wherein the second operation is a second preset operation;
display a second multi-task management window in response to the second operation; and
when the second multi-task management window is compared with the first multi-task management window:
delete the identifier, or
display the identifier in gray.

14. The electronic device of claim 8, wherein when executed by the processor, the computer instructions further cause the electronic device to:
when detecting the second trigger operation being performed on each second region of an identifier in the first multi-task management window when the first multi-task management window is displayed and a quantity of application windows comprised in the first interface reaches an upper limit;
display a second update interface of the first interface in response to the second trigger operation, wherein the second update interface displays the second application window and a fourth application window of a fourth application except a third application, wherein the second application window occupies a fourth display region, wherein the fourth display region is occupied by a third application window of the third application in the first interface, and wherein the third application is on which user operation focuses in the first interface, an application earliest opened by the user in an application on which user operation does not focus, or an application latest opened by the user in an application on which user operation does not focus, before the electronic device displays the first multi-task management window.

15. A computer program product comprising computer-executable instructions that are stored on a non-transitory computer-readable storage medium and that, when executed by a processor, cause an electronic device to:
display a first interface comprising a first application window comprising a first application, wherein the first application window occupies a first display region in the first interface;
receive a first operation input by a user, wherein the first operation is a first preset operation;
display a first multi-task management window in response to the first operation, wherein the first multi-task management window comprises identifiers of two or more applications, and wherein the two or more applications are two or more preset applications, two or more applications running in a background, or all applications on the electronic device, wherein each identifier contains respective visually distinct first and second control regions;
in response to detecting a drag operation being performed on each first control region of an identifier of an application in the first multi-task management window:
display the first interface and the identifier in response to the drag operation, wherein the identifier moves with the drag operation;
make a detection that the identifier is dragged to and released in the first display region by detecting that an area of the identifier is greater than a preset area, or detecting that a ratio between an area of the identifier located in the first display region and a total area of the identifier is greater than a preset ratio;
display, in response to the detection, a second application window of the application in a second display region in the first interface, wherein the second display region partially or fully overlaps the first display region; and
display the first application window in a third display region in the first interface except the second display region; and
in response to simultaneously selecting the identifiers of the two or more applications in the first multi-task management window using a composite key:
perform a second dragging operation on the identifiers and release in the first display region; and
display, in response to the second dragging operation, two or more application windows of the two or more applications corresponding to dragged identifiers in a fourth display region next to the first application window of the first application;
in response to detecting a second trigger operation being performed on each second control region of an identifier of an application in the first multi-task management window, wherein the second trigger operation is not a drag operation:
display a first update interface of the first interface, wherein the first update interface displays the first application window and a respective second application window corresponding to the identifier.

16. The computer program product of claim 15, wherein the computer-executable instructions further cause the electronic device to display a third application window of a third application in a fourth display region in the first interface except the first display region.

17. The computer program product of claim 15, wherein the computer-executable instructions further cause the electronic device to:
when detecting the second trigger operation being performed on each second region of an identifier in the first multi-task management window and a quantity of application windows comprised in the first interface reaches an upper limit;
display a second update interface of the first interface in response to the second trigger operation, wherein the second update interface displays the second application window and a fourth application window of a fourth application except a third application, wherein the second application window occupies a fourth display region, wherein the fourth display region is occupied by a third application window of the third application in the first interface, and wherein the third application is on which user operation focuses in the first interface before the electronic device displays the first multi-task management window.

18. The computer program product of claim 15, wherein the computer-executable instructions further cause the electronic device to:
when detecting a second trigger operation being performed on each second region of an identifier in the first multi-task management window and a quantity of application windows comprised in the first interface reaches an upper limit;
display a second update interface of the first interface in response to the second trigger operation, wherein the second update interface displays the second application window and a fourth application window of a fourth application except a third application, wherein the second application window occupies a fourth display region, wherein the fourth display region is occupied by a third application window of the third application in the first interface, and wherein the third application is an application latest opened by the user in an application on which user operation does not focus before the electronic device displays the first multi-task management window.

\* \* \* \* \*